United States Patent [19]
Durrant et al.

[11] Patent Number: 5,881,100
[45] Date of Patent: Mar. 9, 1999

[54] METHOD AND APPARATUS FOR COHERENT CORRELATION OF A SPREAD SPECTRUM SIGNAL

[75] Inventors: Randolph L. Durrant, Colorado Springs; Mark Burbach, Peyton, both of Colo.

[73] Assignee: Omnipoint Corporation, Colorado Springs, Colo.

[21] Appl. No.: 970,662

[22] Filed: Nov. 14, 1997

Related U.S. Application Data

[63] Continuation of Ser. No. 486,827, Jun. 7, 1995, abandoned, which is a continuation-in-part of Ser. No. 304,091, Sep. 9, 1994, Pat. No. 5,648,982.

[51] Int. Cl.$^6$ .................................................. H04B 1/707
[52] U.S. Cl. .................... 375/208; 375/206; 375/274; 375/336; 375/343
[58] Field of Search .................................. 375/200, 206, 375/208, 209, 210, 274, 336, 343, 305

[56] References Cited

U.S. PATENT DOCUMENTS

| | | | |
|---|---|---|---|
| 3,358,227 | 12/1967 | Taylor | 324/57 |
| 3,838,221 | 9/1974 | Schmidt et al. | 179/15 BS |
| 3,906,489 | 9/1975 | Schlichte | 340/34 DA |

(List continued on next page.)

FOREIGN PATENT DOCUMENTS

| | | | |
|---|---|---|---|
| 3984485 | 3/1984 | Australia | H04B 7/26 |
| 0361299 | 4/1990 | European Pat. Off. | H04B 7/26 |
| 3614638A1 | 11/1987 | Germany | H04L 7/06 |
| 59-17312 | 9/1984 | Japan | H03K 12/05 |
| 139126 | 2/1989 | Japan | H04B 1/16 |
| 6204976 | 7/1994 | Japan | H04J 13/00 |
| 2211053 | 6/1989 | United Kingdom | H04L 9/00 |
| 8700370 | 1/1987 | WIPO | H04J 13/00 |
| 9315573 | 1/1993 | WIPO | H04J 13/00 |
| 9406217 | 9/1993 | WIPO | H04B 7/005 |
| 9501018 | 1/1995 | WIPO | H04K 1/00 |
| 9503652 | 2/1995 | WIPO | H04B 7/26 |
| 9512938 | 5/1995 | WIPO | H04J 13/00 |
| 9512943 | 5/1995 | WIPO | H04L 25/02 |

OTHER PUBLICATIONS

El–Tanany, Mohammed et al., *Analysis of Two Loops for Carrier Recovery in CPM with Index 1/2*, IEEE Transactions on Communications, 37(2):164–176, Feb. 1989.

(List continued on next page.)

*Primary Examiner*—Stephen Chin
*Assistant Examiner*—Jeffrey W. Gluck
*Attorney, Agent, or Firm*—Lyon & Lyon LLP

[57] ABSTRACT

A technique for modulating and demodulating CPM spread spectrum signals and variations of CPM spread spectrum signals. A transmitter divides a signal data stream into a plurality of data streams (such as I and Q data streams), independently modulates the I and Q data streams using CPM or a related technique, and superposes the plurality of resultants for transmission. A receiver receives the superposed spread spectrum signal and simultaneously attempts to correlate for a plurality of chip sequences (such as I and Q chip sequences), and interleaves the correlated I and Q data streams into a unified signal data stream. In one embodiment, the receiver separates the received spread spectrum signal into real and imaginary parts, attempts to correlate both real and imaginary parts for a plurality of chip sequences, and combines the real I, real Q, imaginary I, and imaginary Q signals into a unified signal data stream. The demodulating reference signal in the receiver may or may not be frequency or phase matched with the transmitter. In other embodiments, single bit or multi-bit digitization of the received spread spectrum signal for both I and Q signals (or real I, real Q, imaginary I, and imaginary Q signals) is carried out prior to correlation. In another embodiment, the transmitter differentially phase encodes the information to be transmitted, and the receiver decodes the phase encoded information by determining a quantized phase angle of the received signal.

8 Claims, 35 Drawing Sheets

U.S. PATENT DOCUMENTS

| | | | |
|---|---|---|---|
| 3,934,203 | 1/1976 | Schiff | 325/65 |
| 4,100,498 | 7/1978 | Alsup et al. | 328/14 |
| 4,163,944 | 8/1979 | Chambers et al. | 325/446 |
| 4,164,628 | 8/1979 | Ward et al. | 179/15 BA |
| 4,189,677 | 2/1980 | Cooper et al. | 325/321 |
| 4,217,563 | 8/1980 | Vale | 330/150 |
| 4,222,115 | 9/1980 | Cooper et al. | 375/1 |
| 4,231,005 | 10/1980 | Taylor | 343/5 NQ |
| 4,242,641 | 12/1980 | Houdard | 329/126 |
| 4,247,942 | 1/1981 | Hauer | 375/25 |
| 4,285,060 | 8/1981 | Cobb et al. | 375/1 |
| 4,291,410 | 9/1981 | Caples | 375/1 |
| 4,301,530 | 11/1981 | Gutleber | 370/1 |
| 4,324,001 | 4/1982 | Rhodes | 375/90 |
| 4,327,438 | 4/1982 | Baier et al. | 375/1 |
| 4,338,579 | 7/1982 | Rhodes | 332/21 |
| 4,339,724 | 7/1982 | Feher | 328/164 |
| 4,355,399 | 10/1982 | Timor | 375/80 |
| 4,355,411 | 10/1982 | Reudink et al. | 455/33 |
| 4,392,231 | 7/1983 | Henry | 375/76 |
| 4,392,232 | 7/1983 | Andren et al. | 375/332 |
| 4,418,393 | 11/1983 | Zschiele, Jr. | 364/724 |
| 4,418,425 | 11/1983 | Fennel et al. | 455/27 |
| 4,455,651 | 6/1984 | Baran | 370/104 |
| 4,481,640 | 11/1984 | Chow et al. | 375/1 |
| 4,506,372 | 3/1985 | Massey | 375/116 |
| 4,517,679 | 5/1985 | Clark et al. | 375/37 |
| 4,525,835 | 7/1985 | Vance et al. | 370/29 |
| 4,527,275 | 7/1985 | Russell | 375/1 |
| 4,550,414 | 10/1985 | Guinon et al. | 375/1 |
| 4,561,089 | 12/1985 | Rouse et al. | 370/18 |
| 4,567,588 | 1/1986 | Jerrim | 370/18 |
| 4,567,602 | 1/1986 | Kato | 375/44 |
| 4,583,048 | 4/1986 | Gumacos et al. | 329/112 |
| 4,587,662 | 5/1986 | Langewellpott | 375/1 |
| 4,599,732 | 7/1986 | Lefever | 375/13 |
| 4,601,047 | 7/1986 | Horwitz et al. | 375/2.2 |
| 4,606,039 | 8/1986 | Nicolas et al. | 375/1 |
| 4,608,567 | 8/1986 | Bryant et al. | 343/7 A |
| 4,612,637 | 9/1986 | Davis et al. | 370/95 |
| 4,616,229 | 10/1986 | Taylor | 342/171 |
| 4,621,365 | 11/1986 | Chiu | 375/1 |
| 4,630,283 | 12/1986 | Schiff | 375/1 |
| 4,641,317 | 2/1987 | Fullerton | 375/1 |
| 4,644,565 | 2/1987 | Seo | 375/60 |
| 4,647,863 | 3/1987 | Skudera et al. | 329/112 |
| 4,648,078 | 3/1987 | Kerr | 375/274 |
| 4,648,099 | 3/1987 | Kerr | 375/47 |
| 4,649,549 | 3/1987 | Halpern et al. | 380/32 |
| 4,653,069 | 3/1987 | Roeder | 380/31 |
| 4,660,164 | 4/1987 | Leibowitz | 364/728 |
| 4,672,254 | 6/1987 | Dolat et al. | 310/313 R |
| 4,675,863 | 6/1987 | Paneth et al. | 370/50 |
| 4,686,688 | 8/1987 | Chung et al. | 375/47 |
| 4,688,210 | 8/1987 | Eizenhöfer et al. | 370/18 |
| 4,691,326 | 9/1987 | Tsuchiya | 375/1 |
| 4,707,839 | 11/1987 | Andren et al. | 375/1 |
| 4,730,340 | 3/1988 | Frazier, Jr. | 375/207 |
| 4,736,371 | 4/1988 | Tejima et al. | 370/95 |
| 4,742,512 | 5/1988 | Akashi et al. | 370/96 |
| 4,745,378 | 5/1988 | Niitsuma et al. | 333/196 |
| 4,745,628 | 5/1988 | McDavid et al. | 375/39 |
| 4,754,228 | 6/1988 | Tomlinson | 328/124 |
| 4,754,453 | 6/1988 | Eizenhofer | 370/95 |
| 4,759,034 | 7/1988 | Nagazumi | 375/1 |
| 4,774,715 | 9/1988 | Messenger | 375/1 |
| 4,804,938 | 2/1989 | Rouse et al. | 340/310 |
| 4,805,208 | 2/1989 | Schwartz | 379/93 |
| 4,807,222 | 2/1989 | Amitay | 370/85 |
| 4,811,357 | 3/1989 | Betts | 375/1 |
| 4,815,106 | 3/1989 | Propp et al. | 375/36 |
| 4,817,014 | 3/1989 | Schneider et al. | 364/728.03 |
| 4,817,089 | 3/1989 | Paneth et al. | 370/95 |
| 4,829,543 | 5/1989 | Borth et al. | 365/83 |
| 4,837,786 | 6/1989 | Gurantz et al. | 370/20 |
| 4,864,589 | 9/1989 | Endo | 375/1 |
| 4,873,683 | 10/1989 | Borth et al. | 370/95.1 |
| 4,875,050 | 10/1989 | Rathi | 342/195 |
| 4,894,842 | 1/1990 | Brockhoven et al. | 375/1 |
| 4,901,307 | 2/1990 | Gilhousen et al. | 370/18 |
| 4,908,837 | 3/1990 | Mori et al. | 375/1 |
| 4,912,705 | 3/1990 | Paneth et al. | 370/95.1 |
| 4,918,689 | 4/1990 | Hui | 370/85.9 |
| 4,968,981 | 11/1990 | Sekine et al. | 342/356 |
| 4,979,186 | 12/1990 | Fullerton | 375/23 |
| 4,984,247 | 1/1991 | Kaufmann et al. | 375/1 |
| 5,001,489 | 3/1991 | Taylor | 342/194 |
| 5,005,183 | 4/1991 | Carey et al. | 375/1 |
| 5,016,255 | 5/1991 | Dixon et al. | 375/1 |
| 5,016,261 | 5/1991 | Amoroso et al. | 375/76 |
| 5,022,024 | 6/1991 | Paneth et al. | 370/50 |
| 5,022,046 | 6/1991 | Morrow | 375/1 |
| 5,022,047 | 6/1991 | Dixon et al. | 375/1 |
| 5,023,887 | 6/1991 | Takeuchi | 375/1 |
| 5,025,452 | 6/1991 | Sohner et al. | 375/1 |
| 5,029,184 | 7/1991 | Andren et al. | 375/1 |
| 5,042,050 | 8/1991 | Owen | 375/1 |
| 5,042,082 | 8/1991 | Dahlin | 455/33 |
| 5,056,109 | 10/1991 | Gilhousen et al. | 375/1 |
| 5,058,128 | 10/1991 | Kurihara et al. | 375/1 |
| 5,063,571 | 11/1991 | Vancraeynest | 375/1 |
| 5,066,957 | 11/1991 | Mizuno et al. | 342/352 |
| 5,073,900 | 12/1991 | Mallinkdrodt | 375/1 |
| 5,081,642 | 1/1992 | O'Clock et al. | 375/1 |
| 5,093,637 | 3/1992 | Isota et al. | 332/103 |
| 5,093,841 | 3/1992 | Vancraeynest | 375/1 |
| 5,101,501 | 3/1992 | Gilhousen et al. | 455/33 |
| 5,103,459 | 4/1992 | Gilhousen et al. | 375/1 |
| 5,107,225 | 4/1992 | Wheatley et al. | 330/279 |
| 5,109,390 | 4/1992 | Gilhousen et al. | 375/1 |
| 5,109,393 | 4/1992 | Saegusa | 375/108 |
| 5,119,375 | 6/1992 | Paneth et al. | 370/95.1 |
| 5,121,391 | 6/1992 | Paneth et al. | 370/95.1 |
| 5,132,986 | 7/1992 | Endo et al. | 375/1 |
| 5,144,256 | 9/1992 | Lim | 329/302 |
| 5,146,471 | 9/1992 | Cowart | 375/1 |
| 5,150,377 | 9/1992 | Vannucci | 375/1 |
| 5,157,686 | 10/1992 | Omura et al. | 375/1 |
| 5,166,952 | 11/1992 | Omura et al. | 375/1 |
| 5,170,412 | 12/1992 | Massey | 375/1 |
| 5,177,765 | 1/1993 | Holland et al. | 375/1 |
| 5,177,766 | 1/1993 | Holland et al. | 375/1 |
| 5,179,571 | 1/1993 | Schilling | 375/1 |
| 5,181,225 | 1/1993 | Neeser et al. | 375/1 |
| 5,185,610 | 2/1993 | Ward et al. | 342/357 |
| 5,187,675 | 2/1993 | Dent et al. | 364/715.06 |
| 5,191,597 | 3/1993 | Ekelund et al. | 375/60 |
| 5,195,108 | 3/1993 | Baum et al. | 375/84 |
| 5,202,901 | 4/1993 | Chennakeshu | 375/84 |
| 5,210,770 | 5/1993 | Rice | 375/1 |
| 5,210,771 | 5/1993 | Schaeffer et al. | 375/1 |
| 5,216,691 | 6/1993 | Kaufmann | 375/1 |
| 5,218,618 | 6/1993 | Sagey | 375/1 |
| 5,222,099 | 6/1993 | Hori | 375/1 |
| 5,224,120 | 6/1993 | Schilling | 375/1 |
| 5,231,646 | 7/1993 | Heath et al. | 375/1 |
| 5,243,622 | 9/1993 | Lux et al. | 375/1 |
| 5,253,268 | 10/1993 | Omura et al. | 375/1 |
| 5,255,288 | 10/1993 | Ichihara | 375/64 |
| 5,257,283 | 10/1993 | Gilhousen et al. | 375/1 |
| 5,263,045 | 11/1993 | Schilling | 375/1 |
| 5,263,047 | 11/1993 | Kotzin et al. | 375/1 |

| | | | |
|---|---|---|---|
| 5,265,119 | 11/1993 | Gilhousen et al. | 375/1 |
| 5,267,261 | 11/1993 | Blakeney et al. | 375/1 |
| 5,267,262 | 11/1993 | Wheatley | 375/1 |
| 5,276,704 | 1/1994 | Dixon | 375/1 |
| 5,276,705 | 1/1994 | Higgins et al. | 375/1 |
| 5,280,472 | 1/1994 | Gilhousen et al. | 370/18 |
| 5,280,537 | 1/1994 | Sugiyama et al. | 375/1 |
| 5,283,815 | 2/1994 | Chennakeshu | 375/84 |
| 5,289,497 | 2/1994 | Jacobson et al. | 375/1 |
| 5,297,162 | 3/1994 | Lee at al. | 375/1 |
| 5,299,227 | 3/1994 | Rose | 375/1 |
| 5,311,544 | 5/1994 | Park et al. | 375/1 |
| 5,313,457 | 5/1994 | Hostetter et al. | 370/18 |
| 5,319,634 | 6/1994 | Bartholomew et al. | 370/18 |
| 5,341,396 | 8/1994 | Higgins et al. | 375/1 |
| 5,347,284 | 9/1994 | Volpi et al. | 342/356 |
| 5,353,300 | 10/1994 | Lee et al. | 375/1 |
| 5,353,303 | 10/1994 | Walthall | 375/1 |
| 5,359,625 | 10/1994 | Vander Mey et al. | 375/1 |
| 5,383,219 | 1/1995 | Wheatley et al. | 375/1 |
| 5,392,287 | 2/1995 | Tiedemann et al. | 370/95.1 |
| 5,400,359 | 3/1995 | Hikoso et al. | 375/1 |
| 5,402,413 | 3/1995 | Dixon et al. | 370/18 |
| 5,414,728 | 5/1995 | Zehavi | 375/200 |
| 5,414,796 | 5/1995 | Jacobs et al. | 395/2.3 |
| 5,416,797 | 5/1995 | Gilhousen et al. | 375/705 |
| 5,428,631 | 6/1995 | Zehavi | 371/43 |
| 5,434,888 | 7/1995 | Fukuchi | 375/307 |
| 5,442,662 | 8/1995 | Fukasawa et al. | 375/205 |
| 5,446,727 | 8/1995 | Bruckert et al. | 370/18 |
| 5,455,822 | 10/1995 | Dixon et al. | 370/18 |
| 5,467,367 | 11/1995 | Izumi et al. | 375/206 |
| 5,469,469 | 11/1995 | Haines | 375/201 |
| 5,471,497 | 11/1995 | Zehavi | 375/200 |
| 5,481,533 | 1/1996 | Honig et al. | 370/18 |
| 5,488,629 | 1/1996 | Takahashi et al. | 375/206 |
| 5,500,877 | 3/1996 | Park | 375/343 |
| 5,515,378 | 5/1996 | Roy, III et al. | 370/95.1 |

OTHER PUBLICATIONS

Simon, Marvin K. et al., *Optimum Performance of Suppressed Carrier Receivers with Costas Loop Tracking*, IEEE Transactions on Communications, — Com–25(2):215–227, Feb. 1977.

Viterbi, Andrew J. et al., *Nonlinear Estimation of PSK–Modulated Carrier Phase with Application to Burst Didgital Transmission*, IEEE Transactions on Information Theory, IT–29(4):543–551, Jul. 1983.

Smith, W. Richard, *SAW Filters For CPSM Spread Spectrum Communication*, IEEE National Telecommunications Conference, pp. 22.1.1–22.1.6, Nov. 1980.

Shnidman, David A., *The Calculation of the Probability of Detection and the Generalized Marcum Q–Function*, IEEE Transactions On Information Theory, 35(2):389–400, Mar. 1989.

Kavehrad, M. et al., *Performance of Low–Complexity Channel Coding and Diversity for Spread Spectrum in Indoor, Wireless Communication*, AT&T Tech Journal, 64(8):1927–1965, Oct. 1985.

Kavehrad, M. et al., *Spread Spectrum for Indoor Digital Radio*, IEEE Comm. Mag., 25(5):32–40, Jun. 1987.

Shaft, Paul D., *Low–Rate Convolutional Code Applications in Spread–Spectrum Communications*, IEEE Trans. on Comm., Com–25(8):815–821, Aug. 1977.

Vale, Christopher R., *SAW Quadraphase Code Generator*, IEEE Trans. On Microwave Theory and Tech., MTT–29(5):410–414, May 1981.

Radio Sub–system Synchronization, GSM Recommendation 05.10 (Ver. 3.5.1), Released by ETSI/PT, Oct. 1992.

Cohen, Marvin N. et al., *Minimum Peak Sidelobe Pulse Compression Codes*, IEEE Int'l Radar Conf., 1990, pp. 633–638.

Proakis, John G., *Digital Communications* (McGraw–Hill, 2d ed. 1989), pp. 266–267.

Eschenbach, Ralph, *Applications of Spread Spectrum Radio to Indoor Data Communications*, Proc. of the IEEE, 1982, pp. 34.5–1.

Kavehrad, Mohsen et al., *Direct Sequence Spread Spectrum with DPSK Modulation and Diversity for Indoor Wireless Communications*, IEEE Trans. on Comm., Feb. 1987, vol. COM–35, No. 2, pp. 224–226.

Freret, Payne et al., *Applications of Spread–Spectrum Radio to Wireless Terminal Communications*, Proc. of the IEEE, 1980, pp. 69.7.1–69.7.4.

Freret, Payne, *Wireless Terminal Communications Using Spread–Spectrum Radio*, Proc. of the IEEE, 1980, pp. 244–248.

Nanayakkara, S., *High Speed Receiver Designs Based on Surface Acoustic Wave Devices*, 6th Int'l Conf. On Digital Statellite Comm., Sep. 1983, pp. 16–22.

Collins, J.H. et al., *The Role of Surface Acoustic Wave Technology in Communication Systems*, Ultrasonics, Mar. 1972, 10(2):59–71.

Hagon, P.J. et al., *A Programmable Surface Acoustic Wave Matched Filter for Phase–Coded Spread Spectrum Waveforms*, IEEE Trans. on Microwave Theory and Tech., Apr. 1973, 21(4):303–306.

Saleh, Adel A.M. et al., An Experimental TDMA Indoor Radio Communications System Using Slow Frequency Hopping and Coding, IEEE Trans. on Comm., Jan. 1991, 39(1):152–161.

Baier, A. et al., *Digital Matched Filtering of Arbitrary Spread–Spectrum Waveforms Using Correlators with Binary Quantization*, 2 Proc., 1983, IEEE Military Comm. Conf., Oct. 1983, pp. 418–423.

Baier, A., *A Low–Cost Digital Matched Filter for Arbitrary Constant–Envelope Spread Spectrum Waveforms*, IEEE Trans. on Comm., Apr. 1984, Com–32(4):354–361.

Dixon, Robert C., *Spread Spectrum Systems with Commercial Applications* (J. Wiley & Sons, 3d ed. 1994).

Amoroso, Frank et al., *Simplified MSK Signaling Technique*, IEEE Trans. on Comm., Apr. 1977, pp. 433–441.

Austin, Mark C. et al., *Quadrature Overlapped Raised–Cosine Modulation*, IEEE Trans. on Comm. Com–29(3):237–249, Mar. 1981.

Murota, Kazuaki et al., *GMSK Modulation for Digital Mobile Radio Telephony*, IEEE Trans. on Comm., Com–29(7):1044–1050, Jul. 1981.

Seo, J.S. et al., *SQAM: A New Superposed QAM Modem Technique*, IEEE Trans. on Comm., vol. Com–33, Mar. 1985, pp. 296–300.

Wolff, S. S. et al., *The Polarity–Coincidence Correlator: A Nonparametric Detection Device*, IRE Trans. on Info. Theory, IT–8(1):5–9, Jan. 1962.

Colvin, Roger D., *Correlators And Convolvers Used In Spread Spectrum Systems*, Nat'l Telecomm. Conf., Conf. Rec. vol. 1 of 4, 1982, pp. 22.4.1–22.4.5.

Sust, M. K. et al., *All Digital Signal Processing In A Spread Spectrum Communication System*, Proc. of Melecon '87, Mar. 24–26, 1987, pp. 157–161.

Dual 64–TAP, 11 Mcps Digital Matched Filter Stel–3340, publ. of Stanford Telecom, Jul. 1993, pp. 1–12.

Taylor, John W., Jr. et al., *Quadriphase Code—A Radar Pulse Compression Signal With Unique Characteristics*, IEEE Trans. on Aero. and Elec. Sys., 24(2):156–170, Mar. 1988.

Ziemer, Rodger et al., *Conversion and Matched Filter Approximations for Serial Minimum–Shift Keyed Modulation*, IEEE Trans. on Comm., Com. 30(3):495–509, Mar. 1982.

Unkauf, Manfred G., *Surface Wave Devices in Spread Spectrum Systems*, Surface Wave Filters (Wiley 1977), pp. 477–509.

Campbell, Colin K., *Applications of Surface Acoustice and Shallow Bulk Acoustic Wave Devices*, Pro. of the IEEE, Oct. 1989, pp. 1453–1484.

Hakizimana, Gaspard et al., *A New M–ary Wideband Communication System with Application to Multipath Channels — Part I: System Performance*, IEEE Trans. on Comm., 43:(1):127–135, Jan. 1995.

Dixon, Robert C., *Spread Spectrum Systems*, (J. Wiley & Sons, 2d ed. 1984).

Anderson, John B. et al., *Digital Phase Modulation*, (Plenum Press, 1986), pp. 22–26.

Anderson, John B. et al., *Digital Phase Modulation*, (Plenum Press, 1986), pp. 50–53.

Anderson, John B. et al., *Digital Phase Modulation*, (Plenum Press, 1986), Chapter 6, pp. 211–235.

Anderson, John B. et al., *Digital Phase Modulation*, (Plenum Press, 1986), Chapter 7, pp. 237–271.

"Filtering And Limiting Effects On The Performance Of QPSK, OKQPSK, MSK and Feher's QPSK", Sec. 4.9, *Power Efficient Modulation Techniques For Satellite Channels*, Chap. 4, pp. 196–200.

Austin, Mark C. et al., *QPSK, Staggered QPSK, and MSK — A Comparative Evaluation*, IEEE Trans. on Comm., Com–31(2):171–182, Feb. 1983.

Chung, K.S. et al., *Generalized Tamed Frequency Modulation*, IEEE, 1982, pp. 1805–1808.

de Jager, Frank et al., *Tamed Frequency Modulation, A Novel Method to Achieve Spectrum in Digital Transmission*, IEEE Trans. on Comm., Com–26(5):534–541, May 1978.

Feher, Kamilo, *JTC Modulation Standard Group–FQPSK Consortium — Spectrum utilization with compatible/expandable GMSK, QPSK and FQPSK*, JTC: Joint Tech. Comm. On Wireless Access, Jan. 1994.

Kato, Shuzo et al., *XPSK: A New Cross–Correlated Phase–Shift Keying Modulation Technique*, IEEE Trans. on Comm., Com–31(5):701–707, May 1983.

Leung, Patrick S.K. et al., *F–QPSK —A Superior Modulation Technique for Mobile and Personal Communications*, IEEE Trans. on Broadcasting, 39(2):288–294, Jun. 1993.

Mohanty, Nirode C., *Spread Spectrum and Time Division Multiple Access Satellite Communications*, IEEE Trans. on Comm., Com–25(8):810–815, Aug. 1977.

"Air Interface Considerations," Joint Experts Meeting, Rockwell International Nov. 9, 1992.

Proakis, John G., *Digital Communications*, (McGraw–Hill, 2d ed. 1989), pp. 172–186.

METHOD AND APPARATUS FOR COHERENT CORRELATION OF A SPREAD SPECTRUM SIGNAL

RELATED APPLICATION DATA

This application is a continuation of Ser. No. 08/486,827, filed Jun. 7, 1995, now abandoned, which is a continuation-in-part of corresponding to Ser. No. 08/304,091, now, U.S. Pat. No. 5,648,982 issued Jul. 15, 1997 and entitled "Coherent and Non-Coherent CPM Correlation Method and Apparatus," filed on Sep. 9, 1994 in the name of inventors Randy Durrant and Mark Burbach.

FIELD OF THE INVENTION

The field of this invention relates to spread spectrum communication and, more particularly, to transmitting and receiving continuous phase modulated (CPM) signals such as spread spectrum signals.

DESCRIPTION OF RELATED ART

Spread spectrum is a type of signal modulation that spreads a signal to be transmitted over a bandwidth that substantially exceeds the data-transfer rate, hence the term "spread spectrum". In direct sequence spread spectrum, a data signal is modulated with a pseudo-random chip sequence; the encoded spread spectrum signal is transmitted to the receiver which despreads the signal. Several techniques are available for the transmitter to modulate the data signal, including biphase shift keying (BPSK) and continuous phase modulated (CPM) techniques. Minimum shift keying (MSK) is a known variation of CPM.

In despreading a spread spectrum signal, the receiver produces a correlation pulse in response to the received spread spectrum signal when the received spread spectrum signal matches the chip sequence to a predetermined degree. Various techniques are available for correlating the received signal with the chip sequence, including those using surface acoustic wave (SAW) correlators, tapped delay line (TDL) correlators, serial correlators, and others.

In spread spectrum communication CPM techniques are often chosen so as to preserve signal bandwidth of the spread spectrum signal when it is amplified and transmitted. Using CPM techniques also has the advantage that "class C" amplifiers may be used for transmitting the spread spectrum signal. However, spread spectrum signals transmitted using CPM are difficult to decode with many types of spread spectrum correlators, including various SAW correlators and serial correlators. These types of correlators usually require a BPSK spread spectrum signal for effective correlation rather than an MSK or other CPM spread spectrum signal because a BPSK signal has either a zero or 180 degree phase shift for each chip time. Thus, each chip of a received BPSK signal may be compared with each chip of the spread spectrum code, and a maximum correlation pulse may be generated when a predetermined number of matches occur. However, when a CPM signal with the same data signal and chip rate is applied to the same correlator, the correlation pulse will generally be very weak and may be quite difficult to detect.

Another problem often encountered in attempting to correlate spread spectrum signals transmitted using CPM techniques is the absence of a coherent reference signal in the receiver. A coherent reference signal in this sense may be defined as a locally generated signal that matches the transmitter carrier signal in frequency and phase. The receiver may use the locally generated reference signal to demodulate the received signal. In practice, however, it can be difficult to independently generate a local reference signal in the receiver precisely matching the transmitted carrier signal in frequency and phase. Rather, a local reference signal generated in the receiver will usually be of a non-coherent variety—that is, having small differences in frequency and phase from the transmitter's carrier signal. These frequency and phase differences are not constant but vary over time. When an attempt is made to demodulate a received signal using a non-coherent reference signal, errors in correlation may occur due to mismatches in timing and variations in perceived amplitude caused by the frequency and phase differences.

Various methods for dealing with the above problem exist in which a coherent reference signal is created in the receiver by continuously measuring the frequency and phase differences between the received signal and a locally generated non-coherent reference signal, and then adjusting the non-coherent reference signal until it matches the frequency and phase of the received signal. Such methods, however, generally require the use of relatively complex feedback techniques and involve extra hardware. Moreover, locking onto the received frequency and phase can take an unacceptably large amount of time, particularly in systems where time is of the essence, such as in certain time division multiple access (TDMA) systems in which only a relatively brief time slot is allocated for periodic communication between a transmitter and receiver.

A particular non-coherent digital matched filter is described in A. Baier and P. W. Baier, "Digital Matched Filtering of Arbitrary Spread-Spectrum Waveforms Using Correlators with Binary Quantization," 2 *Proceedings*, 1983 *IEEE Military Communications Conference*, Vol. 2, pp. 418–423 (1983). The digital filter described therein uses four real filter channels to perform four-phase quantization in the complex plane, with the four quadrants being the quantization regions, and the result taking on the four complex values of $\pm 1 \pm j$. In the described four-phase filter, an input signal is divided into an in-phase signal and a quadrature signal. The in-phase signal and the quadrature signal are separately filtered, sampled and digitized using 1-bit quantization. The quantized in-phase signal and the quantized quadrature signal are each fed into two binary correlators each programmed with a reference sequence of N chips, one chip for each sample. The outputs of the four binary correlators are combined to produce a resultant output signal. Baier's four-phase digital matched filter is also described in A. Baier, "A Low-Cost Digital Matched Filter for Arbitrary Constant-Envelope Spread Spectrum Waveforms," *IEEE Transactions on Communications*, Vol. Com-32, No. 4, April 1984, pp. 354–361.

These references suggest that for demodulation of non-coherent CPM signals such as QPSK, MSK, OQPSK, and GMSK signals, four real channels are needed to fully recover the transmitted signal. Further, the described four-phase filter shows only a system using 1-bit quantization, and does not describe a technique for serial correlation.

Accordingly, it would be advantageous to provide a method of modulation and demodulation particularly suited to CPM signals. It would further be advantageous to provide a method of CPM modulation and demodulation that does not require the generation of a coherent reference signal, that is capable of rapid correlation, and that may be used with analog correlators and digital correlators in an effective manner. It would further be advantageous to provide a flexible and effective system for CPM modulation and demodulation that does not require a coherent reference signal, and that is suitable for use in an environment of cellular communications.

SUMMARY OF THE INVENTION

The invention relates to a method and apparatus for transmitting and receiving CPM spread spectrum signals using phase encoding to increase throughput. In one aspect of the invention, a transmitter divides a signal data stream into a plurality of data streams (e.g., an I and Q data stream), independently modulates the data streams using CPM or a related modulation technique, and superposes the plurality of resultants for transmission. A preferred receiver receives the superposed spread spectrum signal, simultaneously attempts to correlate for a plurality of chip sequences (such as I and Q chip sequences), and interleaves the correlated data streams into a unified signal data stream.

In a second aspect of the invention, the receiver comprises a carrier signal that is neither frequency matched or phase matched with the transmitted signal. In this aspect, the receiver separates the received spread spectrum signal into real and imaginary parts, attempts to correlate both real and imaginary parts for a plurality of chip sequences (e.g., I and Q chip sequences), and combines the real and imaginary signals into a unified signal data stream. A preferred embodiment of this aspect of the invention uses a single bit digitization of the received spread spectrum signal to preserve only phase information for inexpensive digital processing. Another preferred embodiment of this aspect of the invention uses two-bit digitization of the received spread spectrum signal. In an alternative embodiment of the invention, the receiver uses self-synchronization techniques for despreading and correlation.

These aspects of the invention are described with reference to a preferred embodiment of the invention, in which a single parallel correlator and a plurality of 32 serial correlators are combined so as to allow correlation and recognition of any of 32 distinct symbols for a spread spectrum code sequence of 32 chips. Each of the 32 distinct symbols is associated with a distinct 5-bit pattern. A sixth bit of information is transmitted for each symbol by differential phase encoding at the transmitter and is phase decoded at the receiver.

A preferred transmitter capable of phase encoding divides a data stream into a data symbol portion and a phase selection portion. The data symbol portion is used to select one of a plurality of symbol codes for transmission. The phase selection portion is used to differentially phase encode the selected symbol code prior to transmission. The transmitter may use a CPM or related technique to transmit the phase encoded symbol codes.

A preferred receiver receives the superposed spread spectrum signal and simultaneously attempts to correlate for a plurality of chip sequences (such as I and Q chip sequences), and derives a real correlation signal and an imaginary correlation signal. For each received symbol, the receiver determines which of a plurality of phase sectors the phase angle lies in. The receiver compares the difference between the phase sector of the present symbol and the phase sector of a preceding symbol. For biphase encoding, if the difference in closer to 0°, then the receiver outputs a first bit, and if the difference is closer to 180°, the receiver outputs a second bit. Higher degrees of phase encoding (e.g., quadraphase or octiphase) may also be used.

DESCRIPTION OF THE PREFERRED EMBODIMENTS

Figure 1:
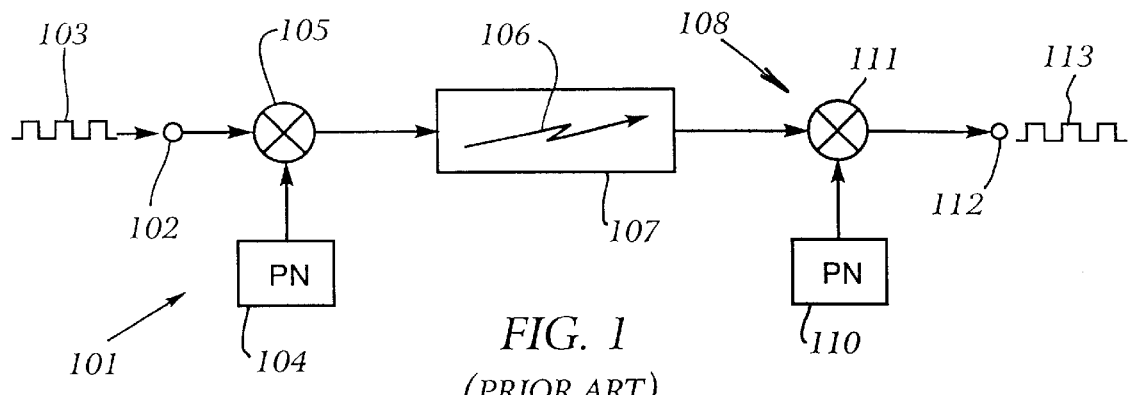
FIG. 1 is a block diagram of a spread spectrum communication transmitter and receiver as known in the art.

FIG. 1 is a block diagram of a spread spectrum communication transmitter 101 and receiver 108 as known in the art.

The spread spectrum transmitter 101 of FIG. 1 comprises an input port 102 for input data 103, a transmitter chip sequence generator 104, and a modulator 105. The transmitter 101 thereby transmits a spread spectrum signal 106 over a transmission channel 107. The transmission channel 107 may comprise an RF channel, but may also comprise other transmission media, such as modulated laser, ultrasound, or fluidic systems. The spread spectrum receiver 108 of FIG. 1 comprises a receiver chip sequence generator 110, a demodulator 111, and an output port 112 for generating output data 113. In the FIG. 1 system, a single chip sequence, which appears essentially random to others not knowing the spreading code upon which it is based, may be identically generated by both the transmitter generator 104 and the receiver generator 110. An extensive discussion of spread spectrum communication, spreading codes, and chip sequences may be found in R. Dixon, *Spread Spectrum Systems with Commercial Applications* (J. Wiley & Sons, 3d ed. 1994).

Figure 2:
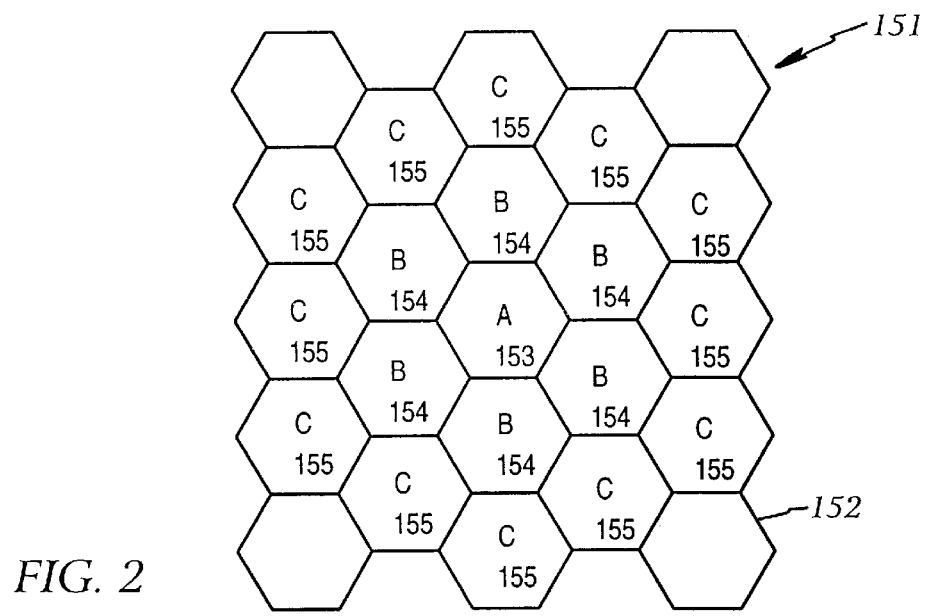
FIG. 2 depicts a pattern of cells for use in spread spectrum communication.

FIG. 2 depicts a pattern of cells for use in spread spectrum communication.

In the preferred cellular environment of FIG. 2, a region 151 for communication may be divided into a set of cells 152, each of which may be assigned a frequency and a set of spread spectrum codes for communication. A first cell 153 may generally be found adjacent to a set of distance-one neighbors 154 and a set of distance-two neighbors 155. In a preferred embodiment, a plurality of frequencies f1, f2 and f3, and a plurality of code sets c1, c2, and c3, may be configured in a pattern of cells 152 so that the no distance-one neighbors 154 or distance-two neighbors 155 of a particular cell 153 has the same combination of frequency and code se the cell 153.

Other and further information about a preferred cellular environment in which the invention may operate may be found in U.S. Pat. No. 5,402,413 which is assigned to the assignee of the present application, and hereby incorporated by reference as if fully set forth herein.

Known CPM spread spectrum signals include several variations; these include minimum shift keying (MSK) and its variations, e.g., Gaussian pre-filtered MSK (GMSK), superposed quadrature amplitude modulation (SQAM), and staggered quadrature offset raised cosine modulation (SQORC). These variations are known in the art. Explanations of various types of CPM techniques may be found in the following: Frank Amoroso and James A. Kivett, "Simplified MSK Signaling Technique," *IEEE Transactions on Communications*, April 1977, pp. 433–441; Mark C. Austin and Ming U. Chang, "Quadrature Overlapped Raised-Cosine Modulation," *IEEE Transactions on Communications*, Vol. Com-29, No. 3, March 1981, pp. 237–249; Kazuaki Murota and Kenkichi Hirade, "GMSK Modulation for Digital Mobile Radio Telephony," *IEEE Transactions on Communications*, Vol. Com-29, No. 7, July 1981, pp. 1044–1050; and J. S. Seo and K. Feher, "SQAM: A New Superposed QAM Modem Technique," *IEEE Transactions on Communications*, Vol. Com-33, March 1985, pp. 296–300. The invention is generally described with regard to MSK signals. However, other variants of MSK and other CPM signals are within the scope and spirit of the invention.

An MSK signal is generally characterized by the fact that phase changes linearly within each chip time, and that the phase change over a single chip time is $\pm\pi/2$ radians ($\pm 90$ degrees). The rate of phase change for a single chip time is $\pm k$, for a suitable value $k$, and is linear and continuous everywhere except at chip boundaries.

Figure 3:
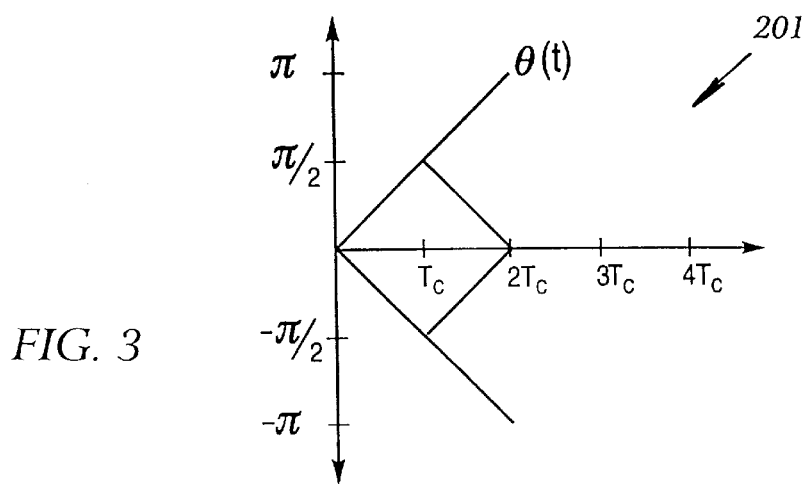
FIG. 3 is a graph of phase changes over time for an MSK signal.

The above described characteristics of MSK signals may be further explained with reference to FIG. 3, which is a graph showing possible changes in phase for an MSK signal over time. In FIG. 3, the x-axis is time and the y-axis is signal phase. In a first chip time from zero to Tc, the phase $\theta(t)$ changes from 0 to $\pi/2$ or $-\pi/2$. In a second chip time, from Tc to 2 Tc, the phase $\theta(t)$ changes from $+\pi/2$ to 0 or $+\pi/2$ to $+\pi$, or from $-\pi/2$ to 0 or $-\pi/2$ to $-\pi$, and so on.

An MSK signal s(t) may be considered to comprise two offset signals, i(t) and q(t), which represent the phase of the carrier signal. At any instant of time the phase of the carrier signal may be expressed as:

$$\theta(t) = -\text{Tan}^{-1}[q(t)/i(t)]$$

Thus, $i(t) = \cos\theta(t)$, and $q(t) = \sin\theta(t)$.

Figure 4A:
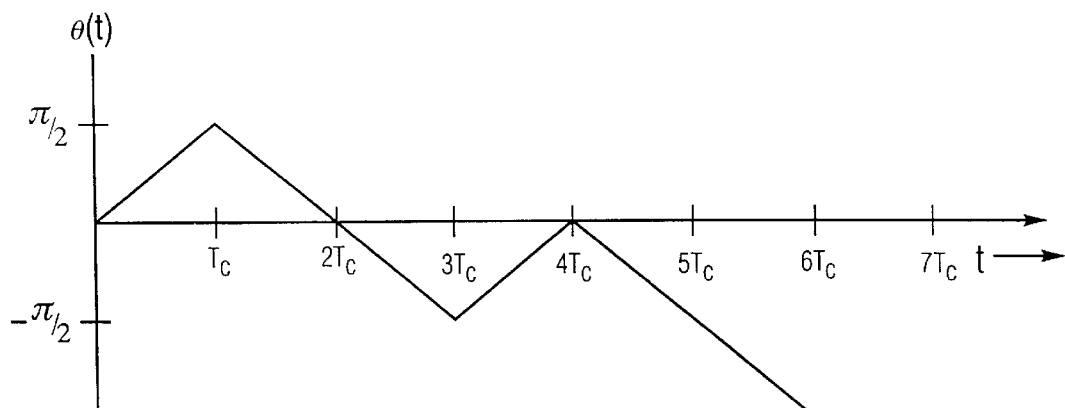
FIGS. 4A–4C are a set of graphs showing a relationship among phase components.
Figure 4B:
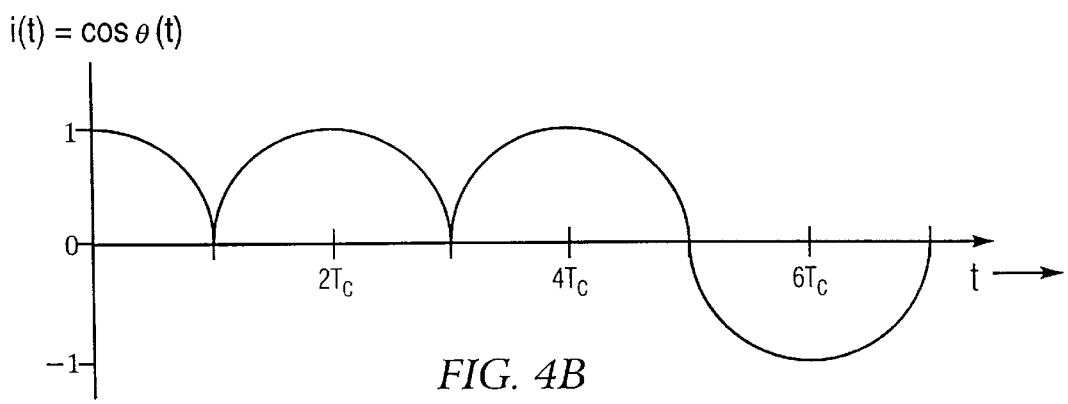
Figure 4C:
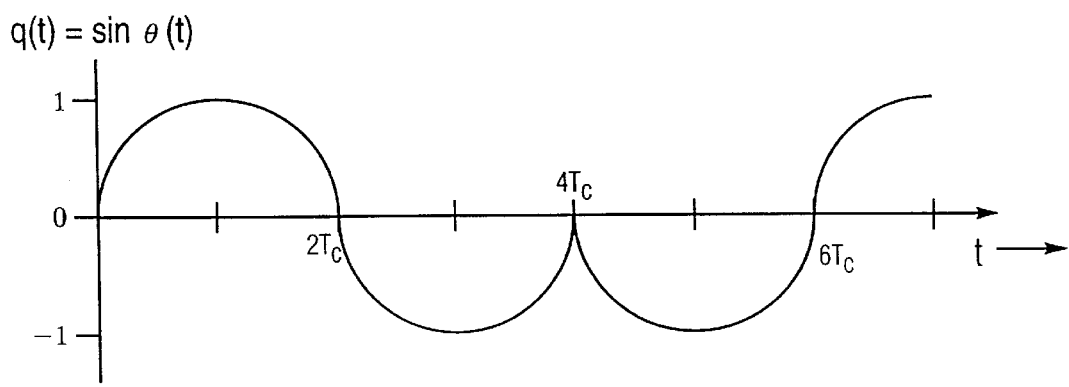

Since the phase of the MSK signal varies linearly from one chip time to the next chip time, i(t) and q(t) may consist of half sinusoidal waveforms as shown in the FIGS. 4A–4C. In FIGS. 4A–4C, the x-axis is time and the y-axis is signal phase. FIG. 4A is a graph showing an example of how the phase $\theta(t)$ may change for a particular MSK signal in each chip time from 0, Tc, 2Tc, 3Tc, 4Tc, 5Tc, and so on, for the chip sequence "11101001 . . . ." As noted, during each chip time the phase varies for an MSK signal by $\pi/2$ in either a positive or negative direction. FIGS. 4B and 4C are graphs showing i(t) and q(t) waveforms, respectively, which correspond to the varying phase $\theta(t)$. Because of the nature of the MSK signal's phase $\theta(t)$ (e.g., that it is linear and varies only by $\pi/2$ each chip period), the i(t) signal comprises a sequence of partial cosine waveforms, and the q(t) signal comprises a sequence of partial sine waveforms. Each of i(t) and q(t) comprises a half-waveform over a timespan of 2Tc; that is, i(t) and q(t) occur at half the chip rate.

An i(t) waveform and a q(t) waveform can be generated from a chip stream c(t) and combined so as to produce an MSK signal—i.e., a signal having a phase which varies linearly as desired in either a positive or a negative direction by an amount of $\pi/2$ each chip time. In order to generate i(t) and q(t), the original chip stream c(t) may be demultiplexed into two separate chip streams $C_{even}(t)$ and $C_{odd}(t)$, each having half the chip rate of the original chip stream c(t). In the described embodiment, the i(t) signal is associated with the odd-numbered chips, and the q(t) signal is associated with the even-numbered chips.

Thus, the i(t) signal comprises a sequence of half-sinusoidal waveforms, one for each odd chip. Each half sinusoid may be positive for a "1" chip and negative for a "0" chip:

$$i(t) = C_{odd}(t) \cos \theta(t) \quad (203)$$

where $C_{odd}(t)$ comprises the odd-numbered chips from the chip stream to be transmitted. Similarly, the q(t) signal comprises a sequence of half-sinusoidal waveforms, one for each even chip:

$$q(t) = C_{even}(t) \sin \theta(t) \quad (204)$$

where $C_{even}(t)$ comprises the even-numbered chips from the chip stream to be transmitted.

Figure 5A:
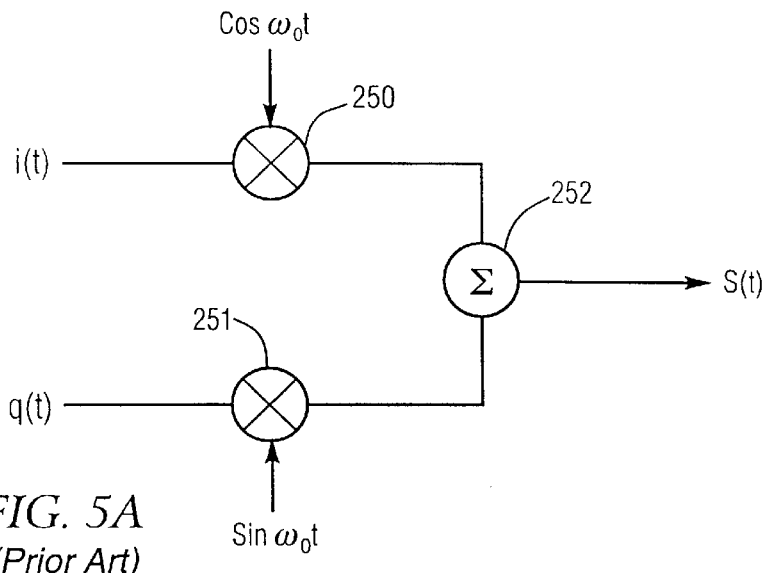
FIG. 5A is a block diagram showing means for generating a CPM spread spectrum signal.

The i(t) and q(t) signals may be used to modulate a carrier signal operating at frequency $\omega_0$ by summing i(t) and q(t) in phase quadrature so as to generate an MSK signal s(t) having a linearly varying phase $\theta(t)$. A block diagram showing means for generating a CPM spread spectrum signal is depicted in FIG. 5A. The signal i(t) is multiplied with a signal $A \cos \omega_0 t$ by multiplier 250, which provides an output to a summer 252. The signal q(t) is multiplied with a signal $A \sin \omega_0 t$ by multiplier 251, which also provides an output to the summer 252. The summer 252 sums its inputs and produces an output signal s(t).

The relationship between the transmitted signal s(t) having varying phase $\theta(t)$, and the i(t) and q(t) signals is shown in the following equations:

$$\begin{aligned} s(t) &= Re\{A\exp(j[-\omega_0 t + \theta(t)])\} \quad (207) \\ &= Re\{A\exp(-j\omega_0 t)\exp(j\theta(t))\} \\ &= Re\{A[\cos\omega_0 t - j\sin\omega_0 t][i(t) + jq(t)]\} \\ &= Ai(t)\cos\omega_0 t + Aq(t)\sin\omega_0 t \end{aligned}$$

where A is an amplification factor, Re{ } represents the real part of a complex value, and j is the square root of −1. Note that $u(t)=i(t)+jq(t)$ represents the complex envelope of s(t).

As noted herein, i(t) and q(t) each comprises every other chip from the chip stream c(t); i(t) comprises the odd-numbered chips 1, 3, 5, . . . ; q(t) comprises the even-numbered chips 2, 4, 6, . . . . The transmitted signal s(t), generated from signals i(t) and q(t), therefore comprises all of the chips. Because q(t) is derived from the even chips while i(t) is derived from the odd chips, q(t) is delayed by one chip time from i(t); thus, q(t) and i(t) are offset signals.

Figure 5B:
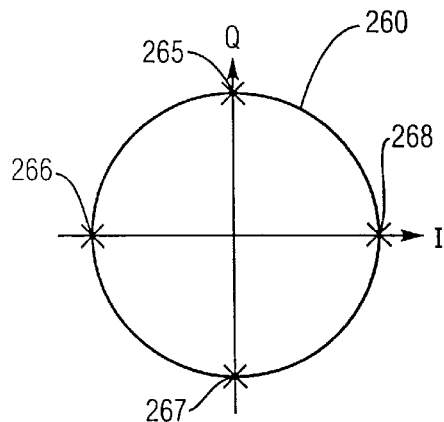
FIG. 5B is a graph of I and Q values.

It is important to note that, because i(t) and q(t) are staggered, as i(t) reaches its maximum (or minimum) value q(t) will be zero, and vice versa. This relationship between i(t) and q(t) allows phase change sequences of $\pm \pi/2$ over one chip time Tc (unlike, for example, QPSK or OQPSK). FIG. 5B is a graph of I and Q values, in which the x-axis represents values of i(t) and the y-axis represents values of q(t). Each <i(t), q(t)> pair falls at a given instant of time on the circle 260. Maximum and minimum values for i(t) and q(t) are shown where the circle 260 intersects the x-axis and y-axis at points 265 through 268; these points 265 through 268 also represent the possible values of <i(t), q(t)> pairs at chip boundary times.

Alternative encoding methods such as GMSK, SQAM, or SQORC, differ from MSK in that phase changes of less than $\pm\pi/2$ are allowed. In general, GMSK, SQAM, and SQORC all use a form of pre-filtering the MSK i(t) and q(t) signals to reduce transmission bandwidth. This pre-filtering has the general effect of reducing the high-frequency components generated by the sharp phase reversals in the MSK i(t) and q(t) signals. For GMSK, pre-filtering may also result in intersymbol interference over several chip times, the effect of which may be mitigated with a trellis decoder. In SQAM or SQORC, the final frequency envelope is no longer constant, but is still nearly so.

Figure 6:
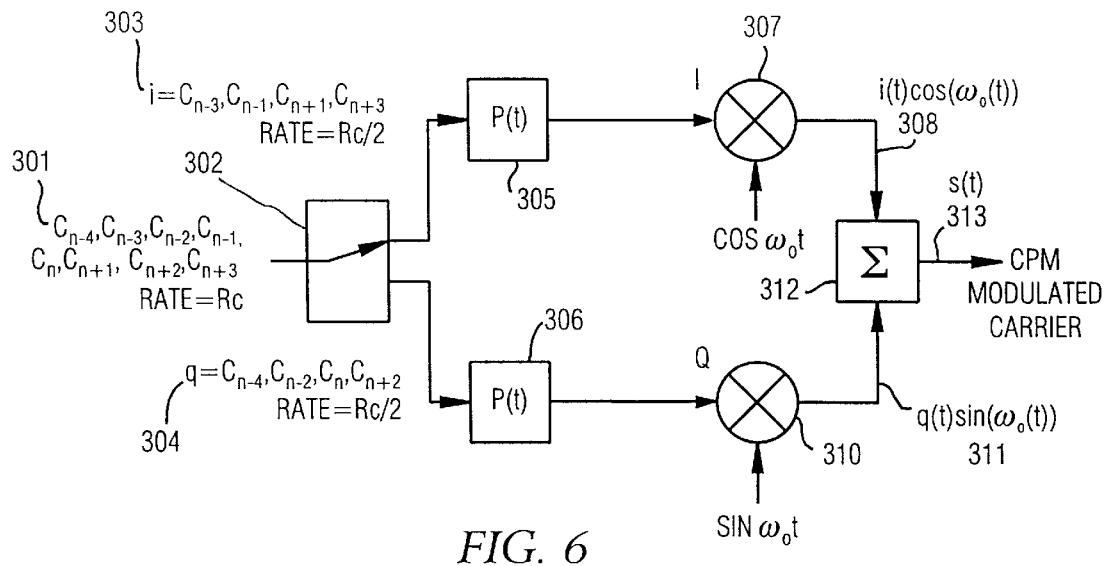
FIG. 6 is a block diagram of a spread spectrum transmitter.

FIG. 6 is a block diagram of a spread spectrum transmitter.

In the transmitter of FIG. 6, a chip stream c(t) 301 is provided to a demultiplexer 302, which divides the chip stream 301 into a set of odd chips $C_{odd}(t)$ 303 for the i(t) signal and a set of even chips $C_{even}(t)$ 304 for the q(t) signal. The chip stream c(t) 301 may comprise the result of a pseudo-noise ("PN") code modulated with a data stream (as in direct sequence spread spectrum communication), or may comprise a sequence of chip codes corresponding to predetermined symbols such as may be done, for example, in code shift keying (CSK) techniques.

The odd chips 303 and the even chips 304 are each coupled to first and second waveform generators P(t) 305 and 306 respectively. In a preferred embodiment, the waveform generators P(t) may generate a half-sinusoidal waveform, positive or negative, as described herein. Other waveform generators and other waveforms are within the scope and spirit of the invention.

The output of the first waveform generator 305 (i.e., receiving the odd chips 303) corresponds to the signal i(t) and is coupled to a first multiplier 307, which modulates a carrier signal $\cos \omega_0 t$ to generate a signal $s_1(t)$ 308 corresponding to $i(t) \cos \omega_0 t$. The output of the second waveform generator 306 (i.e., receiving the even chips 304) corresponds to the signal q(t), which, as mentioned, is delayed by one chip time Tc from the signal i(t). The output of the second waveform generator 306 is coupled to a second multiplier 310, which modulates a carrier signal $\sin \omega_0 t$ to generate a signal $s_2(t)$ 311 corresponding to $q(t) \sin \omega_0 t$.

The signals $s_1(t)$ 308 and $s_2(t)$ 311 are coupled to a summer 312, which combines its inputs and generates a superposed signal s(t) 313. The signal s(t) may be amplified and transmitted by a transmission system, such as a radio transmission system, coupled to the transmission channel 107.

The chip stream c(t) may be generated by modulating a pseudo-noise code with data to be transmitted such as is known in direct sequence spread spectrum modulation. In a preferred embodiment, the chip stream c(t) comprises a plurality of symbol codes, each symbol code representing a symbol indicative of one or more data bits of information. Instead of directly modulating input data with a pseudo-noise code, sequences of data bits are translated into symbols which are used to select from a plurality of symbol codes located in a table. For example, five data bits may represent a symbol; thus, there may be 32 possible symbols representing all possible combinations of five data bits. Each symbol is associated with a unique symbol code, so that thirty-two symbol codes (or sixteen symbol codes and their inverses) may represent all possible symbols. For each symbol to be transmitted, the appropriate symbol code is selected among the thirty-two available. Thus, the chip stream c(t) may comprise a sequence of symbol codes.

Each symbol code may be, for example, 32 chips in length, or some other appropriate number of chips in length (preferably an even number of chips).

In a like manner, the demultiplexer 302 may comprise a table of half symbol codes. In particular, the demultiplexer 302 may comprise a Q-lookup table and I-lookup table. For every five bits of data to be transmitted (following the previous example), instead of looking up a symbol code from a table and demultiplexing it with demultiplexer 302, two half symbol codes may be read, one from the I-lookup table and one from the Q-lookup table. Each half symbol code may be clocked serially to the waveform generators 305, 306 for further processing. The system may comprise clocking logic which provides a delay of one chip time Tc to the half symbol code from the Q-lookup table.

Once a set of 32 unique symbol codes are selected, the contents of the I-lookup table and Q-lookup table can be generated by dividing each symbol code into even and odd chips, and using the even chips for the half symbol codes in the Q-lookup table and the odd chips for the half symbol codes in the I-lookup table. Other techniques for generating even and odd chip sequences suitable for signals q(t) and i(t) fall within the spirit and scope of the invention.

Figure 7:
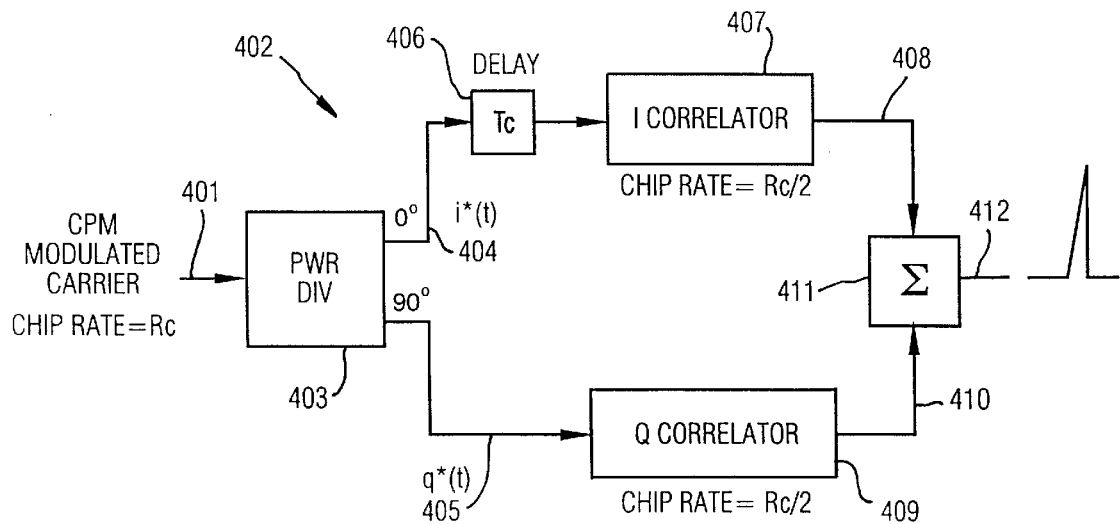
FIG. 7 is a block diagram showing one embodiment of spread spectrum receiver.

FIG. 7 is a block diagram of a spread spectrum receiver.

The transmitted signal s(t) 313 may undergo attenuation, addition of noise, multipath superposition, and other known and unknown effects of the transmission channel 107. Accordingly, the received signal s*(t) 401 may differ from the transmitted signal s(t) 313 in known and unknown ways.

Received signal s*(t) may be despread using multiple correlators keyed to I and Q chip streams. Because CPM spread spectrum signals may be thought of as the superposition of time staggered signals created from I and Q chip streams (each at half the chip rate), a receiver according to one embodiment of the present invention uses two correlators, one programmed with the I-chip-sequence and one programmed with the Q-chip-sequence and both operating at half the chip rate, to decode the received signal, and then combines the outputs of the two correlators.

In the receiver of FIG. 7, the received signal s*(t) 401 is coupled to a CPM correlator 402 for recognizing a chip sequence in the received signal s*(t) 401. The CPM correlator 402 comprises a power divider 403 for generating duplicate signals, an i*(t) signal 404 with a 0 degree phase delay, and a q*(t) signal 405 with a 90 degree phase shift.

The i*(t) signal 404 is coupled to a delay 406, which delays the i*(t) signal 404 by one chip time Tc to allow simultaneous generation of correlation pulses by the I correlator 407 and the Q correlator 409. Thus, the delayed i*(t) signal is coupled to an I correlator 407, and the q*(t) signal 405 is coupled directly to a Q correlator 409.

The I correlator 407 operates at a chip rate of Rc/2, where Rc is the chip rate (i.e., 1/Tc) of the received signal s*(t) 401. The I correlator 407 may comprise one of several types of correlators, e.g., a surface-acoustical-wave (SAW) correlator, a tapped-delay-line (TDL) correlator, or a serial correlator. Examples of suitable correlators may be found in U.S. Pat. No. 5,016,255 entitled "Asymmetric Spread Spectrum Correlator" or in U.S. Pat. No. 5,022,047 entitled "Spread Spectrum Correlator", both of which are issued in the name of inventors Robert C. Dixon and Jeffrey S. Vanderpool and hereby incorporated by reference as if fully set forth herein. The I correlator 407 produces an output I correlation signal 408 indicating a degree of match between the delayed i*(t) signal and a predetermined I-chip-sequence.

The Q correlator 409 similarly operates at a chip rate of Rc/2, and may similarly comprise any of a number of suitable correlators such as those described in the patents referenced in the preceding paragraph. The Q correlator 409 produces an output Q correlation signal 410 indicating a degree of match between the q*(t) signal and a predetermined Q-chip-sequence.

The I correlation signal 408 and the Q correlation signal 410 are coupled to a summer 411, which combines its inputs and produces a unified correlation signal 412. Because the i*(t) signal is delayed by delay 406, the I correlation signal 408 and Q correlation signal 410 occur simultaneously. The unified correlation signal 412 is used to determine a data stream d(t) from which the chip sequence c(t) was generated.

The I correlator 407 and the Q correlator 409 thus jointly identify the chip sequence in the received signal s*(t) 401. The I correlator 407 is configured to recognize the odd chips of the chip sequence, while the Q correlator 409 is configured to recognize the even chips of the chip sequence. When the entire correlation sequence appears in the received signal s*(t), the sum of the I correlation signal 408 and the Q correlation signal 410 is at a maximum, and may be compared against a predetermined threshold to allow recognition of the chip sequence. A unified correlation signal 412 is produced when a chip sequence is recognized.

Alternatively, instead of comparing the unified correlation signal 412 to a predetermined threshold, a system may be configured so as to have a plurality (e.g., 32) of CPM correlators 402 operating in parallel, each tuned to recognize a different code sequence. The outputs of all 32 CPM correlators may be summed and, when the sum is at a predetermined maximum level, the CPM correlator 402 with the highest magnitude output may be chosen by a best-of-M detector or similar means as indicative of the data stream d(t). For example, in a CSK system, each of 32 CPM correlators may attempt in parallel to recognize a code sequence, and the one with the highest magnitude correlation signal may be assumed to indicate the received chip stream. The recognized chip stream may correspond to a data symbol from which a portion of the data stream d(t) may be recovered.

In a preferred embodiment, the CPM correlator 402 may be used in conjunction with techniques described in U.S. Pat. Nos. 5,016,255 or 5,022,047, both of which are assigned to the assignee of the present invention and hereby incorporated by reference. In those techniques, each data bit or data symbol of the data stream d(t) may be encoded by modulation with the entire length of a pseudo random chip sequence generated from a chip sequence code. For example, if a chip sequence code identifies a pseudo random chip sequence that repeats after 32 chips, each data bit of the data stream d(t) may be modulated with all 32 of those chips.

However, there is no requirement that the CPM correlator 402 be used with those particular techniques. For example, the CPM correlator may be used with other spread spectrum techniques to recognize a correlation signal that is used to synchronize the transmitter 101 and the receiver 108. Also, the CPM correlator 402 may be used in conjunction with a self-synchronizing or auto-synchronizing spread spectrum technique such as described elsewhere herein in more detail.

The I and Q chip sequences are preferably of equal length; thus, each CSK symbol code is preferably an even number of chips in length so as to avoid a 90-degree phase uncertainty between symbol codes when despreading is attempted.

Figure 8:
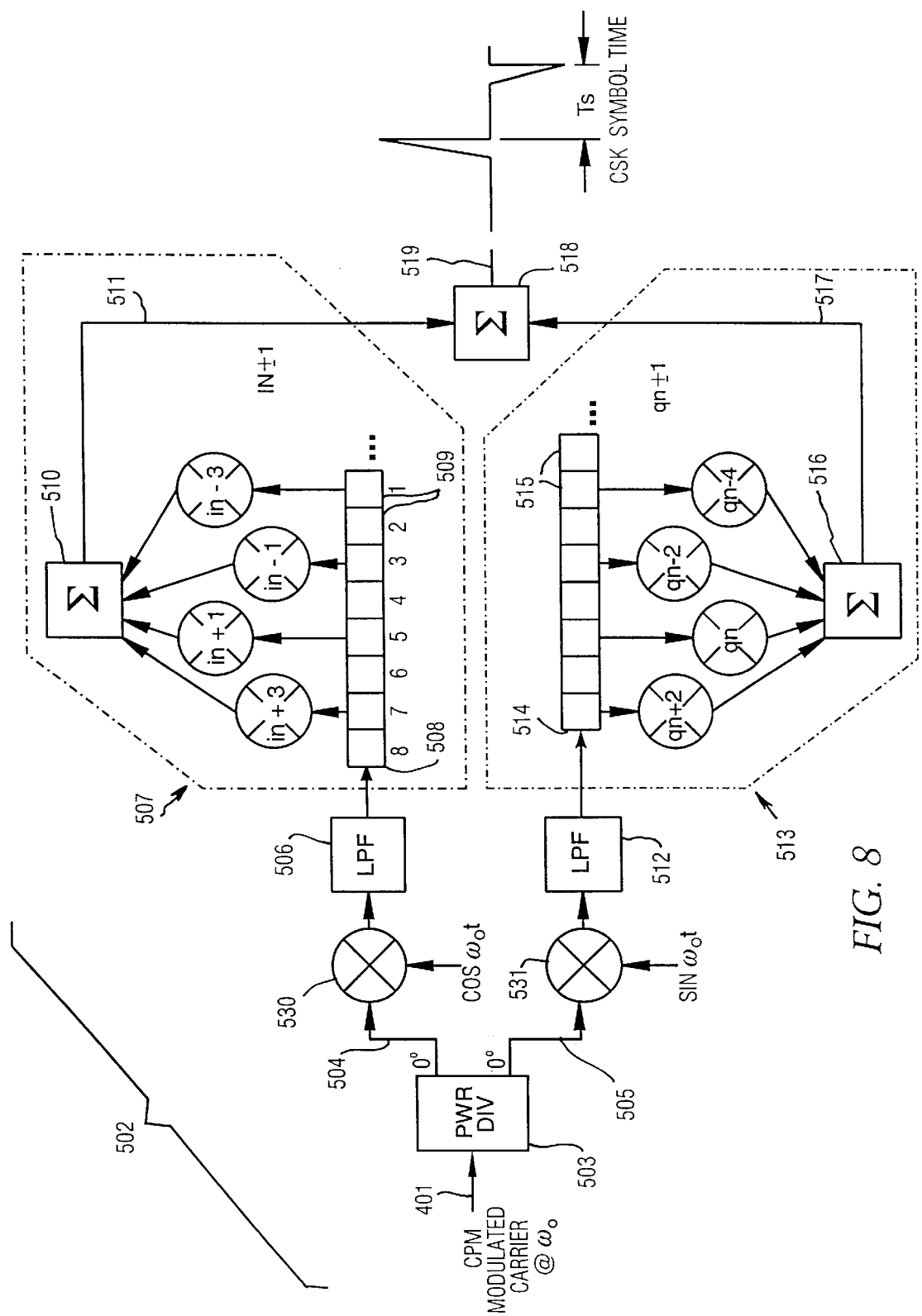
FIG. 8 is a block diagram showing another embodiment of a spread spectrum receiver.

FIG. 8 is a block diagram of a coherent spread spectrum receiver.

The received signal s*(t) 401 in the receiver of FIG. 8 is coupled to a CPM correlator 502 for recognizing a chip sequence in the received signal s*(t) 401. The CPM correlator 502 comprises a power divider 503, which produces duplicate signals 504 and 505, each with a 0 degree phase delay. Such power dividers are known in the art and are generally preferred for the CPM correlator 502 over the power divider 403 shown in FIG. 7. While a phase delay of 90 degrees between i*(t) and q*(t) was imposed by use of the power divider 403 in FIG. 7, a 90-degree phase delay in the FIG. 8 embodiment is produced by separately multiplying the signals 504 and 505 with cosine and sine signals, respectively.

The signal 504 is multiplied with a cos $\omega_0 t$ signal by I multiplier 530 and filtered by a I low pass filter 506 to provide an i*(t) signal. The signal 505 is multiplied by a sin $\omega_0 t$ signal by Q multiplier 531 and filtered by a Q low pass filter 512 to provide a q*(t) signal.

The outputs of the I low pass filter 506 and the Q low pass filter 512 generally appear for MSK as half sinusoidal waveforms corresponding to those generated in the transmitter from P(t) generators 305, 306.

The i*(t) signal output from I low pass filter 506 is coupled to an I correlator 507. The I correlator 507 comprises a register 508 having a sequence of chips 509. The register 508 may be an analog shift register, a tapped delay line having a plurality of taps, or any other suitable storage means. The odd chips are coupled by a plurality of multipliers to an I summer 510, which combines its inputs and produces an output I correlation signal 511.

Figure 23:
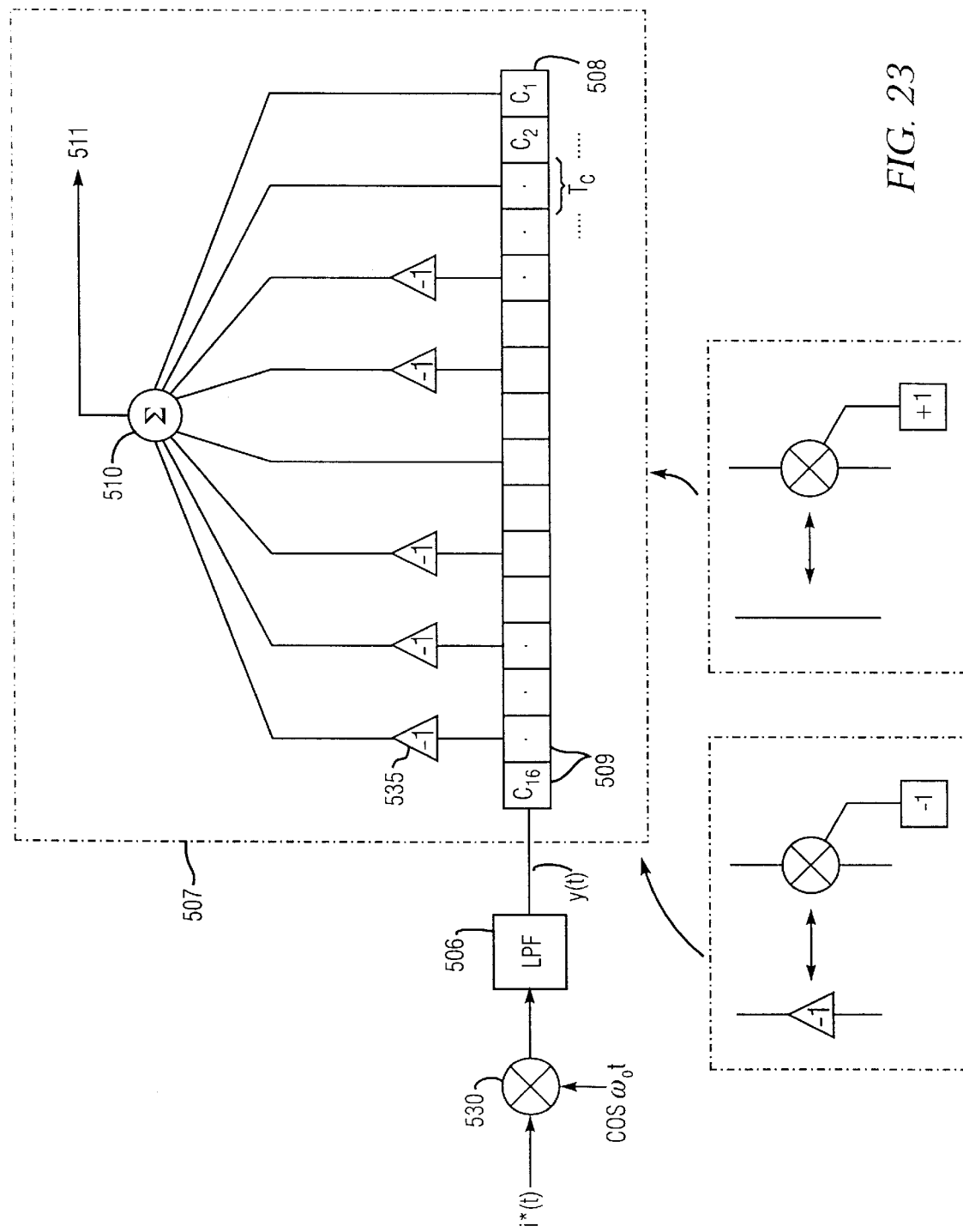
FIG. 23 is a block diagram of a correlator matched to a specific code sequence.

An example of the path of the I correlator 507 is shown in FIG. 23. As described with respect to FIG. 8, the filtered i*(t) signal is coupled to a register 508. The register 508 comprises a series of chips 509 along which the filtered i*(t) signal propagates. The register 508 is matched to a particular code sequence. Thus, in the example of FIG. 23, the sequence of odd chips which will result in a match is $C_{odd}(t)=11001000$. At time t=16Tc, the first chip $C_1$ is compared with the first chip in the sequence of $C_{odd}(t)$, and a "1" is generated if the chips are equal. Each of the other odd chips in the register 508 is likewise compared against the programmed sequence. A comparison between any two chips may be carried out using a multiplier or an exclusive-OR gate. The comparison values are provided to a summer 510 which generates a maximum pulse when the chip sequence for which the correlator 507 has been programmed matches the received chip sequence. In FIG. 23, the branches having a "−1" correspond to chips for which a "0" in the received chip sequence will generate a match, while the other branches correspond to chips for which a "1" in the received chip sequence will generate a match.

Returning to FIG. 8, the q*(t) signal output from the Q low pass filter 512 is coupled to a Q correlator 513. The Q correlator 513 similarly comprises a register 514 having a sequence of chips 515. As with the odd chips in the I correlator 507, the even chips are coupled to a Q summer 516, which combines its inputs and produces an output Q correlation signal 517.

The I correlation signal 511 and the Q correlation signal 517 are coupled to a summer 518, which combines its inputs and produces a unified correlation signal 519. Because the I correlation signal 511 is derived from the odd chips while the Q correlation signal 517 is derived from the even chips (which precede the odd chips by one chip time Tc), the correlation signals 511, 517 occur simultaneously, and there is no need for a separate delay element such as delay 406 shown in FIG. 7. The unified correlation signal 519 is used to determine a data stream d(t) from which the chip sequence c(t) was generated in a manner similar to that explained above with reference to FIG. 7.

The FIG. 8 receiver operates best with a coherent carrier reference $\omega_0$ and assumes such is available. Methods are known in the art for obtaining a coherent carrier reference, such as the use of phase estimating circuitry. Where very rapid acquisition times are necessary, such as in certain high-speed time division multiple access (TDMA) systems using CPM spread spectrum techniques, other embodiments (such as the non-coherent receiver embodiments described herein) may generally be preferred.

In a non-coherent CPM system, the receiver 108 of FIG. 1 may not have available an exact copy of the carrier signal at frequency $\omega_0$ used by the transmitter 101. Rather, the receiver 108 generates a local carrier signal having a frequency $\omega_1$, which in practice may differ in frequency and phase from the transmitter's carrier signal:

$$\cos \omega_1 t = \cos (\omega_0 + \Delta\omega)t + \theta \qquad (603)$$

where $\Delta\omega$=frequency difference and $\theta$=phase difference.

Figure 10:
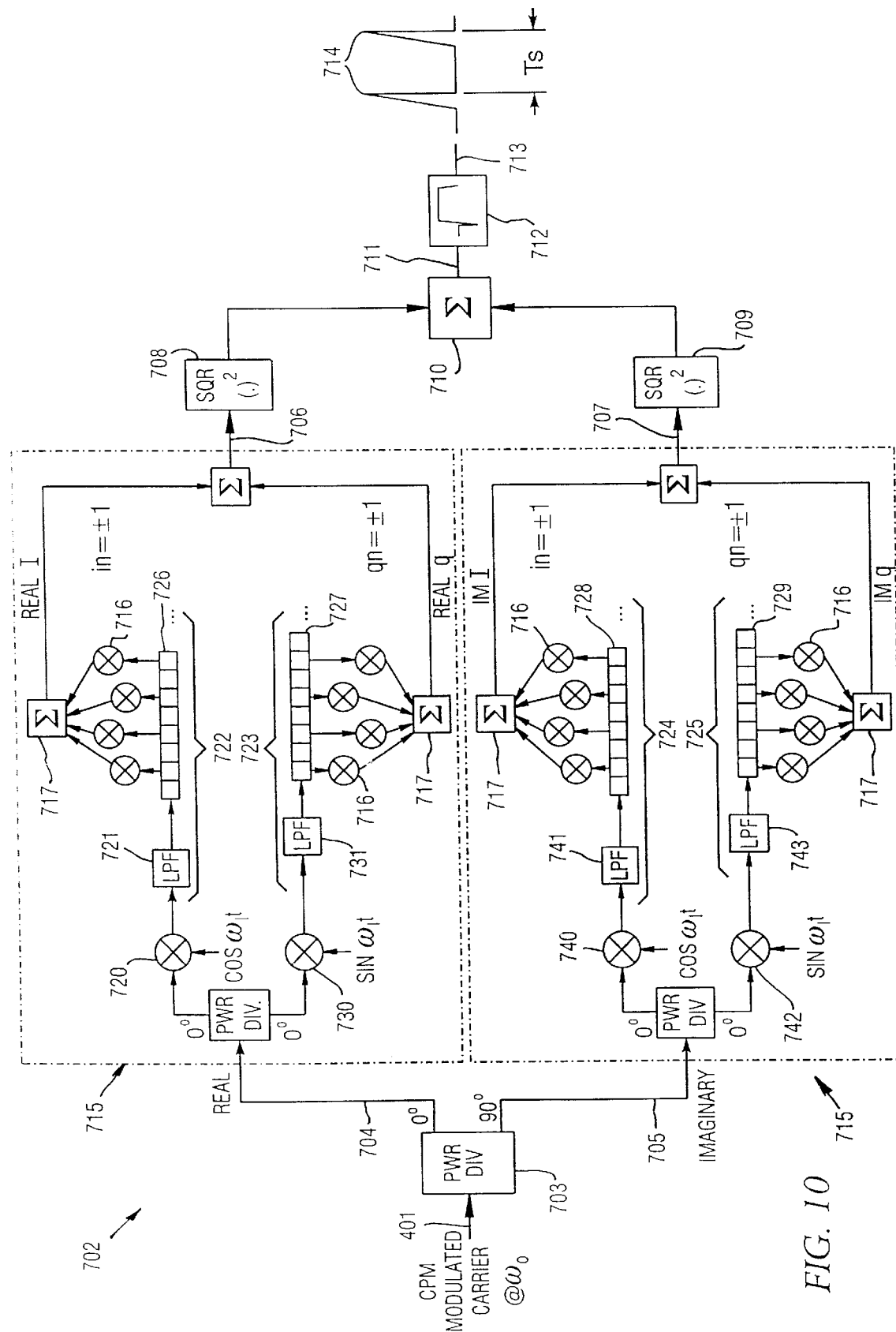
FIG. 10 is a block diagram of an embodiment of a spread spectrum receiver using separable real and imaginary parts of a received spread spectrum signal.

FIG. 10 is a block diagram of a non-coherent spread spectrum receiver for receiving and despreading a CPM spread spectrum signal without the need for a locally generated coherent reference signal $\omega_0$. The receiver of FIG. 10 can be used to process a received CPM signal by splitting the received spread spectrum signal into separable real and imaginary parts, splitting the real and imaginary parts into I and Q portions, mixing the real I and Q portions and the imaginary I and Q portions with a non-coherent reference signal having a frequency near that expected of the received signal to obtain real I and Q streams and imaginary I and Q streams, filtering the multiplied signals, correlating separately the I and Q streams for each of the real and imaginary parts to obtain a real I and Q correlation pulse and an imaginary I and Q correlation pulse, combining the I and Q correlation pulses separately for the real and imaginary parts to provide a combined real and a combined imaginary correlation signal, squaring the combined real and imaginary correlation signals to generate a squared real and a squared imaginary correlation pulse, and combining the squared real and imaginary correlation signals into a unified correlation signal.

Figure 9:
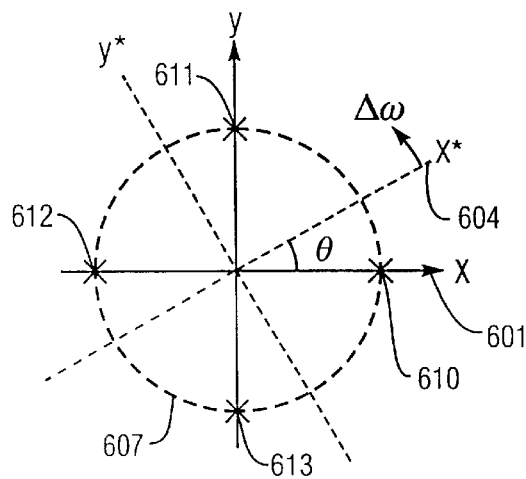
FIG. 9 is a scatter diagram comparing transmitted and received I and Q signals.

The operation of the receiver of FIG. 10 may be explained graphically with reference to FIG. 9, which is a scatter diagram comparing real and imaginary values as transmitted and as received in a non-coherent receiver. For simplicity, the explanation below assumes the transmission channel to be distortionless and have unlimited bandwidth. The transmitter's coordinate system 601 is represented by an x-axis and y-axis, with the x-axis representing values of i(t) and the y-axis representing values of q(t). A set of four points 610 through 613 represents transmitted sampled value pairs for <i($t_n$),q($t_n$)>. The pairs 610 through 613 represent coordinates <1,0>, <0,1>, <−1, 0>, and <0,−1>, respectively.

A receiver's coordinate system 604 is represented by an x*-axis and a y*-axis shown as dashed lines in FIG. 9. The receiver's coordinate system 604 is assumed to differ from the transmitter's coordinate system 601 due to frequency and phase differences. The receiver's coordinate system 604 rotates with respect to the transmitter's coordinate system 601 at a rate proportional to $\Delta\omega$, the frequency difference ("beat frequency") between the transmitter and receiver reference signals. For sufficiently small $\Delta\omega$ (such as may be expected for the time period of interest over which correlation for a data symbol will occur—e.g., 32 chip periods), the receiver's coordinate system 604 approximately equals the transmitter's coordinate system 601, except for a phase difference $\theta$ which remains relatively constant for short periods of time. In order to maintain such a condition, the beat frequency $\Delta\omega$ preferably should be less than about ¼ the symbol rate. For example, with a symbol rate of 156.25 k symbols/second (5 Mchips/second), the beat frequency $\Delta\omega$ should be less than about 39 kHz for optimal operation.

Because the receiver's coordinate system 604 at a given instant appears rotationally shifted with respect to the transmitter's coordinate system 601, the <i*($t_n$),q*($t_n$)> sampled pair recognized by the receiver 108 will be a point on the circle 607 corresponding to an <i($t_n$),q($t_n$)> sampled pair in the transmitter's coordinate system 601 but shifted around circle 607 by an amount dependent on the phase difference $\theta$. Accordingly, the perceived real value or i*(t) will differ from the transmitted i(t) value by an amount dependent upon cos $\theta$ due to the rotational difference between the coordinate systems 601 and 604, while the perceived imaginary value or q*(t) will also differ from the transmitted q(t) value by an amount dependent upon sin $\theta$ for the same reason. Thus, if the transmitted <i(n), q(n)> sampled values are <1, 0> and the phase offset $\theta$ is +30°, the received <i*($t_n$), q*($t_n$)> sampled values are <cos +30°, sin +30°> or <0.866, 0.5>. Likewise, if the phase offset $\theta$ is +90° for the same transmitted values, the received <i*($t_n$), q*($t_n$)> sampled values are <0, 1>.

From the above explanation, it is apparent that a correlator attempting to correlate for I and Q portions would be faced with a diminishing i*(t) value as $\theta$ varies from 0 to 90 degrees, yet at the same time an increasing q*(t) value. As $\theta$ grows, eventually the difference between <i(t), q(t)> and <i*(t), q*(t)> becomes so large that accurate correlation is cumbersome. Because of the phase difference $\theta$, it is generally not possible to know in advance which quadrant of FIG. 9 the received signal s*(t) will be in relative to the transmitter's coordinate system 601. However, the present invention in one aspect addresses this problem by utilizing both real and imaginary parts of I and Q portions in order to despread the received s*(t) signal.

It may be noted that as the real portion of i*(t) decreases as $\theta$ varies from 0 to 90 degrees, the imaginary portion of i*(t) increases. Similarly, as the real portion of i*(t) increases (in magnitude) as $\theta$ varies from 90 to 180 degrees, the imaginary portion of i*(t) decreases. A similar phenomenon occurs with the real and imaginary portions of q*(t). The receiver of FIG. 10 takes advantage of the complementary aspects of the real and imaginary portions of the received i*(t) and q*(t) signal portions, and accordingly analyzes both the real and imaginary parts of the I and Q signals in order to make an effective correlation.

In the FIG. 10 embodiment, the received signal s*(t) 401 is coupled to a non-coherent CPM correlator 702 for recognizing a correlation sequence in the received signal s*(t) 401. The non-coherent CPM correlator 702 comprises a power divider 703, which produces duplicate signals Real*(t) 704 having a 0-degree phase delay and Imag*(t) 705 having a 90-degree phase delay. Real*(t) 704 and Imag*(t) 705 may be viewed as the real and imaginary parts of the received signal s*(t) 401.

The Real*(t) signal 704 is coupled to a CPM correlator 715 similar to CPM correlator 502 of FIG. 8, with the exception that the local reference signal is different, as described below. The CPM correlator 715 produces a real correlation signal 706. The Imag*(t) signal is coupled to a second CPM correlator 715 which produces an imaginary correlation signal 707. The real correlation signal 706 is coupled to a squaring device 708, which computes the square of its input. The imaginary correlation signal 707 is likewise coupled to a squaring device 709, which computes the square of its input. The outputs of the squaring devices 708 and 709 are coupled to a summer 710, which combines its inputs to produce a unified correlation signal 711 which is the sum of the squares of the real correlation signal 706 and the imaginary correlation signal 707. The unified correlation signal 711 is coupled to a square root device 712 which takes the square root of its input, and generates a final correlation signal 713 comprising correlation pulses 714. The time between correlation pulses 714 may be one symbol code time period Ts if CSK is employed.

A primary difference between the CPM correlators 715 shown in FIG. 10 and the CPM correlator 502 of FIG. 8 is that the CPM correlators 715 of FIG. 10 utilize non-coherent reference signals cos $\omega_1 t$=cos $(\omega_0+\Delta\omega)t+\theta$ and sin $\omega_1 t$=sin $(\omega_0+\Delta\omega)t+\theta$ for the I and Q portions, respectively, rather than cos $\omega_0 t$ and sin $\omega_0 t$ as generated in the coherent receiver of FIG. 8. The reference signals cos $\omega_1 t$ and sin $\omega_1 t$ may be generated from the same oscillator coupled to a power divider to keep the phase offset $\theta$ the same for both cos $\omega_1 t$ and sin $\omega_1 t$. The use of non-coherent reference signals causes the correlation signal generated by each CPM correlator 715 to have a magnitude dependent in part upon the phase difference $\theta$.

The effect of using non-coherent reference signals on the ability to achieve correlation may be explained first with reference to the I portion of the Real*(t) signal 704. The Real*(t) signal 704 may be represented as:

$$\text{Real}^*(t) = Re\{Au(t) \exp(-j\omega_0 t)\}$$

where, as mentioned previously, u(t)=i(t)+jq(t), which is the complex envelope of s(t), and Re $\{\}$ denotes the real portion of a complex value. The Real*(t) signal 704 is multiplied by multiplier 720 with a locally generated reference signal cos $\omega_1 t$=cos $(\omega_0+\Delta\omega)t+\theta$, so that the output of multiplier 720 is:

$$Re\{Au(t) \exp(-j\omega_0 t)\} \cos \omega_1(t)$$

The output of the multiplier 720 is coupled to a low pass filter 721 which retains the baseband portion of the signal coupled to its input. Assuming that the non-coherent reference signal cos $\omega_1 t$ differs from the transmitter reference frequency $\omega_0$ by only a phase difference (i.e., that the frequency change is negligible over the time period of interest), then the receiver reference signal may be expressed as:

$$\cos \omega_1 t = \cos(\omega_0 t + \theta)$$

The output y(t) of the low pass filter 721 may therefore be expressed as:

$$\begin{aligned} y(t) &= LPF[Re\{Au(t)\exp(-j\omega_0 t)\}\cos\omega_1(t)] \quad (790)\\ &= LPF[Re\{Au(t)\exp[j(-\omega_0 t + \omega_1 t)]\}]\\ &= (A/2)i(t)\cos(\omega_0 + \omega_1 t)t + (A/2)q(t)\sin(\omega_0 t + \omega_1 t)\\ &= (A/2)i(t)\cos(-\theta) + (A/2)q(t)\sin(-\theta)\\ &= (A/2)i(t)\cos\theta - (A/2)q(t)\sin\theta \end{aligned}$$

where "LPF" denotes operation of the low pass filter 721.

By similar deduction the output z(t) of the low pass filter 731 of the Q portion of the Real*(t) signal is as follows:

$$z(t)=(A/2)i(t)\sin(-\theta)+(A/2)q(t)\cos(-\theta)=(-A/2)i(t)\sin\theta+(A/2)q(t)\cos\theta \quad (791)$$

Due to the 90-degree phase shift in signal 705, the output of low pass filter 741 of the I portion of the Imag*(t) signal is equal to z(t) as derived above, while the output of low pass filter 743 of the Q portion of the Imag*(t) signal is equal to the inverse of y(t) as derived above.

In operation, each of the four correlators 722 through 725 may contribute to correlation of the received CPM signal $s^*(t)$. Operation of the non-coherent CPM correlator 702 may be shown through several examples. As a first example, assume that the phase offset $\theta=0°$; therefore, the outputs $y(t)$ and $z(t)$ for low pass filters 721 and 731, respectively, reduce to the following:

$$y(t)=(A/2)i(t)$$

and $$z(t)=(A/2)q(t)$$

Figure 11:
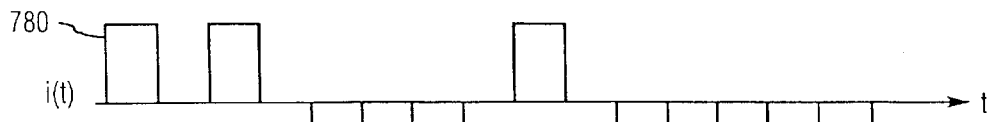
FIGS. 11A–11F are diagrams showing a representation of transmitted and received waveforms for different phase values.

Selecting an amplification factor $A=2$, the filter outputs of filters 721 and 731 then become $y(t)=i(t)$ and $z(t)=q(t)$. Assuming, for convenience, a code sequence length of 16 chips, then after 16 chip times (i.e., 16Tc) the entire sequence is contained within the correlation registers 726, 727, 728, and 729 in each CPM correlator 705. An illustrative chip stream $c(t)=1111010110010000$ may be broken into sub-sequences $C_{odd}(t)=11001000$ and $C_{even}(t)=11110100$. It will further be assumed for sake of explanation that the waveform generator P(t) of the transmitter generates a return-to-zero (RZ) rectangular waveform having a duration of two chip periods, so that the transmitted i(t) and q(t) signals may be depicted as shown in FIGS. 11A and FIG. 11B, respectively. Operation of the FIG. 10 correlator using CPM baseband signals instead of RZ signals can be understood by observing that at time $t=16Tc$, the peak values of the sinusoidal waveforms appear in the correlation registers 726, 727, 728 and 729, and correspond to the pulse height of the RZ waveform.

At the receiving end, the contents of the correlation registers 726 and 727 may be represented as shown in FIGS. 11C and 11D, respectively. It can be seen that the waveform of FIG. 11C as reading from right to left is the same as that of FIG. 11A as reading from left to right. Similarly, the waveforms of FIGS. 11B and 11D bear the same relationship. An output for each of the four correlators 722, 723, 724 and 725 may be obtained by pointwise multiplication of the chip values with the chip weighting factors 716 for each chip, and summation of the chip products by summers 717 to produce a correlation signal. The chip weighting factors 716 for correlator 725 are opposite in sign to the values for correlator 723. The chip weighting factors 716 for correlators 722 and 724 are the same sign.

Continuing with the present example in which $\theta=0°$, the output at time $t=16Tc$ for each of correlators 722 and 723, corresponding respectively to the I portion ("ReI") and the Q portion ("ReQ") of the Real*(t) signal, is eight, while the output for each of correlators 724 and 725, corresponding respectively to the I portion ("ImI") and the Q portion ("ImQ") of the Imag*(t) signal, is 0. The final correlation signal 713 at the instant 16Tc is:

$$\begin{aligned}Corr(t=16Tc) &= \{(ReI+ReQ)^2+(ImI+ImQ)^2\}^{1/2}\\ &= \{(8+8)^2\}^{1/2} = 16\end{aligned}$$

The value of 16 is a maximum value indicating correlation for the particular chip sequence. If multiple codes are to be recognized, a plurality of non-coherent CPM correlators 702 may operate in parallel, each programmed to recognize a different code. The chip sequence corresponding to the highest correlation signal may be selected as the received chip sequence.

Assuming as a second example that $\theta=30°$, the contents of correlation registers 726 and 727 appear as shown in FIGS. 11E and 11F, respectively. Selecting the amplification factor $A=2$, the outputs $y(t)$ and $z(t)$ of low pass filters 721 and 731, respectively, may be represented as:

$$\begin{aligned}y(t) &= (A/2)i(t)\cos(30°) - (A/2)q(t)\sin(30°)\\ &= i(t)(0.866) - q(t)(0.5)\end{aligned}$$

and $$\begin{aligned}z(t) &= (-A/2)i(t)\cos(30°) + (A/2)q(t)\sin(30°)\\ &= -i(t)(0.5) + q(t)(0.866)\end{aligned}$$

Pointwise vector multiplication of each of the chip valves in the correlation registers 726 through 729 with corresponding chip weights 716 yields the following outputs from summers 717:

$$ReI = (1)(0.866)+(1)(0.866)+(-1)(-0.866)+(-1)(-0.866)\ldots =$$
$$(8)(0.866)=6.928$$
$$ReQ = (1)(0.866)+(1)(0.866)+(1)(0.866)\ldots =(8)(0.866)=6.928$$
$$ImI = (1)(-0.5)+(1)(-0.5)+(-1)(0.5)+(-1)(0.5)\ldots =$$
$$-(8)(0.5)=-4.0$$
$$ImQ = (1)(-0.5)+(1)(-0.5)+(1)(-0.5)+(1)(-0.5)\ldots =$$
$$-(8)(0.5)=-4.0$$

A final correlation signal 713 therefore is generated:

$$Corr\ (t=16Tc)=\{(6.928+6.928)^2+(-4+-4)^2\}^{1/2}=16$$

Thus, for a phase offset of $\theta=30°$, the value of the final correlation signal 713 at $t=16Tc$ remains at the maximum level of 16.

As another example, a phase offset $\theta=45°$ is assumed. The outputs $y(t)$ and $z(t)$ of low pass filters 721 and 731, respectively, become:

$$y(t)=i(t)(0.707)-q(t)(0.707)$$

and $$z(t)=-i(t)(0.707)+q(t)(0.707)$$

Solving for the intermediate values ReI, ReQ, ImI, and ImQ yields:

$$ReI = (1)(0.707)+(1)(0.707)\ldots=(8)(0.707)=5.657$$
$$ReQ = (1)(0.707)+(1)(0.707)\ldots=(8)(0.707)=5.657$$
$$ImI = (1)(-0.707)+(1)(-0.707)\ldots=-(8)(0.707)=-5.657$$
$$ImQ = (1)(-0.707)+(1)(-0.707)\ldots=-(8)(0.707)=-5.657$$

A final correlator signal 713 is generated:

$$Corr\ (t=16Tc)=\{(2\times5.657)^2+(2\times-5.657)^2\}^{1/2}=16$$

Again, maximum correlation of 16 is realized even though the phase offset $\theta$ is not equal to 0.

A table can be constructed of (ReI+ReQ), (ImI+ImQ) values and correlation values versus phase offset $\theta$ for the correlator of FIG. 10:

| θ | $R_i + R_q$ | $I_i + I_q$ | Corr= |
|---|---|---|---|
| 0° | 16 | 0.0 | 16.0 |
| 30 | 13.856 | −8.0 | 16.0 |
| 45 | 11.314 | −11.314 | 16.0 |
| 60 | 8.0 | −13.856 | 16.0 |
| 90 | 0.0 | −16.0 | 16.0 |
| 120 | −8.0 | −13.856 | 16.0 |
| 135 | −11.314 | −11.314 | 16.0 |
| 150 | −13.856 | −8.0 | 16.0 |
| 180 | −16.0 | 0.0 | 16.0 |
| 210 | −13.856 | 8.0 | 16.0 |
| 225 | −11.314 | 11.314 | 16.0 |
| 240 | −8.0 | 13.856 | 16.0 |
| 270 | 0.0 | 16.0 | 16.0 |
| 300 | 8.0 | 13.856 | 16.0 |
| 315 | 11.314 | 11.314 | 16.0 |
| 330 | 13.856 | 8.0 | 16.0 |

As the phase offset θ increases beyond 45°, a higher percentage of the correlation value begins to come from the Imag*(t) signal path 705 rather than the Real*(t) signal path 704 of the non-coherent CPM correlator 702. At a phase offset of θ=90°, for example, all correlation is coming from the Imag*(t) signal path 705 and none from the Real*(t) signal path 704. The output 706 of the real CPM correlator 715 and output 707 of the imaginary CPM correlator 715 progress sinusoidally as a function of the phase offset θ and can be expressed as:

Real * (t) correlation = 16cosθ

Imag * (t) correlation = −16sinθ

Corr = $\{(16\cos\theta)^2 + (-16\sin\theta)^2\}^{1/2}$ = 16

Thus, maximum correlation of 16 will be achieved regardless of the phase offset θ. The use of multiple correlators as configured in the manner shown in FIG. 10 allows successful correlation regardless of which quadrant of FIG. 9 the receiver operates with respect to the transmitter.

It should be noted that at chip times other than multiples of 16Tc (for the example of chip sequence of 16 chips), the correlation output will be a function of the cross correlation value between the $i(t_n)$ and $q(t_n)$ subcodes. The non-coherent CPM correlator of FIG. 10 should perform no worse as far as cross-correlation than a bi-phase correlator with the same code. In other words, if a given code produces a maximum time sidelobe value of 4/16 through bi-phase correlation, then the worst time sidelobe to be expected from the FIG. 10 correlator should also be 4/16.

Figure 12:
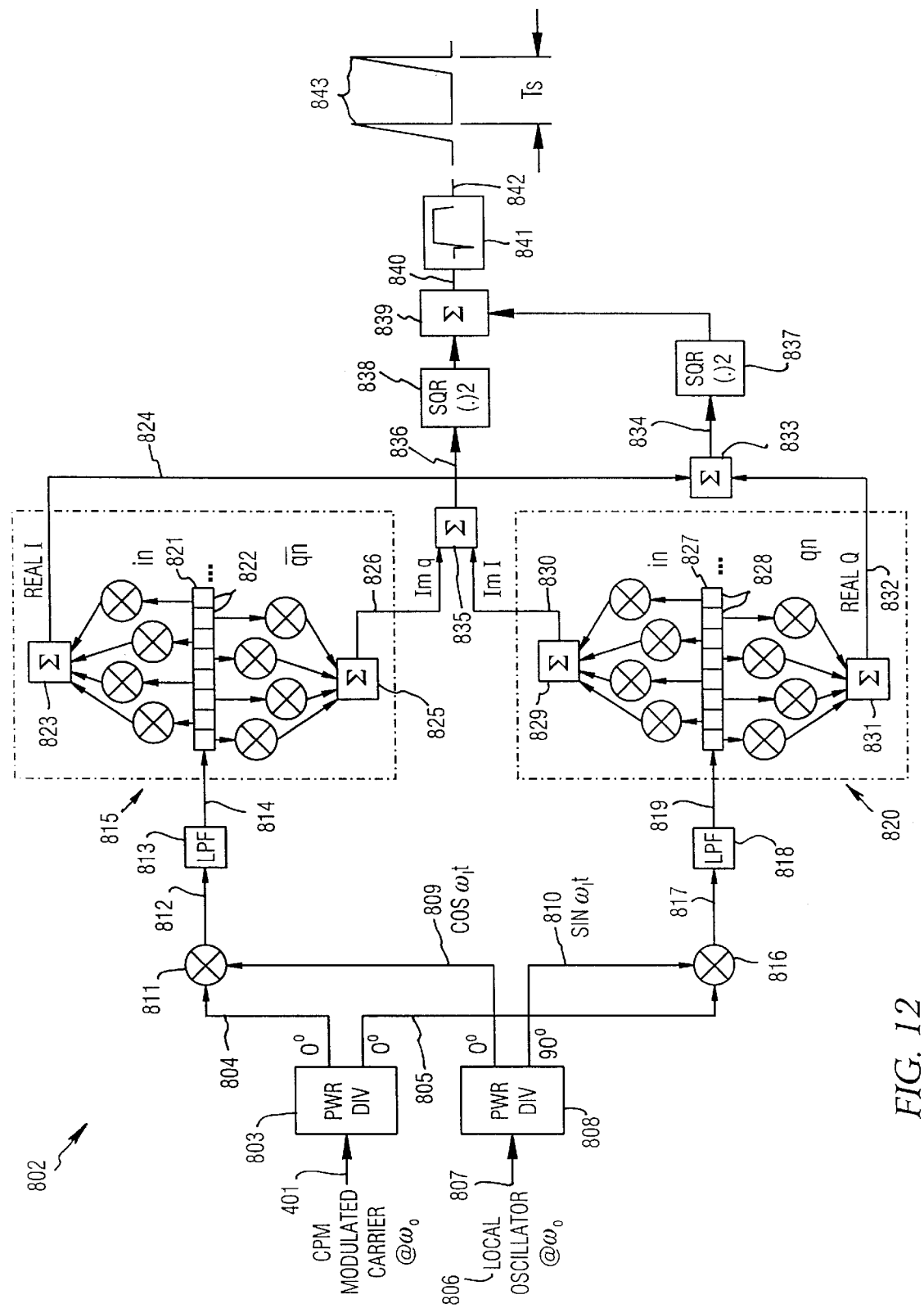
FIG. 12 is a block diagram of another embodiment of a spread spectrum receiver using separable real and imaginary parts of a received spread spectrum signal.

FIG. 12 is a block diagram of another embodiment of a non-coherent spread spectrum correlator using separable real and imaginary parts of the received spread spectrum signal. The FIG. 12 correlator uses only two shift registers instead of four shift registers and uses only a single power divider having no imposed phase delay for operating on the received signal s*(t) as opposed to three power dividers in the non-coherent correlator illustrated in FIG. 10. The use of a power divider having no imposed phase delay on the received signal s*(t) is an advantage because power dividers which impose a phase delay on the received signal typically operate optimally over only a relatively narrow bandwidth, while the received signal may cover a relatively wide bandwidth.

In FIG. 12, the received signal s*(t) 401 is coupled to a two-register non-coherent CPM correlator 802 for recognizing a chip sequence in the received signal s*(t). The two-register non-coherent CPM correlator 802 comprises a first power divider 803, which produces duplicate signals 804 and 805, each with a 0-degree phase delay. A local oscillator 806 produces a local carrier signal cos $\omega_1$t 807, which is coupled to a second power divider 808. The second power divider 808 produces duplicate signals, one signal 809 with a 0-degree phase delay, and another signal 810 with a 90-degree phase delay. The use of the second power divider 808 to generate signals cos $\omega_1$ and sin $\omega_1$ from the same local oscillator 806 maintains the phase offset θ between $\omega_1$ and $\omega_0$ for both cos $\omega_1$ and sin $\omega_1$.

The signals 804 and 809 are coupled to a first multiplier 811, which combines its inputs and produces a first product signal 812. The first product signal 812 is coupled to a first low pass filter 813, which produces a first filtered signal 814 which retains its baseband frequency components. The first filtered signal 814 is coupled to a first even-odd correlator 815.

The signals 805 and 810 are similarly coupled to a second multiplier 816, which combines its inputs and produces a second product signal 817. The second product signal 817 is similarly coupled to a second low pass filter 818, which produces a second filtered signal 819 which retains its baseband frequency components. The second filtered signal 819 is similarly coupled to a second even-odd correlator 820.

In the two-register non-coherent CPM correlator 802 depicted in FIG. 12, the Q portion of the Real*(t) signal is the same as the I portion of the Imag*(t) signal, and the Q portion of the Imag*(t) signal is 180-degrees out of phase (i.e., the inverse) of the I portion of the Real*(t) signal. The Q portion of the Real*(t) signal and the I portion of the Imag*(t) signal are stored in and read from the same register 821. Similarly, the Q portion of the Imag*(t) signal and the I portion of the Real*(t) signal are stored in and read from the same register 827. The two-register non-coherent CPM correlator 802 of FIG. 12 operates in a conceptually similar manner to the non-coherent CPM correlator 702 of FIG. 10.

The first even-odd correlator 815 simultaneously recognizes the real i*(t) components and the imaginary q*(t) components, and comprises a register 821 capable of holding a sequence of chips 822. The odd chips are coupled to a real I summer 823, which combines its inputs and produces a real I correlation signal 824. The even chips are coupled to an imaginary Q summer 825, which combines its inputs and produces an imaginary Q correlation signal 826.

The second even-odd correlator 820 simultaneously recognizes the imaginary i*(t) components and the real q*(t) components, and comprises a register 827 capable of holding a sequence of chips 828. The odd chips are coupled to an imaginary I summer 829, which combines its inputs and produces an imaginary I correlation signal 830. The even chips are coupled to a real Q summer 831, which combines its inputs and produces a real Q correlation signal 832.

The real I correlation signal 824 and the real Q correlation signal 832 are coupled to a real summer 833, which combines its inputs and produce a real correlation signal 834. Similarly, the imaginary Q correlation signal 826 and the imaginary I correlation signal 830 are coupled to an imaginary summer 835, which combines its inputs and produces an imaginary correlation signal 836.

Figure 22:
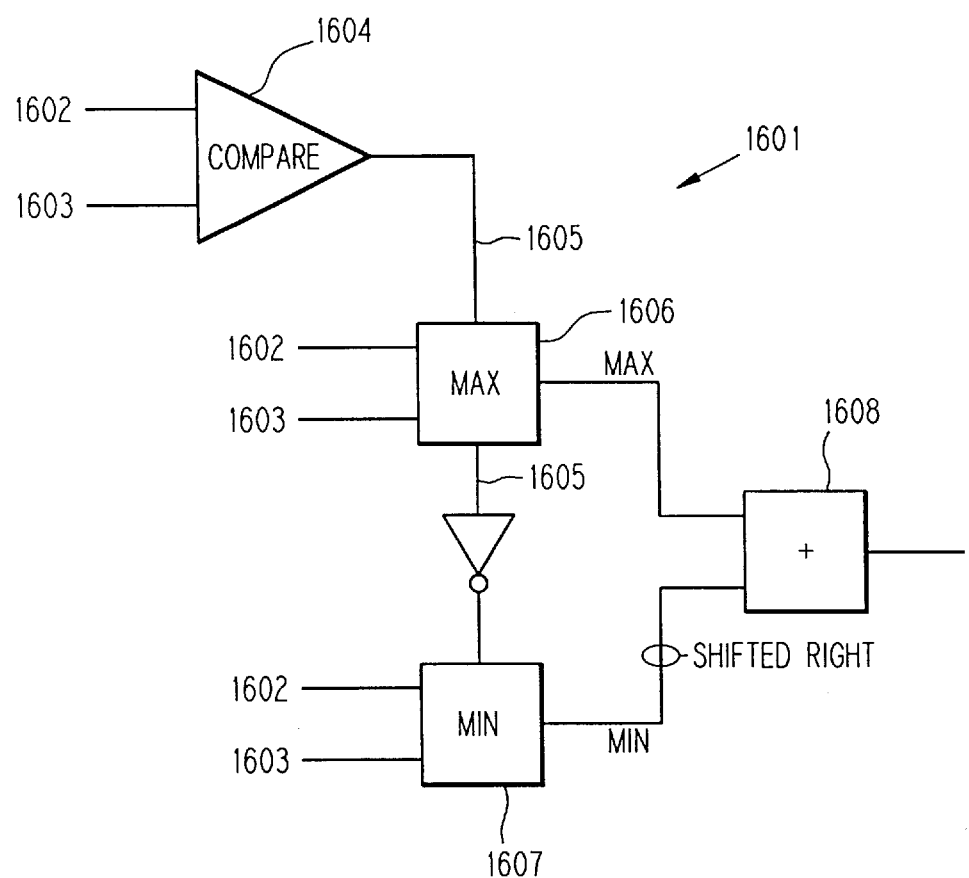
FIG. 22 is a block diagram of a Robertson device for computing a sum of the squares of its inputs.

The real correlation signal 834 is coupled to a squaring device 837, which computes the square of its input. The imaginary correlation signal 836 is coupled to a squaring device 838, which computes the square of its input. The two squared values are coupled to a summer 839, which combines its inputs and produces a unified correlation signal 840 representing the sum of the squares of the real correlation signal 834 and the imaginary correlation signal 836. The unified correlation signal 840 is coupled to a square root device 841 which takes the square root of its input and generates a final correlation signal 842. The squaring devices 837 and 838, the summer 839, and the square root device 841 collectively compute the root of the sum of the squares of the real and imaginary signals. A Robertson device such as depicted in FIG. 22 and described elsewhere herein may be used to estimate the root of the sum of the squares. The time between separate correlation pulses 843 may be one symbol code time period Ts if CSK is used.

It should be noted that in the non-coherent CPM correlator 702 of FIG. 10 and the two-register non-coherent CPM correlator 802 of FIG. 12, the process of squaring destroys polarity information.

Figure 13A:
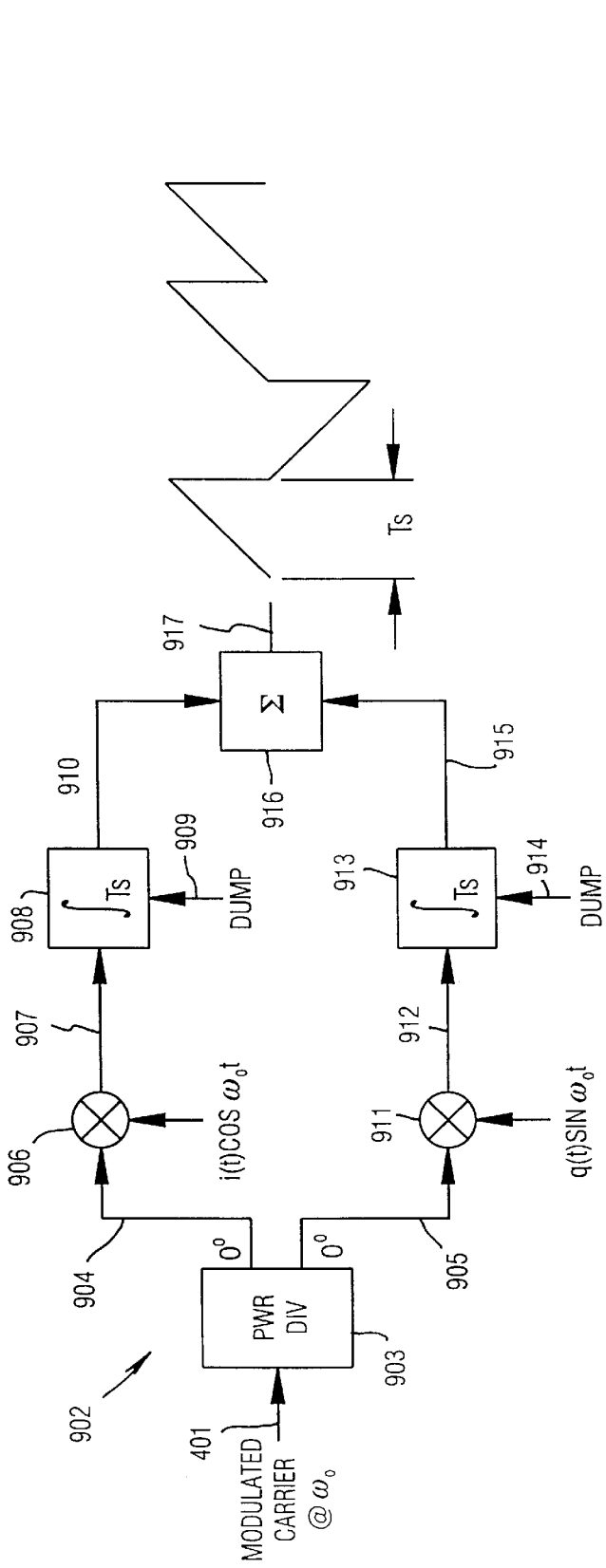
FIG. 13A is a block diagram of an embodiment of a spread spectrum receiver using serial correlation.

FIG. 13A is a block diagram of a spread spectrum receiver using serial correlation.

The received signal s*(t) 401 is coupled to a coherent serial CPM correlator 902 for recognizing a correlation sequence in the received signal s*(t) 401.

The coherent serial CPM correlator 902 of FIG. 13A comprises a power divider 903, which produces duplicate signals 904 and 905 with a 0-degree phase delay. The signal 904 is coupled to an I multiplier 906. The other input of the I multiplier 906 is coupled to a locally generated signal i(t) cos $\omega_0 t$, that is, the carrier signal combined with the I chip sequence of the correlation sequence. The signal 905 is coupled to a Q multiplier 911, which is coupled to a locally generated signal q(t) sin $\omega_0 t$, that is, the carrier signal combined with the Q chip sequence of the correlation sequence. The coherent serial CPM correlator of FIG. 13A uses a coherent reference signal having a frequency $\omega_0$.

Figure 13B:
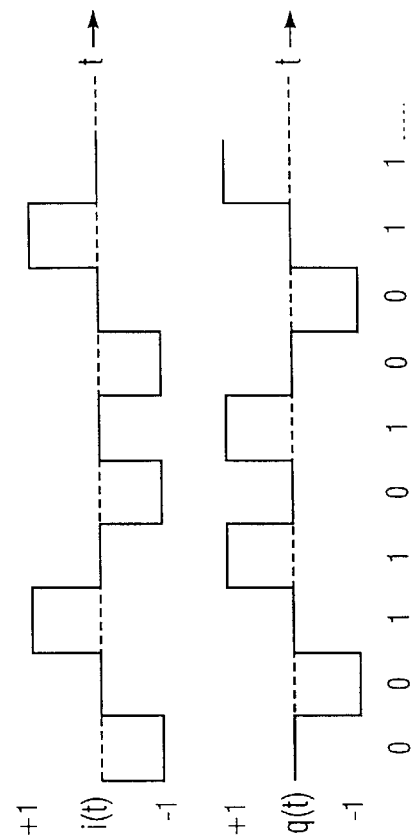
FIG. 13B is a waveform diagram associated therewith.

The i(t) signal, which is the waveform representing the I chip sequence, and the q(t) signal, which is the waveform representing the Q chip sequence, each comprise tri-valued return to zero (RZ) waveforms, that is, they are +1 to indicate a logical "1", −1 to indicate a logical "0", and 0 to indicate no value, as shown in FIG. 13B. The i(t) signal and the q(t) signal are offset by one chip time from each other in the sense that the i(t) signal has a value of +1 or −1 at each odd chip time but is 0 during the even chip times, and the q(t) signal has a value of +1 or −1 at each even chip time but is 0 during the odd chip times.

The I multiplier 906 combines its inputs and produces an I product signal 907. The I product signal 907 is filtered by a low pass filter (not shown) and is coupled to an I integrator 908, which integrates its input and dumps the sum under control of a control input 909. The I integrator 908 produces an I correlation signal 910.

The Q multiplier 911 combines its inputs and produces a Q product signal 912. The Q product signal 912 is filtered by a low pass filter (not shown) and coupled to a Q integrator 913, which integrates its input and dumps the sum under control of a control input 914. The Q integrator 913 produces a Q correlation signal 915. Because the i(t) signal and the q(t) signals are tri-valued return to zero waveforms, only one of the integrators 908, 913 changes value at a time.

The I correlation signal 910 and the Q correlation signal 915 are coupled to a summer 916, which combines its inputs and produces a unified correlation signal 917. The unified correlation signal 917 increases progressively in a stepwise fashion and reaches a maximum when full correlation is achieved. If CSK is used, then the largest of the unified correlation signals 917 for a plurality of parallel coherent serial CPM correlators 902 over a given symbol code time Ts may be used to identify the received symbol code. The I and Q integrators 908, 913 hold their values until instructed to dump.

To properly control the integrate and dump operation, synchronization information is necessary. To accomplish this, a parallel correlator may operate in conjunction with one or more serial correlators to provide the necessary timing information. In such an embodiment, a transmitter may first transmit data (e.g., a preamble) which is received by the parallel correlator. The parallel correlator generates a correlation pulse when the received data is recognized, which correlation pulse is used to control the timing of the serial correlator or correlators.

Figure 14:
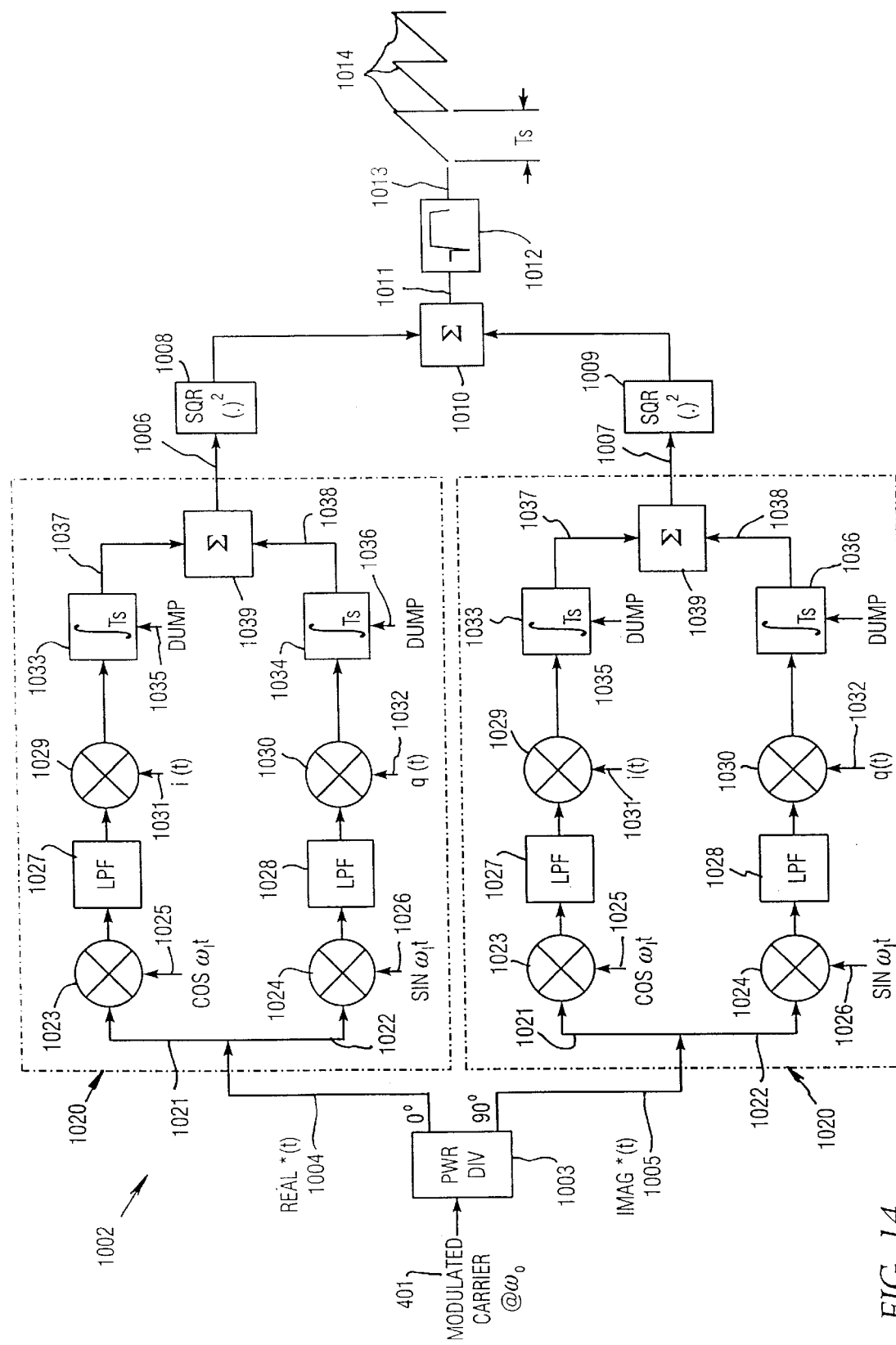
FIG. 14 is a block diagram of an embodiment of spread spectrum receiver using serial correlation for separable real and imaginary parts of the received spread spectrum signal.

FIG. 14 is a block diagram of a non-coherent spread spectrum receiver using serial correlation for separable real and imaginary parts of the received spread spectrum signal.

Conceptually, the non-coherent serial CPM correlator of FIG. 14 operates in a similar fashion as the non-coherent CPM correlator 702 of FIG. 10. The received signal s*(t) 401 is coupled to a non-coherent serial CPM correlator 1002 for recognizing a chip sequence in the received signal s*(t) 401. The non-coherent serial CPM correlator 1002 comprises a power divider 1003, which produces duplicate signals, Real*(t) 1004 having a 0-degree phase delay, and Imag*(t) 1005 having a 90-degree phase delay. Real*(t) 1004 and Imag*(t) 1005 are the real and imaginary parts of the received signal s*(t) 401.

The Real*(t) signal 1004 is coupled to a serial CPM correlator 1020 which produces a real correlation signal 1006. The Imag*(t) signal 1005 is similarly coupled to a second serial CPM correlator 1020 which produces an imaginary correlation signal 1007.

Each serial CPM correlator 1020 comprises a power divider (not shown) which receives an input signal and splits it into duplicate signals 1021 and 1022 with a 0-degree phase delay. The signal 1021 is coupled to a first I multiplier 1023. The other input of the first I multiplier 1023 is coupled to a locally generated non-coherent reference signal cos $\omega_1 t$=cos $(\omega_0 + \Delta\omega)t + \theta$ as described earlier with reference to FIG. 10. The output of the first I multiplier 1023 is coupled to an I low pass filter 1027, the output of which is coupled to a second I multiplier 1029. The other input of the second I multiplier 1029 is coupled to an i(t) signal 1031, which is the waveform representing the I chip sequence (see FIGS. 13A and 13B).

The signal 1022 is coupled to a first Q multiplier 1024. The other input of the first Q multiplier 1024 is coupled to a locally generated non-coherent reference signal sin $\omega_1 t$= sin $(\omega_0 + \Delta\omega)t + \theta$ as described earlier with reference to FIG. 10. The output of the first Q multiplier 1024 is coupled to a Q low pass filter 1028, the output of which is coupled to a second Q multiplier 1030. The other input of the second Q multiplier 1030 is coupled to a q(t) signal 1032, which is the waveform representing the Q chip sequence (see FIGS. 13A and 13B).

The output of the second I multiplier 1029 is coupled to an I integrator 1033, which integrates its input and dumps the sum under control of a control input 1035. The I integrator 1033 produces an I correlation signal 1037.

The output of the second Q multiplier 1030 is coupled to a Q integrator 1034, which integrates its input and dumps the sum under control of a control input 1036. The Q integrator 1034 produces a Q correlation signal 1038.

The i(t) signal, which is the waveform representing the I chip sequence, and the q(t) signal, which is the waveform representing the Q chip sequence, each comprise tri-valued return to zero (RZ) waveforms, that is, they are +1 to indicate a logical "1", −1 to indicate a logical "0", and 0 to indicate no value, as shown in FIG. 13B. The i(t) signal and the q(t) signal are offset by one chip time from each other in the sense that the i(t) signal has a value of +1 or −1 at each odd chip time but is 0 during the even chip times, and the q(t) signal has a value of +1 or −1 at each even chip time but is 0 during the odd chip times. Because the i(t) signal and the q(t) signals are tri-valued return to zero waveforms, only one of the integrators 1035, 1036 changes value at a time. The I and Q integrators 1035, 1036 hold their values until instructed to dump.

As noted with respect to FIG. 13A, synchronization information necessary for controlling the integrate and dump operation of the I and Q integrators 1035, 1036 may be obtained from a parallel correlator receiving timing information from a transmitted preamble in order to generate a correlation pulse. The correlation pulse may be used to control the timing of the serial correlator or correlators. Other suitable methods of control are also possible.

The I correlation signal 1037 and the Q correlation signal 1038 are coupled to a summer 1039, which combines its inputs and produces a unified correlation signal 1006. The unified correlation signal 1006 increases progressively in a stepwise fashion and reaches a maximum when full correlation is achieved. As noted, the CPM correlator 1020 receiving the Real*(t) signal 1004 produces a real correlation signal 1006, and the second CPM correlator 1020 receiving the Imag*(t) signal 1005 produces an imaginary correlation signal 1007.

The real correlation signal 1006 is coupled to a squaring device 1008, which computes the square of its input. The imaginary correlation signal 1007 is coupled to a squaring device 1009, which computes the square of its input. The two squared values are coupled to a summer 1010, which combines its inputs and produces a unified correlation signal 1011 representing the sum of the squares of the real correlation signal 1006 and the imaginary correlation signal 1007. The unified correlation signal 1011 is provided to a square root device 1012 which takes the square root of its input, and generates a final correlation signal 1013. If CSK is used, a maximum correlation pulse 1014 may be achieved once per symbol code time Ts. The squaring of the correlation pulses causes loss of polarity information in the final correlation signal 1013.

Figure 15A:
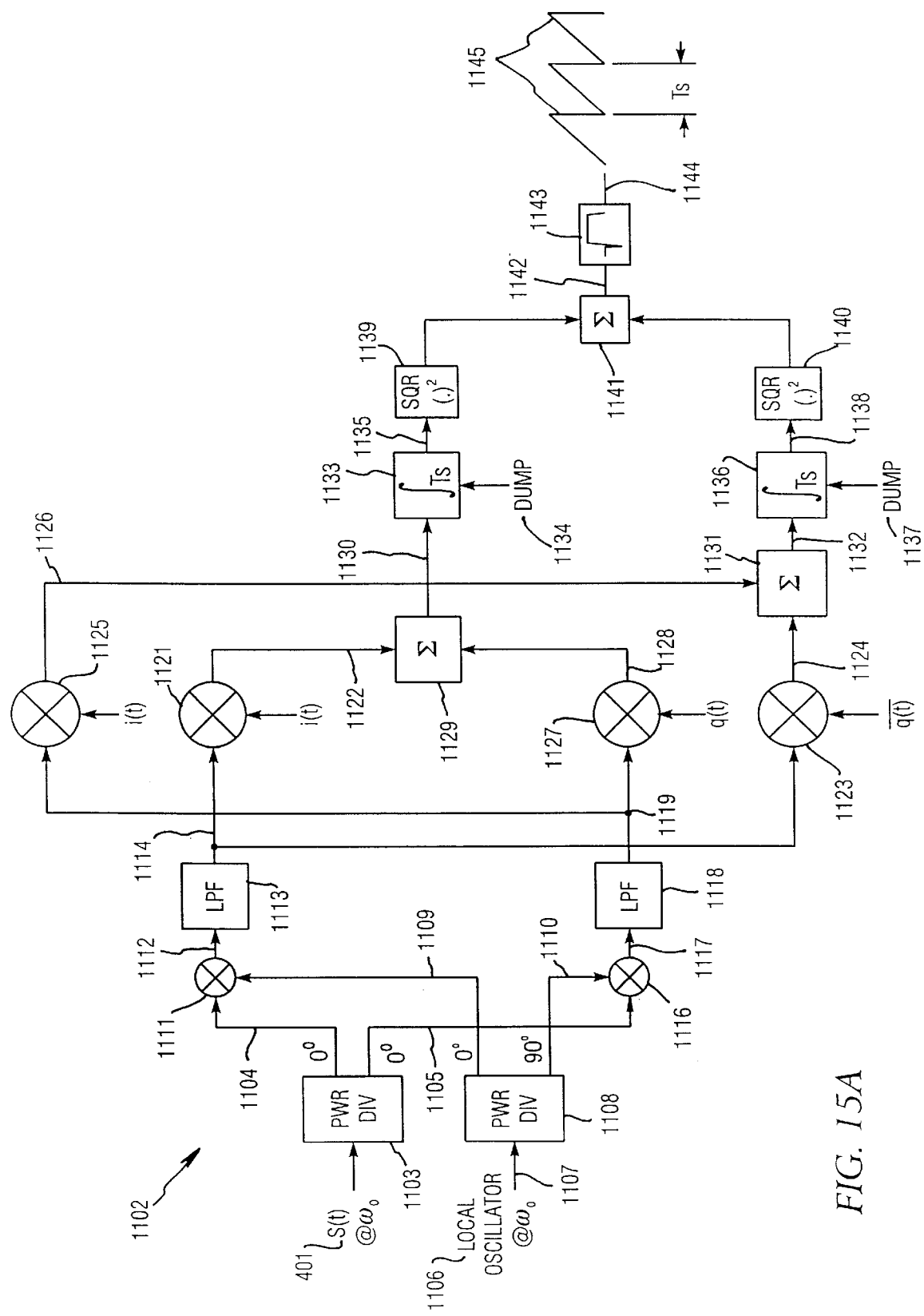
FIG. 15A is a block diagram of another embodiment of a spread spectrum receiver using serial correlation for separable real and imaginary parts of the received spread spectrum signal.

FIG. 15A is a block diagram of another embodiment of a non-coherent spread spectrum receiver using serial correlation for separable real and imaginary parts of the received spread spectrum signal.

The received signal s*(t) 401 is coupled to a dual-integrator non-coherent serial CPM correlator 1102 for recognizing a chip sequence in the received signal s*(t) 401. The dual-integrator non-coherent serial CPM correlator 1102 comprises a first power divider 1103, which produces duplicate signals 1104 and 1105, each with a 0-degree phase delay. A local oscillator 1106 produces a local carrier signal cos $\omega_1 t$ 1107, which is coupled to a second power divider 1108. The second power divider 1108 produces duplicate signals, one signal 1109 with a 0-degree phase delay, and another signal 1110 with a 90-degree phase delay.

The signals 1104 and 1109 are coupled to a first multiplier 1111, which combines its inputs and produces a first product signal 1112. The first product signal 1112 is coupled to a first low pass filter 1113, which produces a first filtered signal 1114 retaining its baseband frequency components.

The signals 1105 and 1110 are coupled to a second multiplier 1116, which combines its inputs and produces a second product signal 1117. The second product signal 1117 is coupled to a second low pass filter 1118, which produces a second filtered signal 1119 retaining its baseband frequency components.

In dual-integrator non-coherent serial CPM correlator 1102, the Q portion of the Real*(t) signal is the same as the I portion of the Imag*(t) signal, and the Q portion of the Imag*(t) signal is 180-degrees out of phase (i.e., the inverse) of the I portion of the Real*(t) signal.

First filtered signal 1114 is coupled to a real I multiplier 1121, which is also coupled to a locally generated signal i(t), that is, the i(t) chip sequence of the correlation sequence (see FIG. 13B). The real I multiplier 1121 combines its inputs and produces a real I product signal 1122.

The first filtered signal 1114 is also coupled to an imaginary Q multiplier 1123, which is also coupled to a locally generated signal q(t), that is, the inverted q(t) chip sequence of the correlation sequence (see FIG. 13B). The imaginary Q multiplier 1123 combines its inputs and produces an imaginary Q product signal 1124.

The second filtered signal 1119 is coupled to an imaginary I multiplier 1125, which is also coupled to the locally generated signal i(t). The imaginary I multiplier 1125 combines its inputs and produces an imaginary I product signal 1126.

The second filtered signal 1119 is also coupled to a real Q multiplier 1127, which is coupled to a locally generated signal q(t), that is, the q(t) chip sequence of the correlation sequence (see FIG. 13B). The real Q multiplier 1127 combines its inputs and produce a real Q product signal 1128.

The real I product signal 1122 and the real Q product signal 1128 are coupled to a real summer 1129, which combines its inputs and produces a real product signal 1130. The imaginary Q product signal 1124 and the imaginary I product signal 1126 are coupled to an imaginary summer 1131, which combines its inputs and produces an imaginary product signal 1132.

The real product signal 1130 is coupled to a real integrator 1133, which integrates its input and dumps the sum under control of a control input 1134. The real integrator 1133 produces a real correlation signal 1135.

The imaginary product signal 1132 is coupled to an imaginary integrator 1136, which integrates its input and dumps the sum under control of a control input 1137. The imaginary integrator 1136 produces an imaginary correlation signal 1138.

The real correlation signal 1135 is coupled to a real squaring device 1139, which computes the square of its input. The imaginary correlation signal 1138 is coupled to an imaginary squaring device 1140, which computes the square of its input. The two squared values are coupled to a summer 1141, which combines its inputs and produces a unified correlation signal 1142 which is the sum of the squares of the real correlation signal 1135 and the imaginary correlation signal 1136. The unified correlation signal 1142 is coupled to a square root device 1143, which takes the square root of its input and generates a final correlation signal 1144. The final correlation signal 1144 may have a maximum value once per symbol code time period Ts.

In a particular embodiment, a one-bit quantizor is inserted at the output of the first low pass filter 1113 and the second low pass filter 1118.

In a preferred embodiment of the FIG. 15A correlator, the real I multiplier 1121, imaginary Q multiplier 1123, imaginary I multiplier 1125, and real Q multiplier 1127 each comprise an inverted XOR gate. Inverted XOR gates are well known in the art; they have a truth table as shown in the table below:

| A | B | Inverted XOR(A,B) |
|---|---|---|
| −1 | −1 | +1 |
| −1 | +1 | −1 |
| +1 | −1 | −1 |
| +1 | +1 | +1 |

In a preferred embodiment, the real summer 1129 and real integrator 1133 collectively comprise a multiplexer and integrator. Instead of computing the individual real I and real Q components, summing them, and integrating the sum, in a preferred embodiment the individual real I and real Q components are multiplexed into a single stream and the stream itself integrated.

Likewise, the imaginary summer 1131 and imaginary integrator 1136 collectively comprise a multiplexer and integrator. Instead of computing the individual imaginary I and imaginary Q components, summing them, and integrating the sum, in a preferred embodiment the individual imaginary I and imaginary Q components are multiplexed into a single stream and the stream itself integrated.

In a preferred embodiment, the first squaring device 1139, the second squaring device 1140, the summer 1141, and the square root device 1143 collectively comprise a device using the Robertson technique for computing the square root of the sum of two squares. In the Robertson technique, which is known in the art, the norm of a plane vector (the square root of the sum of two squares) having coordinates <x,y> may be approximated as follows:

$$\|<x,y>\| = \text{maximum}(x,y) + (0.5)\text{minimum}(x,y) \quad (1152)$$

A preferred embodiment of a Robertson device is shown in FIG. 22 and is described later herein.

Figure 15B:
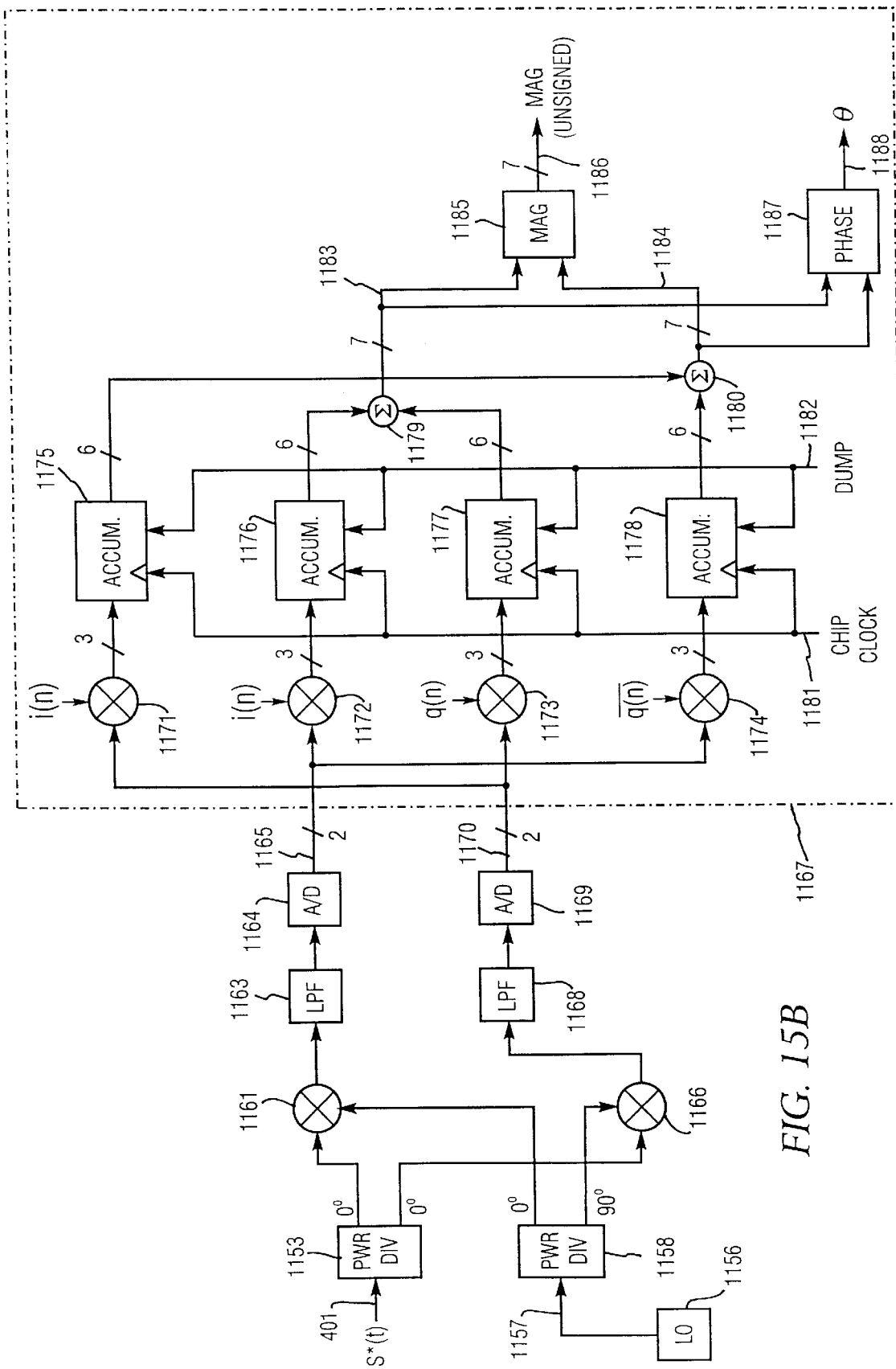
FIG. 15B is a block diagram of a spread spectrum receiver using multi-bit serial correlation for separable real and imaginary parts of the received spread spectrum signal.

FIG. 15B is a block diagram of a spread spectrum receiver using multi-bit serial correlation for separable real and imaginary parts of the received spread spectrum signal. The FIG. 15B receiver comprises a first power divider 1153 coupled to a received signal s*(t) 401, a local oscillator 1156, a second power divider 1158, multipliers 1161 and 1166, and low pass filters 1163 and 1168, all of which are similar to the FIG. 15A embodiment. Also like the FIG. 15A embodiment, the Q portion of the Real*(t) signal is the same as the I portion of the Imag*(t) signal, and the Q portion of the Imag*(t) signal is 180-degrees out of phase (i.e., the inverse) of the I portion of the Real*(t) signal.

Figure 15C:
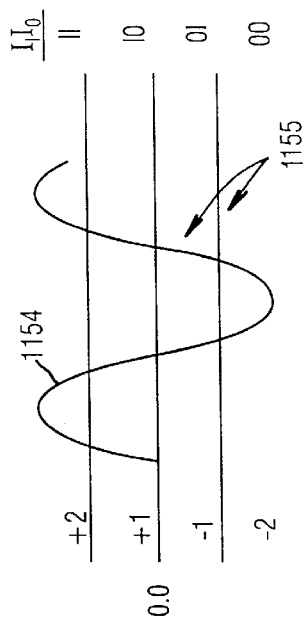
FIG. 15C is a graph showing an example of quantization of an I or Q waveform in accordance with the FIG. 15B receiver.

The low pass filter 1163 is coupled to a two-bit analog-to-digital (A/D) converter 1164, and the other low pass filter 1168 is coupled to another two-bit A/D converter 1169. The two-bit A/D converters 1164 and 1169 each quantize their respective input waveforms, and output a two-bit pattern corresponding to the amplitude of the input waveform. FIG. 15C is a graph showing a two-bit quantization of an input waveform 1154. Four amplitude regions 1155 are depicted in the graph of FIG. 15C. When the input waveform 1154 (e.g., the output of low pass filter 1163 or 1168) is in the highest amplitude region 1155, the A/D converter 1164 or 1169 outputs a two-bit pattern $I_1I_0$ of 11. When the input waveform 1154 is in the next highest amplitude region 1155, the A/D converter 1164 or 1169 outputs a two-bit pattern $I_1I_0$ of 10. Likewise, in the next highest amplitude region 1155, the A/D converter 1164 or 1169 outputs a two-bit pattern $I_1I_0$ of 01, and in the lowest amplitude region 1155 the A/D converter 1164 or 1169 outputs a two-bit pattern $I_1I_0$ of 00.

The inputs of A/D converters 1164, 1169 are sampled once each chip period. The outputs 1165, 1170 of the A/D converters 1164, 1169 are provided to a multi-bit non-coherent serial correlation block 1167. The output 1165 of A/D converter 1164 is coupled to the input of a multiplier 1172, which has another input coupled to a locally generated i(n) chip signal, which, in a particular embodiment, generates a two's complement waveform corresponding to the tri-value return-to-zero waveform used in FIG. 15A. The output 1165 of A/D converter 1164 is also coupled to the input of a second multiplier 1174, which has another input coupled to a locally generated inverse q(n) chip signal, which is likewise a tri-valued signal represented in two's complement format. The output 1170 of A/D converter 1169 is coupled to the input of a multiplier 1171, which has another input coupled to the i(n) chip signal. The output 1170 of A/D converter 1169 is also coupled to the input of another multiplier 1173, which has another input coupled to a q(n) chip signal.

Each of multipliers 1171, 1172, 1173 and 1174 is preferably embodied as a digital multiplier that multiplies its inputs and generates a result in two's-complement format. A preferred input and output truth table for each of multipliers 1171, 1172, 1173 and 1174 appears in Table 15-1 below, wherein $i_c$ and $q_c$ represent the chip value of the i(t) or q(t) signal at the appropriate time interval. A binary 0-bit for $i_c$ or $q_c$ represents a −1 chip value, while a binary 1-bit for $i_c$ or $q_c$ represents a +1 chip value. These values are, as noted for this particular embodiment, expressed in two's complement format for the signals i(n) and q(n).

TABLE 15-1

| A/D Output ($I_1$ $I_0$) | | I/Q Signal ($i_c$ or $q_c$) | Result ($O_2$ $O_1$ $O_0$) | | | Decimal Equivalent |
|---|---|---|---|---|---|---|
| 0 | 0 | 0 | 0 | 1 | 0 | +2 |
| 0 | 0 | 1 | 1 | 1 | 0 | −2 |
| 0 | 1 | 0 | 0 | 0 | 0 | +1 |
| 0 | 1 | 1 | 1 | 1 | 1 | −1 |
| 1 | 0 | 0 | 1 | 1 | 1 | −1 |
| 1 | 0 | 1 | 0 | 0 | 1 | +1 |
| 1 | 1 | 0 | 1 | 1 | 0 | −2 |
| 1 | 1 | 1 | 0 | 1 | 0 | +2 |

The output from each of multipliers 1171, 1172, 1173 and 1174 comprises a 3-bit digital signal according to Table 15-1. The outputs from multipliers 1171, 1172, 1173 and 1174 are coupled to accumulators 1175, 1176, 1177, and 1178, respectively. A chip clock signal 1181 is connected to each of the accumulators 1175, 1176, 1777 and 1178, and causes the accumulators 1175, 1176, 1177 and 1178 to sample their inputs once each chip period. Thus, for a symbol code length of 32 chips, the accumulators 1175, 1176, 1177 and 1178 sample their inputs 32 times for a given symbol code. At each sample time, the accumulators 1175, 1176, 1177 and 1178 add the input to a running correlation total. Because the outputs of A/D converters 1164 and 1169 are represented in two's-complement notation, the accumulators 1175, 1176, 1177 and 1178 effectively carry out addition or subtraction by performing only adding operations. A dump signal 1182 clears the accumulators at the end of each symbol period. For a 32 chip symbol code, the running accumulator totals will vary between +32 and −32.

Alternatively, instead of using the two's-complement format signals i(n) and q(n), the tri-valued return-to-zero waveforms such as i(t) and q(t) (see FIG. 15A) may be used. In such a case, the accumulators 1175, 1176, 1177 and 1178 would each accumulate every other clock cycle in an alternating pattern, rather than every clock cycle.

Each accumulator 1175, 1176, 1177, and 1178 outputs a 6-bit digital accumulation value. The outputs of accumulators 1176 and 1177 are coupled to the inputs of a first summer 1179. The outputs of accumulators 1175 and 1180 are coupled to the inputs of a second summer 1180. Outputs of summers 1179 and 1180 are coupled to a magnitude calculation block 1185 and a phase calculation block 1187. The magnitude calculation block 1185 may be embodied as a Robertson device (see, e.g., FIG. 22). The phase calculation block 1187 may be embodied as, e.g., a phase sector lookup table as shown in and described elsewhere herein with respect to FIG. 25B. The magnitude calculation block 1185 and phase calculation block 1187 output a unified correlation signal 1186 and a phase signal 1188, respectively. The unified correlation signal 1186 may be, e.g., a 7-bit unsigned digital signal.

Expirement has shown that the correlator of FIG. 15B can realize an improvement in bit error rate (BER) and $E_b/N_o$ (bit energy/noise density) of approximately 1.5 to 2.0 dB over the correlator of FIG. 15A. While two-bit quantization leads to a significant improvement over single-bit quantization, it is expected that higher order quantization will yield increasingly smaller gains in BER and $E_b/N_o$ ratio up to a maximum aggregate improvement of about 3 dB. Thus, two-bit quantization provides an advantageous combination of improved performance without a large increase in hardware complexity.

Figure 15D:
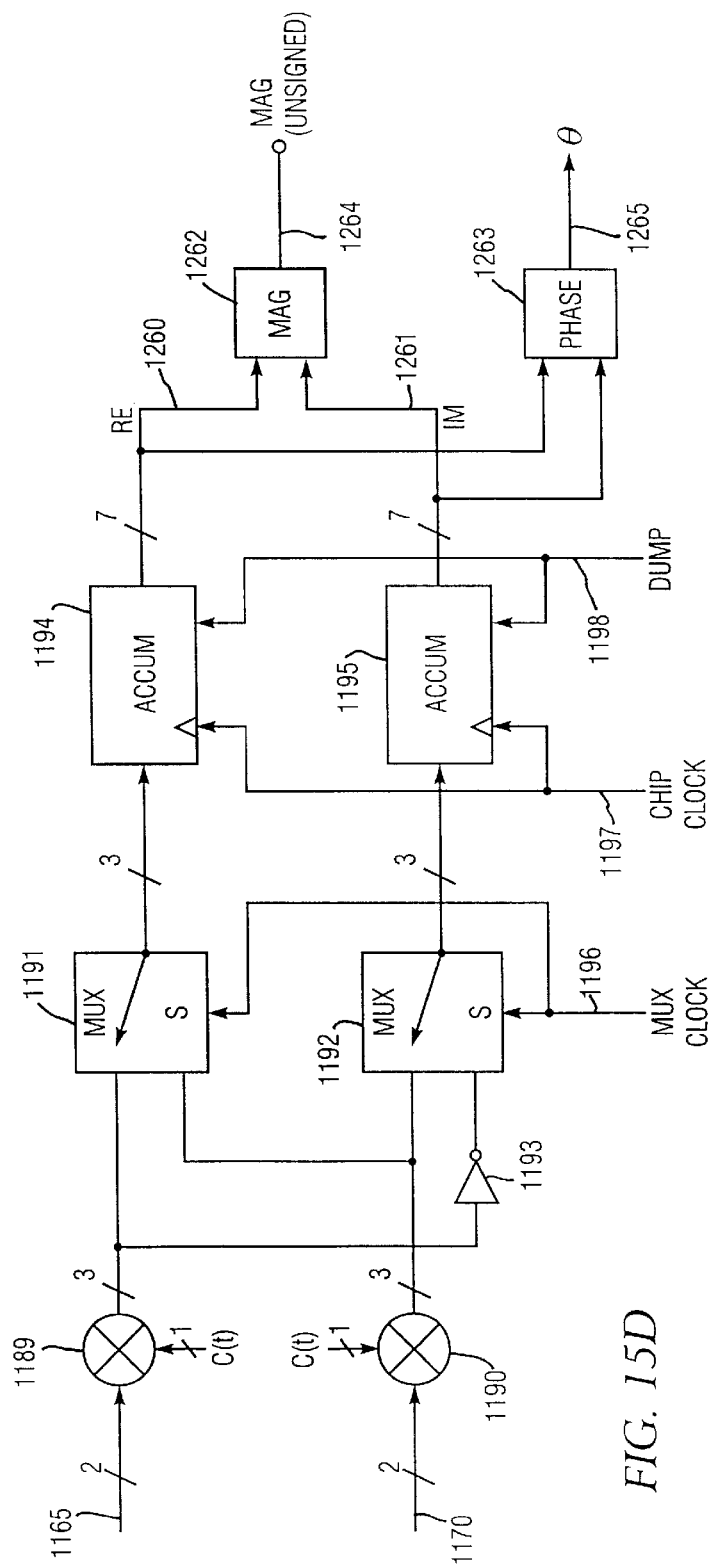
FIG. 15D is a block diagram of another embodiment of a spread spectrum receiver using multi-bit serial correlation for separable real and imaginary parts of the received spread spectrum signal.

FIG. 15D is a block diagram of a portion of another embodiment of a spread spectrum receiver using multi-bit serial correlation for separable real and imaginary parts of the received spread spectrum signal. The circuitry shown in FIG. 15D corresponds to the multi-bit non-coherent serial correlation block 1167 depicted in FIG. 15B, but uses fewer components than the FIG. 15B embodiment.

In FIG. 15D., signal 1165 (see FIG. 15B) and a c(t) chip signal (i.e., a combined i(t) and q(t) signal) are coupled to inputs of a first multiplier 1189. Signal 1170 (see FIG. 1SB) and the c(t) chip signal are coupled to inputs of a second multiplier 1190. Multipliers 1189 and 1190 each carry out arithmetic operations according to Table 15-1. The output of the first multiplier 1189 is coupled to the input of a multiplexer 1191, and is coupled through an inverter 1193 to the input of another multiplexer 1192. The output of the second multiplier 1190 is coupled to an input of each of multiplexers 1191 and 1192.

A multiplexer clock signal 1196 controls the selection of inputs for each of multiplexers 1191 and 1192. Operation of multiplexer clock signal 1196 is based on the recognition that the i(t) and q(t) chip signals are staggered and will be zero every other chip time (see, e.g., FIG. 13B). The multiplexer clock signal 1196 causes the input of the multiplexers 1191, 1192 to switch so as to ignore the output from the multiplier 1189, 1190 that would be zero because the i(t) or q(t) portion of the c(t) chip signal is zero. Thus, the inputs to multiplexers 1191, 1192 are switched each chip time.

The output from multiplexer 1191 is input to an accumulator 1194. The output from multiplexer 1192 is input to another accumulator 1195. Accumulators 1194 and 1195 function similarly to accumulators 1175, 1176, 1177 or 1178 in FIG. 15B, by performing two's-complement accumulation of their inputs to keep a running correlation total. The accumulators 1194, 1195 are controlled by a chip clock signal 1197 and a dump signal 1198, similar to chip clock signal 1181 and dump signal 1182, respectively, of FIG. 15B.

The output 1260 of accumulator 1194 is coupled to a magnitude calculation block 1262 and a phase calculation block 1263. The output 1261 of accumulator 1195 is likewise coupled to magnitude calculation block 1262 and phase calculation block 1263. Magnitude calculation block 1262 is similar to magnitude calculation block 1185 of FIG. 15B; phase calculation block 1187 is likewise similar to phase calculation block 1187 of FIG. 15B. Magnitude calculation block 1262 and phase calculation block 1263 output a unified correlation signal 1264 and a phase signal 1265, respectively.

A method of receiving and despreading a spread spectrum signal using non-coherent multi-bit serial correlation is also provided. The method includes the steps of dividing a spread spectrum signal into first and second duplicate signals, demodulating the first signal into a real-I/imaginary-Q signal using a first non-coherent local reference signal, demodulating the second signal into an imaginary-I/real-Q signal using a second non-coherent local reference signal having the same frequency as said first non-coherent local reference signal but phase offset therefrom by 90 degrees, converting the real-I/imaginary-Q signal into a first multi-bit digital signal, converting the imaginary-I/real-Q signal into a second multi-bit digital signal, correlating the first multi-bit digital signal with a chip sequence comprising odd chips and even chips, accumulating a first correlation total, correlating the second multi-bit digital signal with the odd chips and an inverse of the even chips of the chip sequence, accumulating a second correlation total, and combining the first correlation total and the second correlation total to generate a unified correlation output signal.

In one variation of the method, the steps of correlating said first multi-bit digital signal, accumulating a first correlation total, correlating said second multi-bit digital signal, accumulating a second correlation total, and combining said first correlation total and said second correlation total comprise the steps of multiplying the real-I/imaginary-Q signal with said odd chips to generate a real I product signal, multiplying the imaginary-I/real-Q signal with said even chips to generate a real Q product signal, multiplying the imaginary-I/real-Q signal with said odd chips to generate an imaginary I product signal, multiplying the real-I/imaginary-Q signal with the inverse of said even chips to generate an imaginary Q product signal, individually accumulating at each chip period of said chip sequence the real I product signal, real Q product signal, imaginary I product signal, and imaginary Q product signal, summing the accumulated real I product signal and the accumulated real Q product signal into a real correlation signal, summing the accumulated imaginary product signal and the accumulated imaginary Q product signal into an imaginary correlation signal, and combining the real correlation signal and the imaginary correlation signal into a unified correlation signal.

In another variation of the method, the steps of correlating said first multi-bit digital signal, accumulating a first correlation total, correlating said second multi-bit digital signal, accumulating a second correlation total, and combining said first correlation total and said second correlation total comprise the steps of multiplying the real-I/imaginary-Q signal with the chip sequence c(t) to generate a real-I/imaginary-Q product signal, multiplying the imaginary-I/real-Q signal with the chip sequence c(t) to generate an imaginary-I/real-Q product signal, sampling and adding the real-I/imaginary-Q product signal into a first running correlation total (e.g., a real correlation total) the imaginary-I/real-Q product signal into a second running correlation total (e.g., an imaginary correlation total) for the odd chips of the chip sequence, and sampling and adding the imaginary-I/real-Q product signal into said first running correlation total an inverse of the real-I/imaginary-Q product signal into a second running correlation total for the even chips of the chip sequence.

Figure 16:
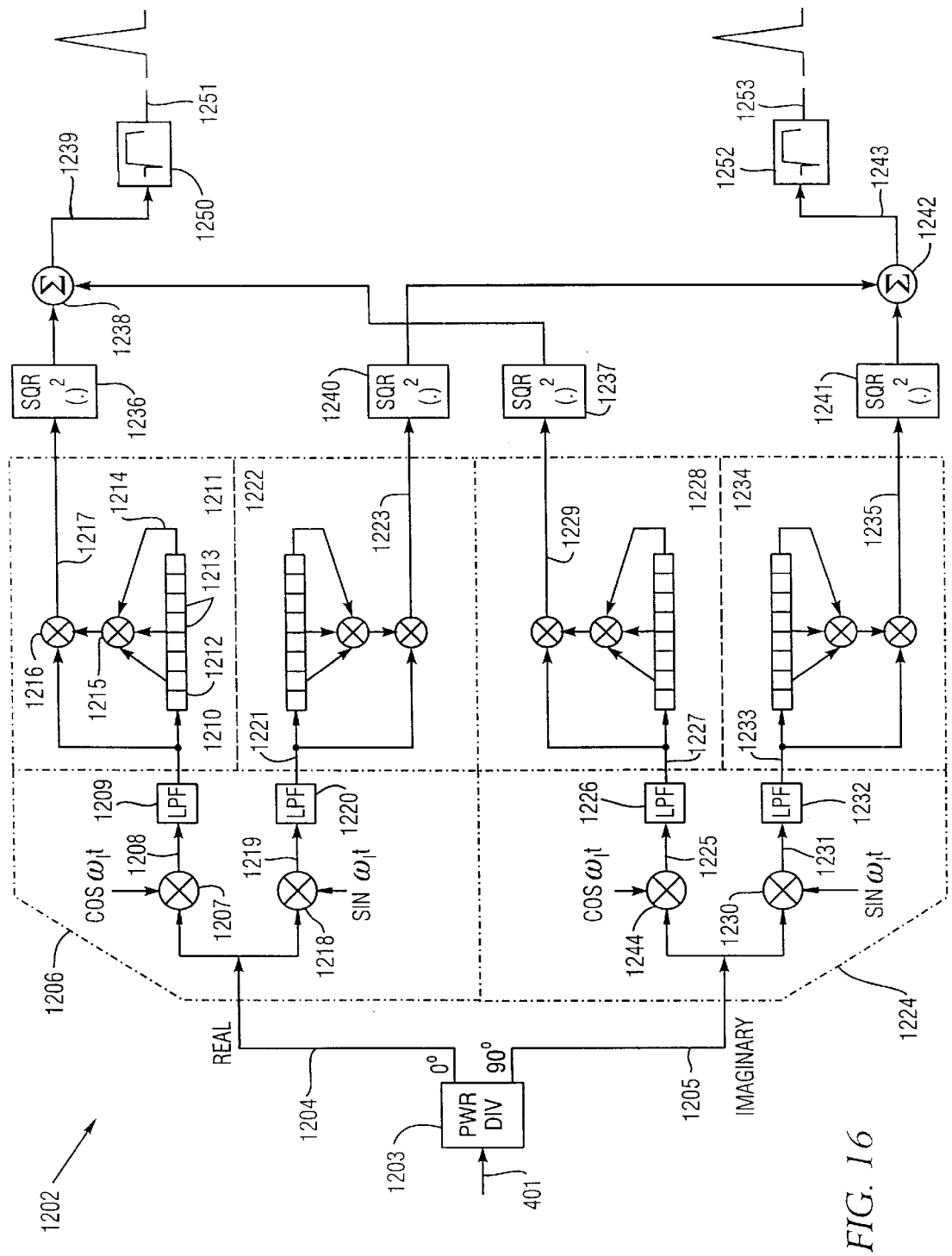
FIG. 16 is a block diagram of an embodiment of spread spectrum receiver using self-synchronized correlation for separable real and imaginary parts of the received spread spectrum signal.

FIG. 16 shows a block diagram of a first spread spectrum receiver using self-synchronized correlation for separable real and imaginary parts of the received spread spectrum signal.

The received signal s*(t) 401 is coupled to a self-synchronized CPM correlator 1202 for recognizing a correlation sequence in the received signal s*(t) 401. The self-synchronized CPM correlator 1202 comprises a power divider 1203, which produces duplicate signals, Real*(t) 1204 having a 0-degree phase delay, and Imag*(t) 1205 having a 90-degree phase delay. Real*(t) 1204 and Imag*(t) 1205 are the real and imaginary parts of the received signal s*(t) 401.

The Real*(t) signal 1204 is coupled to a real correlator 1206, which divides its input signal by a power divider (not shown) or other suitable means. The real correlator 1206 comprises a real I multiplier 1207, which is also coupled to a local carrier signal cos $\omega_1 t$. The real I multiplier combines its inputs and produces a real I product 1208. The real I product 1208 is coupled to a real I low pass filter 1209, which filters its input and produces a filtered real I signal 1210.

The filtered real I signal 1210 is coupled to a real I self-synchronizing correlator 1211, such as a correlator using self-synchronizing techniques described in application Ser. No. 08/432,913 entitled "Method and Apparatus for Despreading Spread Spectrum Signals," filed May 1, 1995 in the name of inventors Robert Gold and Robert C. Dixon, which application is assigned to the assignee of the present invention and hereby incorporated by reference.

The real I self-synchronizing correlator 1211 comprises a shift register 1212 having a plurality of chips 1213 and a plurality of taps 1214 coupled to selected chips 1213. The taps 1214 are coupled to a first tap multiplier 1215, which combines its inputs to produce a product which is thereafter coupled to a second tap multiplier 1216. The second tap multiplier 1216 is also coupled to the filtered real I signal 1210. The second tap multiplier 1216 combines its inputs and produces a real I correlation signal 1217.

The real correlator 1206 further comprises a real Q multiplier 1218, which is coupled to a local carrier signal sin $\omega_1 t$. The real Q multiplier 1218 combines its inputs and produces a real Q product 1219. The real Q product 1219 is coupled to a real Q low pass filter 1220, which filters its input and produces a filtered real Q signal 1221.

The filtered real Q signal 1221 is coupled to a real Q self-synchronizing correlator 1222, which produces a real Q correlation signal 1223.

The Imag*(t) signal 1205 is coupled to an imaginary correlator 1224, which divides its input signal by a power divider (not shown) or other suitable means. The imaginary correlator 1224 comprises an imaginary I multiplier 1244, which is also coupled to a local carrier signal cos $\omega_1 t$. The imaginary I multiplier 1244 combines its input and produces an imaginary I product 1225. The imaginary I product 1225 is coupled to an imaginary I low pass filter 1226, which filters its input and produces a filtered imaginary I signal 1227.

The filtered imaginary I signal 1227 is coupled to an imaginary I self-synchronizing correlator 1228, which produces an imaginary I correlation signal 1229.

The imaginary correlator 1224 comprises an imaginary Q multiplier 1230, which is also coupled to a local carrier signal sin $\omega_1 t$. The imaginary Q multiplier 1230 combines its inputs and produces an imaginary Q product 1231. The imaginary Q product 1231 is coupled to an imaginary Q low pass filter 1232, which filters its input and produces a filtered imaginary Q signal 1233.

The filtered imaginary Q signal 1233 is coupled to an imaginary Q self-synchronizing correlator 1234, which produces an imaginary Q correlation signal 1235.

The real I correlation signal 1217 and the imaginary I correlation signal 1229 are coupled to squaring devices 1236 and 1237 respectively, the outputs of which are coupled to a summer 1238, to produce a unified I correlation signal 1239. The unified I correlation signal 1239 is coupled to a square root device 1250 which takes the square root of its input and generates an final I correlation signal 1251.

The real Q correlation signal 1223 and the imaginary Q correlation signal 1235 are coupled to squaring devices 1240 and 1241 respectively, the outputs of which are coupled to a summer 1242, to produce a unified Q correlation signal 1243. The unified Q correlation signal 1243 is coupled to a square root device 1252 which takes the square root of its input and generates an final Q correlation signal 1253.

Embodiments and other aspects of the inventions described herein, including the system embodiments described below, may be made or used in conjunction with inventions described, in whole or in part, in the patents, publications, or copending applications referred to herein as well as in copending U.S. Pat. No. 5,455,822, entitled "Method and Apparatus for Establishing Spread Spectrum Communication," or copending U.S. patent application Ser. No. 08/284,053, filed Aug. 1, 1994, both of which are hereby incorporated by reference as if set forth fully herein.

Figure 17A:
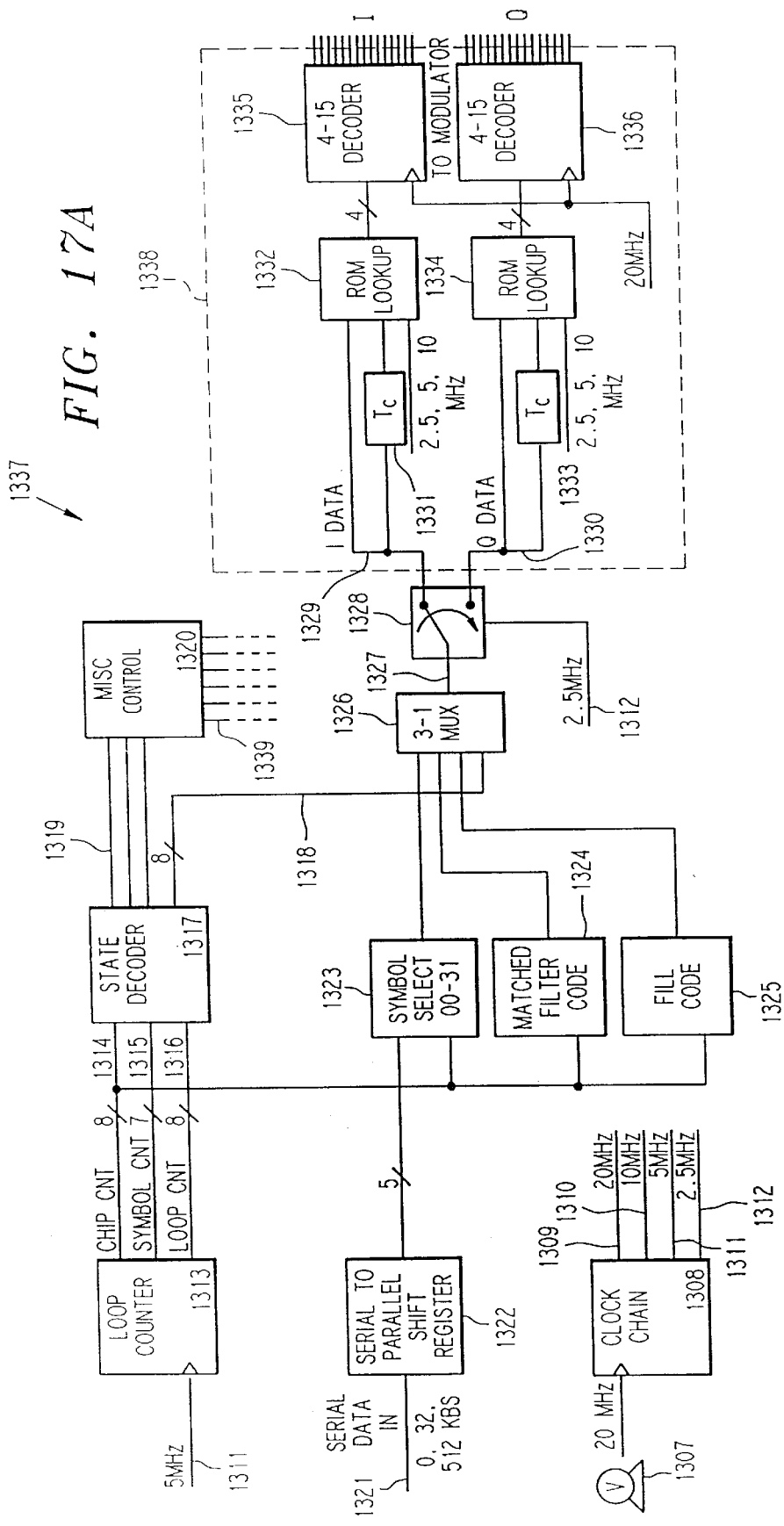
FIGS. 17A and 17D are block diagrams of a preferred transmitter and a preferred transmission protocol, respectively.

FIG. 17A is a block diagram of a preferred transmitter.

In a preferred embodiment, a spread spectrum transmitter 1337 operates in a cellular environment like that described with respect to FIG. 2. The transmitter 1337 may be associated with either a base station or a user station in such a cellular environment. In a preferred embodiment, the transmitter 1337 operates according to an over-air protocol for communication between the base station and the user station, in which transmission is time-division duplex between the base station and the user station in a single frame, and is time-division multiplexed among multiple user stations in a repeated pattern of frames. Other and further details regarding a preferred over-air communication protocol may be found in U.S. Pat. No. 5,455,822 and in application Ser. No. 08/284,053 cited above. However, the present invention will work in a variety of different communication environments, cellular or otherwise, and according to a variety of different protocols, whether or not such protocols make use of time-division duplexing or time-division multiplexing.

Figure 17B:
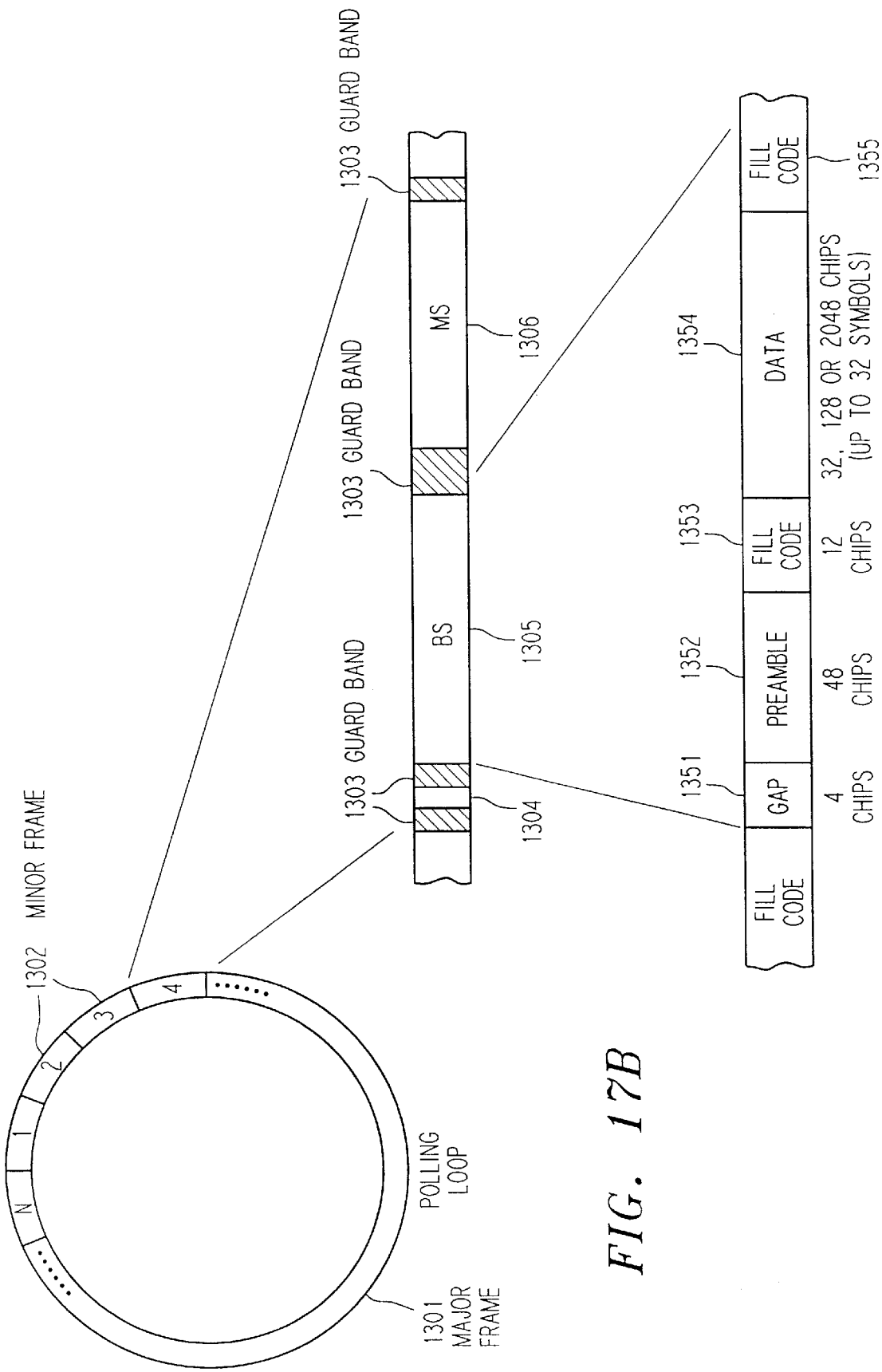
FIG. 17B is a diagram of an alternative transmission protocol.
Figure 17C:
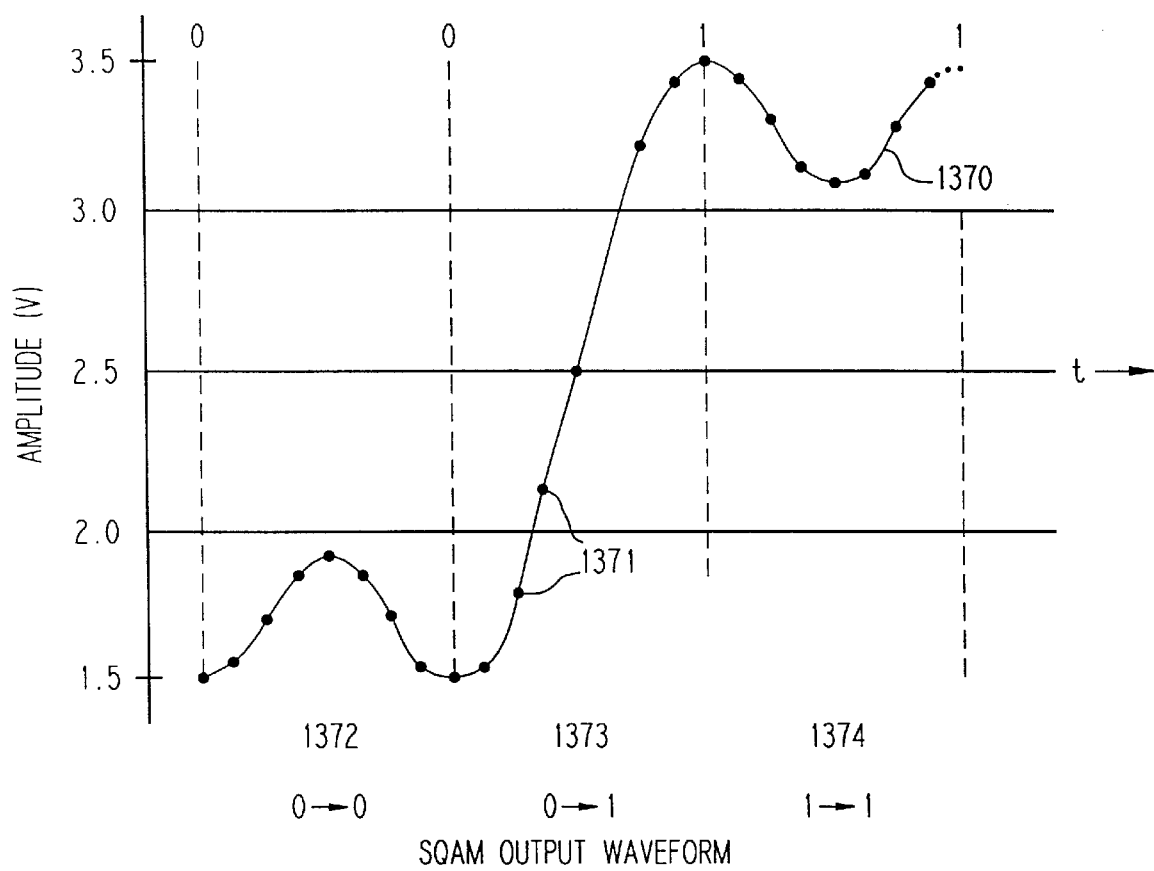
FIG. 17C is an exemplary SQAM waveform generated by a transmitter using separate I and Q components.
Figure 17D:
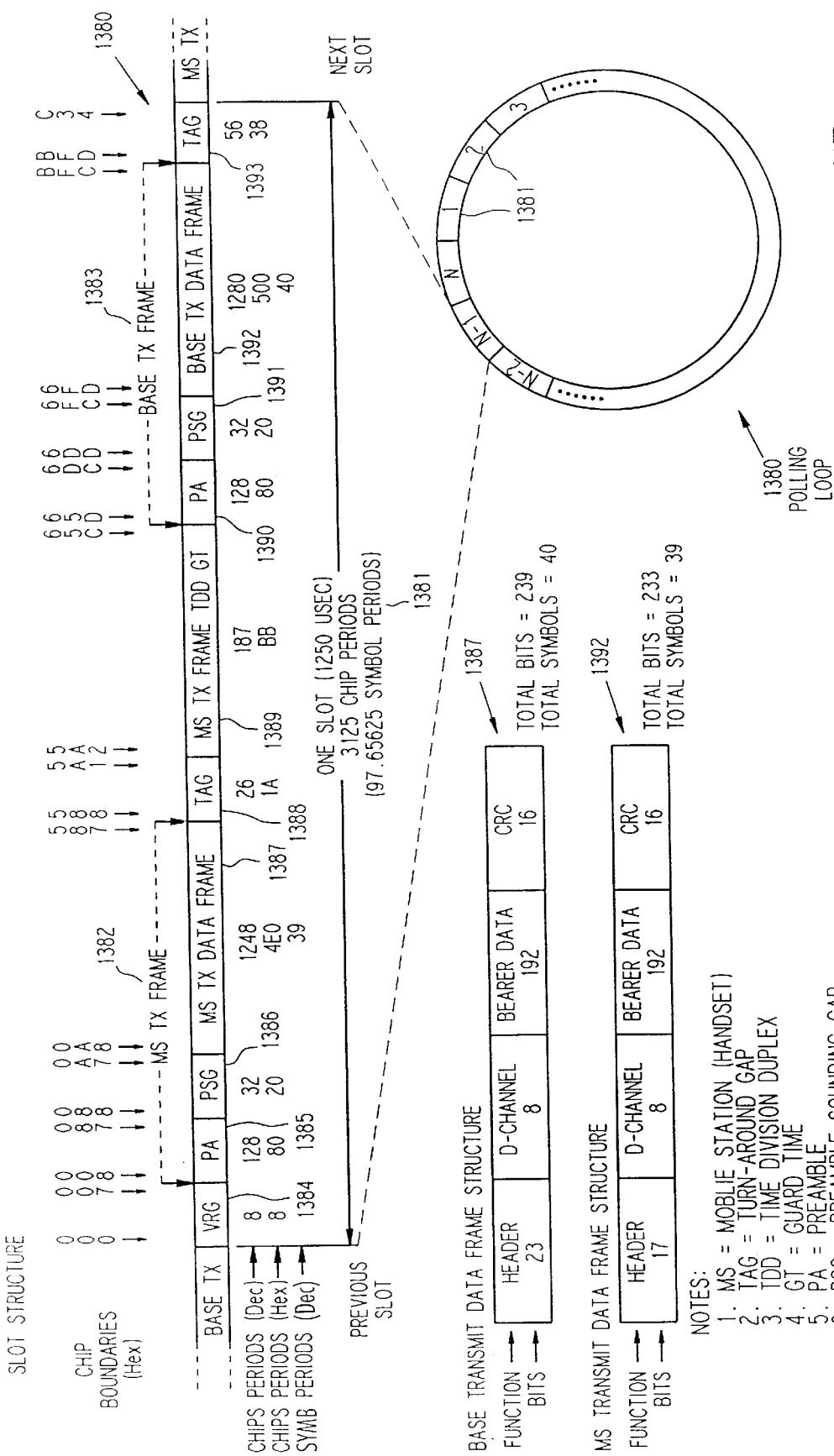

A preferred communication protocol is depicted in FIG. 17D. As shown in FIG. 17D, a polling loop 1380 ("major frame") comprises a plurality of time slots 1381 ("minor frames"). Each minor frame 1381 preferably comprises communication between a base station (e.g., cellular station) and a user station (e.g., mobile user) in time division duplex—that is, the base station transmits to a user station and the user station transmits back to the base station within the same minor frame 1381.

More specifically, as shown in an exploded view in FIG. 17D, a minor frame 1381 preferably comprises a mobile or user transmission 1382 preceding a base transmission 1383. The minor frame 1381 also comprises a variable radio delay gap 1384 preceding the user transmission 1382, followed by a turn-around gap 1388 and a guard time gap 1389. After gap 1389 is the base transmission 1383, which is followed by another turn-around gap 1393. The user transmission 1382 comprises a preamble 1385, a preamble sounding gap 1386, and a user message interval 1387. The base transmission comprises a preamble 1390, a preamble sounding gap 1391, and a base message interval 1392.

Another communication protocol is shown in FIG. 17B. While operation of the transmitter in FIG. 17A is generally described with reference to the FIG. 17B protocol, the same techniques may be applied for use with the preferred protocol shown in FIG. 17D. In the particular protocol of FIG. 17B, a polling loop 1301 ("major frame") comprises a plurality of time slots 1302 ("minor frames"). Each minor frame 1302 comprises communication between a base station (e.g., cellular station) and a user station (e.g., mobile user) in time division duplex—that is, the base station transmits to a user station and the user station transmits back to the base station within the same minor frame 1302.

More specifically, as shown in an exploded view in FIG. 17B, a minor frame 1302 comprises a power control pulse transmission 1304 from the user station to the base station, a base station transmission 1305, and a user station transmission 1306, each of which is surrounded by guard bands 1303. Details regarding the power control pulse transmission 1304 may be found in application Ser. No. 08/284,053, filed Aug. 1, 1994, and incorporated herein by reference. The base station transmission 1305 and the user station transmission 1306 have a similar structure; thus, the following description regarding the base station transmission 1305 applies equally to the user station transmission 1306.

The base station transmission 1305 comprises an interframe gap 1351, a matched filter code 1352, a first fill code 1353, a data sequence 1354, and a second fill code 1355 similar to the first fill code 1353. The interframe gap 1351 may be four chips in duration; the matched filter code 1352 may be 48 chips duration; the first fill code 1353 may be 16 chips in duration; the data sequence 1354 may be comprised of one or more symbol codes, each of which may be 32 chips, 128 chips, 2048 chips, or some other number of chips in duration depending upon a data rate for transmission between the base station and the user station; and the second fill code 1355 may be a sufficient number of chips in duration to complete the minor frame 1302. A plurality of minor frames 1302 may comprise a channel.

The fill codes 1353, 1355 preferably each comprise a code that has a low cross-correlation with each of the symbol codes, and may form a repeated pattern such as "0 1 0 1 . . ." or "0 0 1 1 . . . ." The interframe gap 1351 may have the same code as one or both of the fill codes 1353, 1355. Fill codes 1353, 1355 are generated primarily for the purpose of starting the modulator in a known state at the beginning of a transmission, and to avoid having to turn the transmitter off and on for the time period while the fill code 1305 is transmitted. The fill codes 1353, 1355 may further be selected to improve the spectral characteristics of the overall transmission.

The transmitter 1337 of FIG. 17A is a preferred means for generating a base station transmission 1305 (or 1387 of FIG. 17D) or a user station transmission 1306 (or 1392 of FIG. 17D) using CPM techniques such as those described elsewhere herein. A serial data stream 1321 of information to be transmitted is provided to the transmitter 1337 and converted to parallel data by a serial-to-parallel shift register 1322. The parallel data output by the serial-to-parallel shift register 1322 is used to select from among a plurality of symbol codes stored in a symbol code table 1323. Each symbol code, as mentioned, is preferably 32 chips in length and represents a predetermined number of data bits (preferably 5 data bits) from the serial data stream 1321.

In addition to storing various symbol codes in the symbol code table 1323, the transmitter also comprises a matched filter code generator 1324 capable of generating a matched filter code 1352, and a fill code generator 1325 (which may be a table) capable of generating fill codes 1353, 1355. The symbol code table 1323, matched filter code generator 1324, and fill code generator 1325 are selectively accessed by a control circuit 1320 for constructing a transmission such as a base station transmission 1305 or user station transmission 1306. A transmission may be constructed, for example, by concatenating or appending consecutive symbol codes, fill codes, and other code sequences as necessary to generate the appropriate chip sequence. Although connections are not expressly shown, the control circuit 1320 has control outputs 1339 connected to various parts of the circuit for the purpose of exercising synchronous control.

In a preferred embodiment, timing information is generated with a clock circuit 1307 such as a crystal oscillator. The clock circuit 1307 produces a 20 megahertz (MHz) clock signal and is coupled to an input of a clock chain 1308. The clock chain 1308 generates a plurality of output clock signals in a manner known in the art. The clock chain 1308 has as outputs a 20 MHz clock signal 1309, a 10 MHz clock signal 1310, a 5 MHz clock signal 1311, and a 2.5 MHz clock signal 1312.

In a preferred embodiment, the 5 MHz clock signal 1311 is coupled to a loop counter 1313, which, among other things, counts chips over the course of each minor frame 1302. The loop counter 1313 produces a chip count signal 1314, a symbol count signal 1315, and a channel count signal 1316. The channel or loop count signal 1316 indicates which minor frame 1302 is active within the polling loop 1301. Thus, if there are 32 minor frames 1302 in a polling loop 1301, the channel count signal 1316 counts from 0 to 31 and then resets. When the channel count signal 1316 indicates an active minor frame 1302 in which the transmitter 1337 is authorized to transmit, the control circuit 1320 may issue commands to transmit information at the appropriate time.

The symbol count signal 1315 keeps track of how many symbols have been transmitted by the transmitter 1337 in the data sequence 1354. Thus, if the transmitter is to transmit 16 consecutive symbols as part of the data sequence 1354, then the symbol count signal 1315 counts from 0 to 15 and then resets.

The chip count signal 1314 keeps track of how many chips have been transmitted by the transmitter 1337 for the current symbol in the data sequence 1354. Thus, if each symbol code is 32 chips in length, the chip count signal 1314 counts from 0 to 31 and then resets. The chip count signal 1314 also provides timing information for those circuits in the transmitter which are clocked at each chip time Tc.

The chip count signal 1314, the symbol count signal 1315, and the channel count signal 1316 are coupled to a state decoder 1317, which determines whether the current chip is part of the matched filter code 1352, the fill code 1305, or a data sequence symbol code 1306, and which generates a selection signal 1318 and a set of control signals 1319. The control signals 1319 are coupled to a control circuit 1320.

As mentioned, a serial data stream 1321 of data to be transmitted is coupled to a serial-to-parallel shift register 1322, which converts the serial data stream 1321 to a sequence of 5-bit parallel symbols. The sequence of symbols is coupled to an input of a symbol code table 1323, which selects for each symbol a specific symbol code unique to the symbol.

The chip count signal 1314 is coupled to the symbol code table 1323, the matched filter code generator 1324, and the fill code generator 1325. Outputs of the symbol code table 1323, the matched filter code generator 1324, and the fill code generator 1325 are coupled to inputs of a 3-1 multiplexor 1326. A control input of the 3-1 multiplexor 1326 is coupled to the selection signal 1318 from the control circuit 1320. The 3-1 multiplexor 1326 thus generates an output chip stream 1327 in accordance with the commands provided by the control circuit 1320. Specifically, the control circuit 1320 may select a fill code to fill the interframe gap 1351 from the fill code generator 1325, a matched filter code 1352 from the matched filter code generator 1324, a first fill code 1353 from the fill code generator 1325, one or more symbol codes (depending on the amount of data to be transmitted and the data rate) corresponding to the data sequence 1354 from the symbol code table 1323, and a second fill code 1355 from the fill code generator 1325, in order to construct a transmission such as a base station transmission 1305 or a user station transmission 1306.

The output chip stream 1327 is coupled to a demultiplexor 1328, which separates its input chip stream into an I chip stream 1329 and a Q chip stream 1330, under control of the 2.5 MHz clock signal 1312 (i.e., the demultiplexor 1328 is clocked at half the chip rate Rc). The I chip stream 1329 and the Q chip stream 1330 are connected to a waveform generator 1338 which generally constructs appropriate output waveforms based on the contents of the I chip stream 1329 and the Q chip stream 1330.

The waveform generator 1338 comprises an I lookup table 1332 and a Q lookup table 1334, each of which comprises memory such as ROM. The I lookup table 1332 and the Q lookup table 1334 each contain fifteen digitized values for amplitude outputs of the P(t) devices 305 (for I) and 306 (for Q) shown in FIG. 6. Thus, by changing the contents of the lookup tables 1332, 1334 appropriately, the shape of the output waveforms may be suitably altered, allowing transmission of MSK, SQAM, GMSK, SQORC, or other similar format as desired.

The I lookup table 1332 receives as its inputs both the present I chip from the I chip stream 1329 and the previous I chip from the I chip stream 1329 as stored in an I delay element 1331 (e.g., a latch). By having available the immediate past I chip and the present I chip, the transmitter knows what type of transition is occurring in the I chip stream 1329—that is, whether the I chip stream 1329 is undergoing a 0/0 transition, a 0/1 transition, a 1/0 transition, or a 1/1 transition. The type of transition determines the shape of the output waveform. The I lookup table 1332 provides as output eight sequential I waveform commands or "samples" per I chip time (i.e., 2Tc) which are connected to a digital-to-analog converter (DAC) for constructing a suitable waveform. The I lookup table 1332 is provided a clock input of 20 MHz so that eight I waveform commands may be output per I chip time. In the transmitter 1337 shown in FIG. 17, the DAC for the I chip stream 1329 comprises a 4-15 decoder 1335 which selects one of 15 possible output lines, coupled to a resistor ladder (not shown) and a low pass filter (not shown). Of course, other types of DAC's would be suitable for this purpose.

Table 17-1 below shows an example of how the 15 outputs of the 4-15 decoder 1335 relate to specific voltages to be output by the DAC to create a SQAM waveform varying between 1.5 V and 3.5 V:

TABLE 17-1

| Decoder (Hex) | Output Amplitude (V) |
|---|---|
| 0 | 1.5 |
| 1 | 1.5674 |
| 2 | 1.700 |

TABLE 17-1-continued

| Decoder (Hex) | Output Amplitude (V) |
|---|---|
| 3 | 1.8414 |
| 4 | 1.900 |
| 5 | 3.100 |
| 6 | 3.1586 |
| 7 | 3.300 |
| 8 | 3.4326 |
| 9 | 3.500 |
| A | 3.2071 |
| B | 2.8827 |
| C | 2.500 |
| D | 2.1173 |
| E | 1.7929 |

Table 17-2 below shows a sequence of eight selected values according to Table 17-1 for constructing an appropriate waveform depending on what type of transition is occurring in the I chip stream:

TABLE 17-2

| Transition | Decoder Output Sequence |
|---|---|
| 0 —> 0 | 0, 1, 2, 3, 4, 3, 2, 1 |
| 0 —> 1 | 0, 1, E, D, C, B, A, 8 |
| 1 —> 0 | 9, 8, A, B, C, D, E, 1 |
| 1 —> 1 | 9, 8, 7, 6, 5, 6, 7, 8 |

An output corresponding to the Q chip stream 1330 is generated in a similar manner to that of the I chip stream 1329. The Q lookup table 1334 receives as its inputs both the present Q chip from the Q chip stream 1330 and the previous Q chip from the Q chip stream 1330 as stored in a Q delay element 1333. Based on its inputs, the Q lookup table 1334 determines what type of transition is occurring in the Q chip stream 1330. An output of the Q lookup table 1334 is coupled to a 4-15 decoder 1336, which selects one of 15 output lines for sending a signal to a DAC configured in a similar manner to that described with respect to the I chip stream 1329.

Thus, the contents of the I lookup table 1332 and the Q lookup table 1334 are selected to generate an i(t) output waveform and a q(t) output waveform, respectively. An example of an output SQAM waveform 1370 according to the technique described above and the values set forth in Tables 17-1 and 17-2 is shown in FIG. 17C. The waveform 1370 comprises a 0/0 transition 1372, a 0/1 transition 1373, and a 1/1 transition 1374. Each transition 1372, 1373, 1374 comprises eight discrete points 1371 corresponding to values selected by the 4-15 I lookup table 1332 (or Q lookup table 1334). The effect of the low pass filter (not shown) at the output of the waveform generator 1338 smooths the shape of the waveform 1370 between discrete points 1371.

Table 17-3 shows an illustrative matched filter code 1352. In a presently preferred embodiment, the matched filter code generator 1324 is configured to generate the code shown below in Table 17-3.

TABLE 17-3

| Hexadecimal Value | Binary Value |
|---|---|
| 40 | 01000000 |
| 3E | 00111110 |
| 34 | 00110100 |

TABLE 17-3-continued

| Hexadecimal Value | Binary Value |
|---|---|
| B3 | 10110011 |
| 1A | 00011010 |
| A6 | 10100110 |

Selection of a matched filter code 1352 for a particular application depends on the symbol codes (in a CSK system) or other chip codes being used; generally, the matched filter code 1352 is selected for low cross correlation with the other chip codes used in the particular communication environment.

Table 17-4 shows a presently preferred set of 32 symbol codes. In a preferred embodiment, the symbol code table 1323 along with the appropriate commands from the control circuit 1320 are configured to generate a sequence of symbol codes selected from the set of 32 symbol codes shown in Table 17-4, in response to a sequence of 5-bit parallel symbols.

TABLE 17-4

| Symbol | Symbol Code (Hex) | Symbol | Symbol Code (Hex) |
|---|---|---|---|
| 00 | 0544D65E | 10 | 0E4424A1 |
| 01 | 5B118E0B | 11 | 5B1171F4 |
| 02 | 3D77E66D | 12 | 3D771792 |
| 03 | 6822BD36 | 13 | 682242C7 |
| 04 | 014BD451 | 14 | 014B2BAE |
| 05 | 541E8104 | 15 | 541E7EFB |
| 06 | 3278E762 | 16 | 3278189D |
| 07 | 672DB237 | 17 | 672D4DC8 |
| 08 | 0EBBDBA1 | 18 | 0EBB245E |
| 09 | 5BEE8EF4 | 19 | 5BEE710B |
| 0A | 3D88E892 | 1A | 3D86176D |
| 0B | 68DDBDC7 | 1B | 68DD4238 |
| 0C | 01B4D4AE | 1C | 01B42B51 |
| 0D | 54E181FB | 1D | 54E17ED4 |
| 0E | 3287E79D | 1E | 32671862 |
| 0F | 67D2B2C8 | 1F | 67D24D37 |

FIGS. 18, 19, 21A and 21B collectively illustrate a preferred receiver.

The illustrated receiver generally operates by correlating to a preceding spread spectrum code (e.g., matched filter code 1352 of FIG. 17B, or preamble 1385 or 1390 shown in FIG. 17D) with a non-coherent parallel correlator (such as the two-register non-coherent CPM correlator 802 depicted in FIG. 12) to achieve synchronization for a plurality of serial correlators (such as the dual-integrator non-coherent serial CPM correlators 1102 depicted in FIG. 15A). The serial CPM correlators are then used for correlating to a following message (e.g., data sequence 1354 of FIG. 17B, or messages contained in the user message interval 1387 or base message interval 1392 of FIG. 17D). However, many alternate configurations using, for example, only parallel correlators, only serial correlators, or various combinations of parallel and serial correlators, may be used in the receiver without departing from the scope and spirit of the invention. In a preferred embodiment, the multi-bit serial correlators of FIG. 15B or 15D are used for the plurality of serial correlators.

Figure 21A:
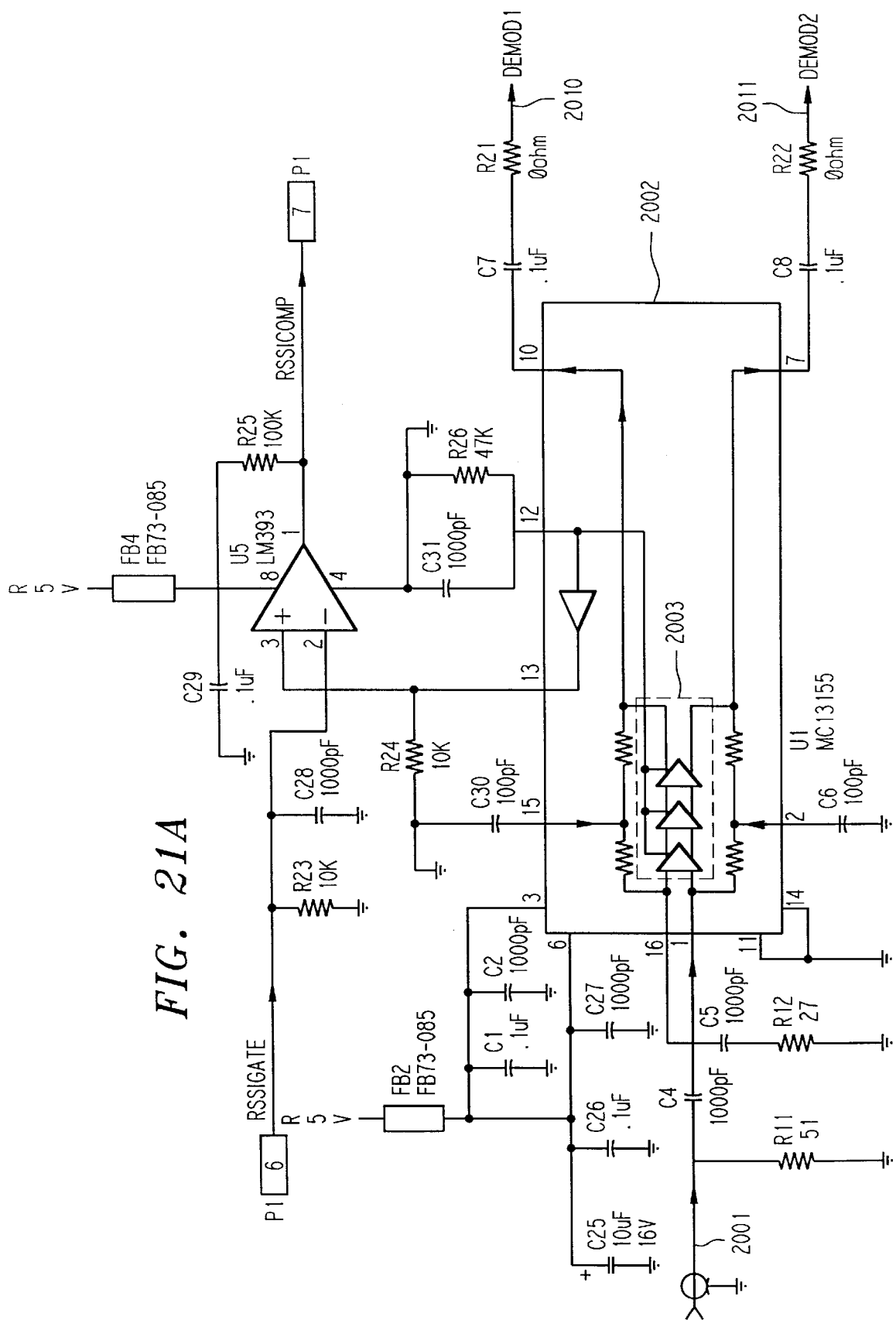
FIGS. 21A and 21B are schematic diagrams showing a preferred digital circuit embodiment of part of a receiving system used in conjunction with the circuitry of FIGS. 18 and 19.
Figure 21B:
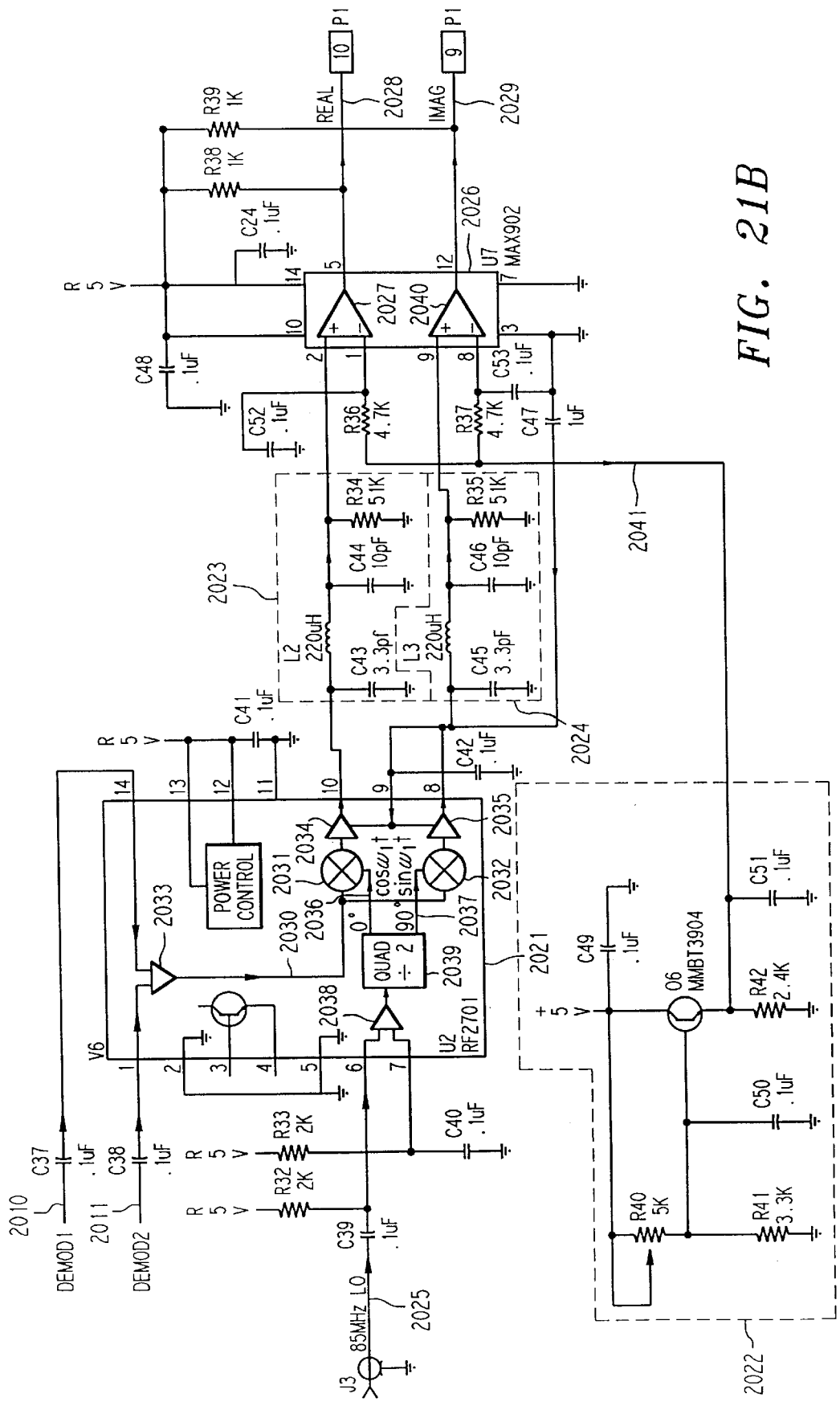

A preferred embodiment of a receiver is shown in part in FIGS. 21A and 21B. Standard electrical engineering symbols and terms are used in FIGS. 21A and 21B; thus, the following explanation will be limited to relating FIGS. 21A and 21B to the prior description of the invention in some its various embodiments.

A received signal 2001 is provided to an IF amplifier shown in FIG. 21A. The received signal 2001 may undergo prior conditioning and may be downconverted to an intermediate frequency for processing. The received signal 2001 is coupled to a capacitor C4 which passes the high frequency components of the received signal 2001. The output of the capacitor C4 is coupled to a first integrated chip U1 which is preferably an MC13155 chip manufactured by Motorola. Specifically, the output of capacitor C4 is coupled to a hardlimit amplifier 2003 located on the first integrated chip U1 for hardlimiting the output of capacitor C4. The hardlimit amplifier provides a differential output comprising a first differential output signal 2010 and a second differential output signal 2011.

The differential output signals 2010, 2011 are coupled to a second integrated circuit U2 which, as shown in FIG. 21B, is preferably an RF2701 chip manufactured by RF Micro Devices. Specifically, the differential output signals 2010, 2011 are coupled to a differential amplifier 2033 which produces an amplified output signal 2030. The amplified output signal 2030 is split into two branches by a power divider (not shown) and coupled via a first branch to a first multiplier 2031 (e.g., multiplier 1111 in FIG. 15A) and via a second branch to a second multiplier 2032 (e.g., multiplier 1116 in FIG. 15A). The first multiplier 2031 has as a second input a reference signal 2036 comprising a first square wave of frequency $\omega_1 t$ (which, after low pass filtering, becomes $\cos \omega_1 t$), and the second multiplier 2032 has as another input a reference signal 2037 comprising a second square wave of frequency $\omega_1 t$ (which, after low pass filtering, becomes $\sin \omega_1 t$) phase offset from the first square wave by 90 degrees.

The reference signals 2036, 2037 are generated from a local oscillator (not shown) which provides a local oscillator signal 2025 to filter capacitor C39, the output of which is connected to the second integrated chip U2. Specifically, the output of capacitor C39 is connected to an amplifier 2038, the output of which is coupled to a quad divide-by-two circuit 2039 for splitting its input into two reference signals 2036, 2037, the first reference signal 2036 having a 0-degree delay and the second reference signal 2037 having a 90-degree delay. The outputs of multipliers 2031 and 2032 are amplified by a first output amplifier 2034 and a second output amplifier 2035, respectively.

The output of the first output amplifier 2034 is coupled to a first low pass filter 2023, and the output of the second output amplifier 2035 is coupled to a second low pass filter 2024. The output of the first low pass filter 2023 is connected to one input of a first comparator 2027. The output of the second low pass filter 2024 is connected to one input of a second comparator 2040. The first comparator 2027 and second comparator 2040 each have as a second input a DC threshold signal 2041 generated by a DC bias circuit 2022. The DC threshold signal 2041 is coupled to the first mparator 2027 by a low pass filter comprising capacitor C52 and resistor R36, and similarly to the second comparator 2040 by a low pass filter comprising capacitor C53 and resistor R37. The first comparator 2027 and second comparator 2040 provide output signals 2028 and 2029, respectively, each of which comprises a TTL level signal suitable for further processing using digital circuits. In particular, output signals 2028 and 2029 may each comprise a square wave signal having values of +1 and 0 times a fixed voltage.

Figure 18:
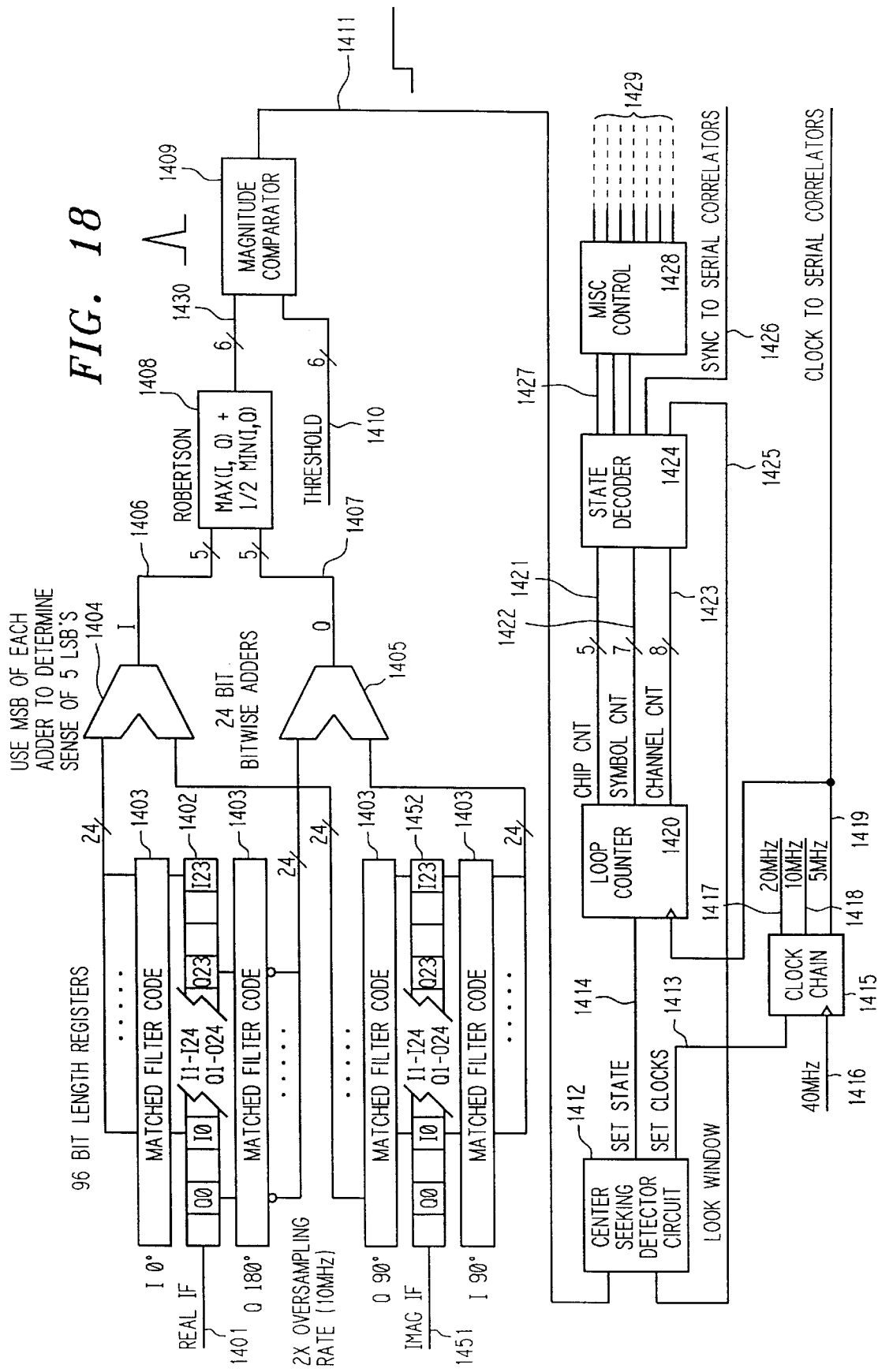
FIG. 18 is a block diagram of a preferred non-coherent matched filter and associated receiver components.
Figure 19:
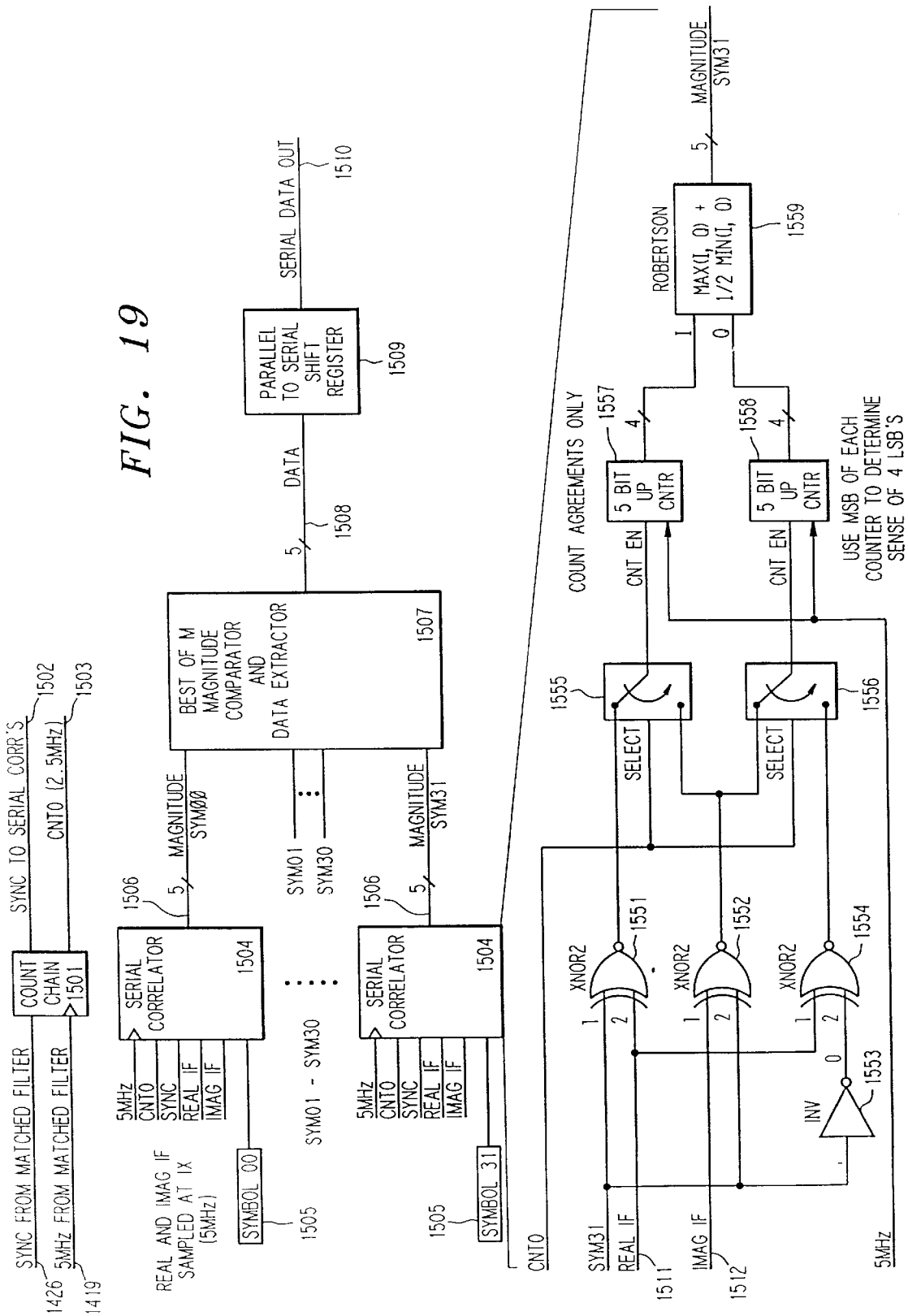
FIG. 19 is a block diagram of a preferred digital circuit embodiment of a set of non-coherent serial correlators and associated receiver components.

In a preferred embodiment, the output signals 2028 and 2029 are sampled and provided to remaining circuitry as shown in FIGS. 18 and 19. Specifically, the output signals 2028 and 2029 are sampled twice per chip time (i.e., at 10 MHz) as provided to the circuitry in FIG. 18, and once per chip time (i.e., at 5 MHz) as provided to the circuitry in FIG. 19.

FIG. 18 is a block diagram of a non-coherent matched filter and associated receiver components.

In a preferred embodiment, a digitally sampled version of a real portion and an imaginary portion of the received signal s*(t) 401 are input to the circuitry of FIG. 18. Thus, a real-I/imaginary-Q signal 1401 is connected to signal 2028 shown in FIG. 21B, and input to an even/odd shift register 1402. An imaginary-I/real-Q signal 1451 is connected to signal 2029 shown in FIG. 21B, and input to an even/odd shift register 1452.

In the FIG. 18 embodiment, the even/odd shift register 1402 is 96 bits long. Because the real-I/imaginary-Q signal 1401 is clocked at twice the system clock rate, every other odd chip (rather than every odd chip) of the even/odd shift register 1402 is selected and compared with the odd chips of the matched filter code 1403. In a preferred embodiment, matches between every other odd chip of the even/odd shift register 1402 and the odd chips of the matched filter code are compared. The chip matches are coupled to real adder 1404 for counting. Every other even chip (rather than every even chip) of the even/odd shift register 1402 is compared with the even chips of the matched filter code 1403, and the result of the comparison coupled to the imaginary adder 1405 for counting.

In the FIG. 18 embodiment, the even/odd shift register 1452 is 96 bits long. Every other odd chip of the even/odd shift register 1452 is compared with the odd chips of the matched filter code 1403. Matches between every other odd chip of the even/odd shift register 1452 and the odd chips of the matched filter code are compared. The chip matches are coupled to the real adder 1404 for counting. Every other even chip of the even/odd shift register 1452 is compared with the even chips of the matched filter code 1403, and coupled to the imaginary adder 1405 for counting.

Although the FIG. 18 embodiment is configured to receive a preamble 48 chips in length, in a preferred embodiment the FIG. 18 receiver is configured to receive a preamble of 128 chips in length, in accordance with the preferred FIG. 17D message format. In this latter embodiment, the even/odd shift register 1402 and the odd/even register 1452 are each 256 bits long, and the related circuitry is scaled up appropriately.

In the FIG. 18 embodiment, the real adder 1404 has 24 individual bit inputs, each one of which may be a logical "0" to indicate no match or a logical "1" to indicate a match. The real adder 1404 generates a 5-bit real sum 1406, which represents the absolute value of the number of odd chips that were matched. The imaginary adder 1405 has 24 individual bit inputs and generates a 5-bit imaginary sum 1407 representing the absolute value of the number of even chips that were matched.

The real sum 1406 and the imaginary sum 1407 are coupled to a Robertson device 1408, which computes an approximation of a square root of the sum of the squares of the real sum 1406 and the imaginary sum 1407, as described herein.

An output of the Robertson device 1408 is coupled to an input of a comparator 1409, which compares the output of the Robertson device 1408 with a threshold value 1410. In a preferred embodiment, the threshold value is preset, or may be set in response to a control on the receiver. The threshold value may also be set in a variety of other manners, such as in response to a control in the transmission or to receiving conditions.

A comparator 1409 generates an output pulse 1411. The output pulse is a logical "1" when the input 1430 exceeds the threshold 1410, and a logical "0" when it does not. The output pulse 1411 may have a duration of 100, 200, 300 or 400 nanoseconds.

The output pulse 1411 is coupled to an input of a center seeking detector circuit 1412. The center seeking detector circuit 1412 receives the output pulse 1411 and generates a set clock pulse 1413 which denotes the end of the received matched filter code 1352, and which is aligned with the center of a received chip so that the receiver clock can be synchronized with the center of each received chip in a received chip stream.

In a preferred embodiment, the center seeking detector circuit 1412 counts the number of logic "1" values in the output pulse 1411 (i.e., the length of time that the output of the Robertson device 1408 exceeds the threshold value 1410), thereby measuring the duration of the output pulse 1411 (e.g., from 1 to 4 clock periods of the 10 MHz clock, corresponding to up to four bits of the even/odd shift register 1402 and the even/odd shift register 1452). The center seeking detector circuit 1412 generates a set clock pulse 1413 which re-initializes a system clock for serial correlation by a set of serial correlators (see FIG. 19) after a preset delay period. The preset delay period ensures that the serial correlation clock is properly synchronized with the center of the output pulse 1411. Preferred delay periods are shown in Table 18-1:

TABLE 18-1

| Length of Output Pulse | Delay in Nanoseconds |
| --- | --- |
| 1 | 50 |
| 2 | 100 |
| 3 | 150 |
| 4 | 200 |

The system clock may be re-initialized at the start of each minor frame 1302.

The set clock pulse 1413 is coupled to a clock chain 1415, which is also coupled to a locally generated 40 MHz clock signal 1416. The clock chain 1415 generates a 20 MHz clock signal 1417, a 10 MHz clock signal 1418, and a 5 MHz clock signal 1419. In a preferred embodiment, the 5 MHz clock signal 1419 is coupled to, among other things, a set of 32 serial correlators (see FIG. 19).

The 5 MHz clock signal 1419 is coupled to a loop counter 1420. The loop counter 1420 counts the number of chips received and generates a chip count signal 1421, a symbol count signal 1422, and a channel or loop count signal 1423, similar to the chip count signal 1314, symbol count signal 1315, and channel count signal 1316, respectively, generated in the transmitter 1337.

The chip count signal 1421, symbol count signal 1422, and channel count signal 1423 are coupled to a state decoder 1424, which determines whether the received chip is part of the matched filter code 1352, the fill code 1305, or a data sequence symbol code 1306, similar to the state decoder 1317 in the transmitter 1337, and generates a state identifier 1425, similar to the selection signal 1318 generated in the transmitter 1337. The state identifier 1425 is coupled to an input of the center seeking detector circuit 1412.

The state decoder 1424 generates a synchronization signal 1426, which is coupled to a set of 32 serial correlators (see FIG. 19). The state decoder 1424 also generates a plurality of control signals 1427, which are coupled to a control circuit 1428. Although connections are not expressly shown, the control circuit 1428 has control outputs 1429 connected to various parts of the circuit for the purpose of exercising synchronous control.

The center seeking detector circuit 1412 also generates a set state signal 1414 which may be used to place the loop counter 1420 in a known state, or to reset the individual count signals 1421, 1422 and 1423 associated with the loop counter 1420.

Operation of the center seeking circuit 1412 in relation to the other elements shown in FIG. 18 may be further explained with reference to FIG. 20, which is a diagram of a series of correlation pulses 2007, 2011, 2012, 2013 and 2014 corresponding to output pulse 1411 over a series of minor frames 1302. A first correlation pulse 2007 is detected as shown in FIG. 18. The first correlation pulse 2007 has a duration of three sample periods 2008. Thus, according to Table 18-1, the center seeking circuit 1412 generates a set clock pulse 1413 having a delay of 150 nanoseconds.

The control circuit 1428 determines, based in part on the count signals 1421 through 1423 of the loop counter 1420, the next minor frame 1302 in which the receiver is to be active. In many cases, a receiver receives in only one minor frame 1302 per major frame 1301 located in the same relative position chronologically from major frame 1301 to major frame 1301. Thus, in the next active minor frame 1302, the receiver opens a timing window 2010 during which the next output pulse 1411 is expected. The timing window may be, for example, 1.6 milliseconds in duration, and will be opened a predetermined time length 2009 before the next output pulse 1411 is expected assuming no deviation between the transmitter and receiver clocks between transmissions.

Figure 20:
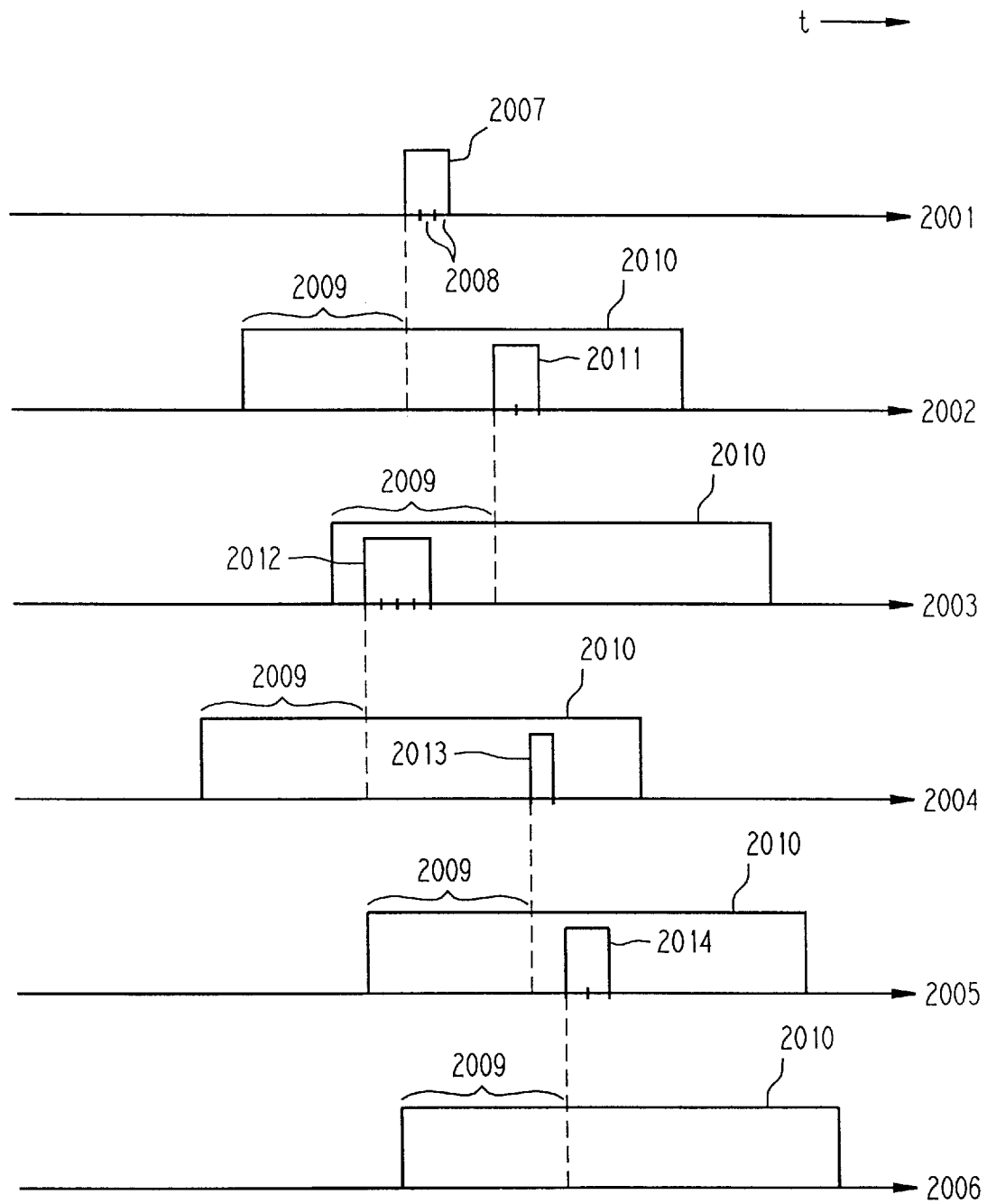
FIG. 20 is a diagram showing exemplary correlation pulses within a predetermined timing window.

In the example of FIG. 20, a second correlation pulse 2011 is generated during the timing window 2010 but some amount of time after expected. The second correlation pulse 2011 is two sample periods in duration, and thus, according to Table 18-1, the center seeking circuit 1412 generates a set clock pulse 1413 having a delay of 100 nanoseconds. In the following active minor frame 1302, the timing window 2010 has been shifted in relative time based upon the second correlation pulse 2011, and a third correlation pulse 2012 is generated within the timing window 2010 but some amount of time before expected. The third correlation pulse 2012 is four sample periods in duration and causes a set clock pulse 1413 having a delay of 200 nanoseconds.

Similarly, a fourth correlation pulse 2013 and fifth correlation pulse 2014 are generated in the next two active minor frames 1302. However, in the next active minor frame 1302 no correlation pulse is generated; thus, the receiver remains inactive because synchronization has not been achieved. Measures may be undertaken at such a point to reacquire synchronization and/or re-establish proper timing.

FIG. 19 is a block diagram of a preferred system of serial correlators operating in parallel with one another and operating in conjunction with the circuitry of FIG. 18 and FIGS. 21A and 21B.

A digitally sampled version of a real portion and an imaginary portion of the received signal s*(t) 401 are input to the circuitry of FIG. 19. Thus, a real-I/imaginary-Q signal 1511 and an imaginary-I/real-Q signal 1512 are generated from the received signal s*(t) 401.

In a preferred embodiment, the 5 MHz clock signal 1419 and the synchronization signal 1426 as described in FIG. 18 are coupled to a count chain 1501, which generates an output synchronization signal 1502 for the serial correlators and a counter clock 1503.

The 5 MHz clock signal 1419, the synchronization signal 1502, the counter clock 1503, the real-I/imaginary-Q signal 1511 and the imaginary-I/real-Q signal 1512 are each coupled to a set of 32 serial correlators 1504. A set of 32 symbol generators 1505, one for each symbol 00 through 1F (hexadecimal), are also coupled to each serial correlator 1504.

Each serial correlator 1504 recognizes a single one of the 32 symbol codes and generates a magnitude signal 1506 indicating the number of agreements with that symbol code. The 32 magnitude signals 1506 are coupled to a best-of-M device 1507, which determines which one of the 32 magnitude signals 1506 has the greatest value and generates an output symbol 1508 based thereon. If serial output data is desired, the output symbol 1508 may be coupled to a parallel-to-serial shift register 1509, which generates a sequence of serial data bits 1510 in response.

An exploded view of an individual serial correlator 1504 is also shown in FIG. 19. The serial correlator 1504 shown in the FIG. 19 embodiment operates in a conceptually similar manner to the dual-integrator non-coherent serial CPM correlator 1102 depicted in FIG. 15A. In an alternative preferred embodiment, the 32 serial correlators operate according to the correlator embodiments described with respect to FIG. 15B or 15D.

In a preferred embodiment, the real-I/imaginary-Q signal 1511 is coupled to XNOR gates 1551 and 1552, and the imaginary-I/real-Q signal 1512 is coupled to XNOR gate 1552. XNOR gates generate the inverted XOR of their inputs. The XNOR gates 1551 and 1552 perform the function of multipliers 1121, 1123, 1125 and 1127 depicted in FIG. 15A. Each serial correlator 1504 is programmed to correlate to a different symbol code; accordingly, the appropriate symbol code is clocked into the XNOR gates 1551, 1552 and 1554 from the symbol generator 1505. The symbol code is inverted by invertor 1553 before being received by XNOR gate 1554 because XNOR gate 1554 operates on the inverse of the q(t) signal.

Summation and integration is carried out by a pair of multiplexors 1555, 1556 and counters 1557, 1558. The outputs of the XNOR gates 1551 and 1552 are coupled to an real multiplexor 1555; the outputs of the XNOR gates 1552 and 1554 are coupled to an imaginary multiplexor 1556. The counter clock 1503 is coupled to a control input of the real multiplexor 1555 and the imaginary multiplexor 1556 in order to control the integrate-and-dump function. The outputs of the real multiplexor 1555 and the imaginary multiplexor 1556 are coupled to the enable inputs of the real counter 1557 and the imaginary counter 1558, respectively. Because the received I and Q signals are time staggered, the real multiplexor 1555 selects between real I and real Q signals and provides them to the real counter 1557 to effectively sum and integrate the real I and real Q signals; the imaginary multiplexor 1556 and imaginary counter 1558 operate in an analogous manner with respect to imaginary I and imaginary Q signals.

A reset command may be provided to the real counter 1557 and the imaginary counter 1558 to perform an operation analogous to a "dump" as would be carried out with integrate-and-dump circuits shown in FIG. 15A.

The output of the real counter 1557 and of the imaginary counter 1558 are coupled to a Robertson device 1559, which computes an approximation to the root of the sum of the squares of its inputs. An output of the Robertson device 1559 is output from the serial correlator 1504, and generally corresponds to the final correlation signal 1144 such as described with respect to FIG. 15A.

A serial correlator 1504 may be designed to operate with multi-bit resolution to improve correlation accuracy.

FIG. 22 is a block diagram showing a preferred embodiment of a Robertson device 1601.

The Robertson device 1601 has an input 1602 and an input 1603, and computes an approximation of the square root of the sum of the squares of its inputs, as shown in equation 1152. The input 1602 and input 1603 may be binary inputs such as 5-bit binary numbers. The input 1602 and the input 1603 are coupled to a comparator 1604, which generates a control output 1605 indicating whether the input 1602 is greater than the input 1603.

The input 1602 and the input 1603 are also coupled to a selector 1606, which outputs the greater of the input 1602 and the input 1603 in response to the control output 1605.

The input 1602 and the input 1603 are also coupled to a selector 1607, which outputs the lesser of the input 1602 and the input 1603 in response to an inverse of the control output 1605.

The output of the selector 1606 and the output of the selector 1607 are coupled to an adder 1608. However, prior to being connected to the adder 1608, the output of the second selector 1607 is shifted right one bit, i.e., the 0 (least significant) bit of the output of the second selector 1607 may be discarded, the 1 (next least significant) bit of the output of the second selector 1607 may be transferred to the 0 (least significant) bit position, the 2 bit of the output of the second selector 1607 may be transferred to the 1 bit position, and so on. The right shift has the effect of dividing the output of the second selector 1607 by two (and dropping the least significant bit).

The output of the adder 1608 may be output from the Robertson device 1601, which therefore effectuates equation 1152 as set forth herein.

Previously herein is explained the concept and operation of M-ary spread spectrum transmission, whereby data throughput may be increased by assigning a different predefined data bit pattern to each of M different spreading codes (i.e., symbol codes) and deriving the predefined data bit pattern at the receiver in response to determining which of the M symbol codes was transmitted. Thus, for example, the receiver embodiments shown in FIGS. 18, 19, 21A and 21B have been described previously with reference to a 32-ary system, wherein 32 correlators operate in parallel to determine which of 32 symbol codes has been transmitted, and to derive one of the predefined data symbols thereby. Data throughput may be further increased by use of phase encoding as described below.

Phase encoding generally involves the imposition in the transmitted signal of known phase changes at selected intervals, wherein the phase changes correspond to information to be transmitted apart from or in addition to the M-ary encoded information. Decoding of the phase changes at the receiver allows recognition of the phase encoded information.

Phase encoding may be either absolute or differential in nature. Absolute phase encoding generally involves the imposition of a selected phase upon the signal to be transmitted irrespective of the immediately prior phase of the transmitted signal. Differential phase encoding generally involves the imposition of a selected phase upon the signal to be transmitted, giving consideration to the immediately prior phase of the transmitted signal. For absolute phase encoding, recovery and tracking of the carrier signal is usually necessary at the receiver, which may involve a difficult and relatively complex process. To avoid having to recover and track the carrier signal, differential phase encoding is generally preferred over absolute phase encoding with respect to the embodiments disclosed herein.

Figure 24A:
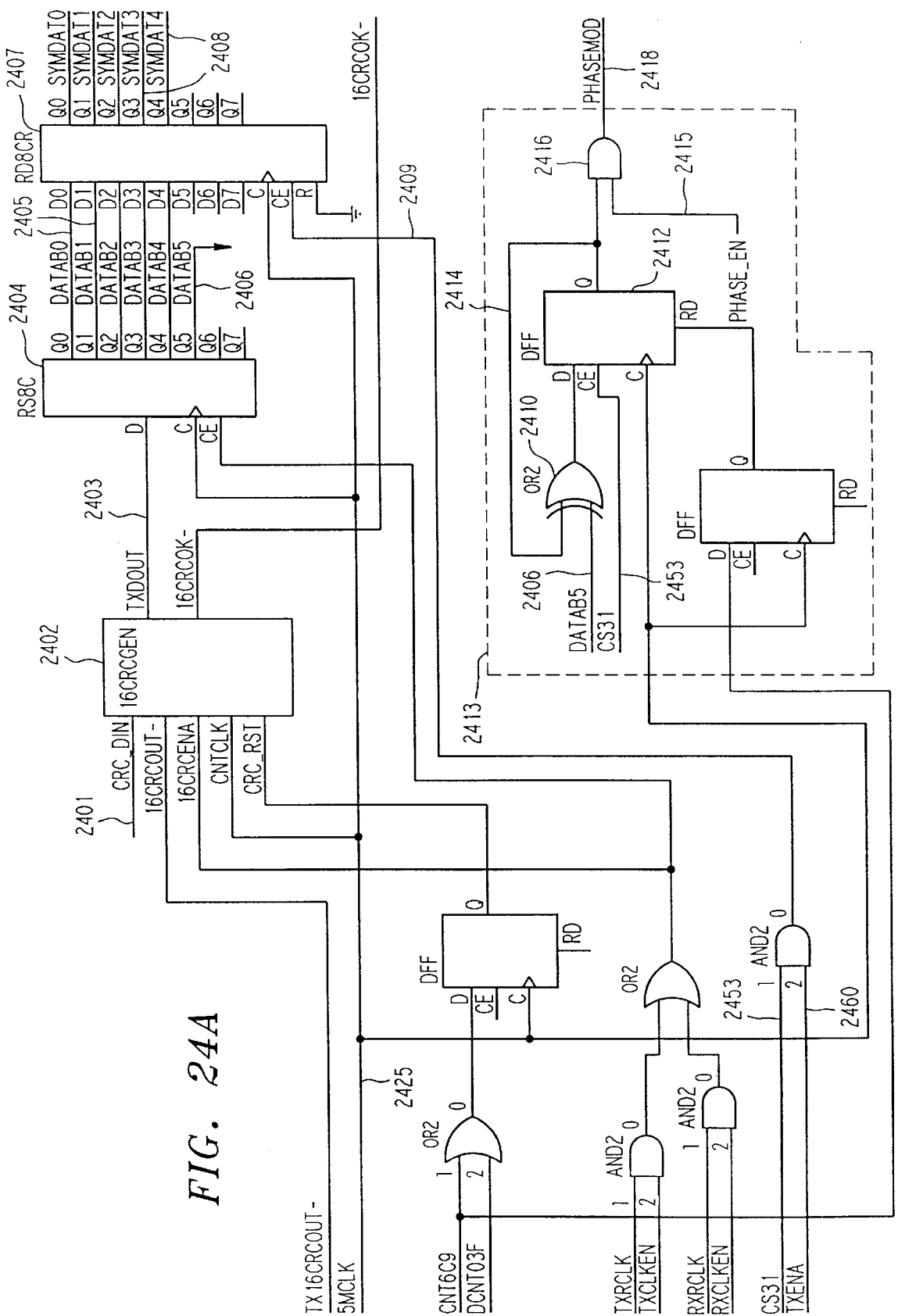
FIGS. 24A and 24B are digital circuit block diagrams of a spread spectrum transmitter employing differential phase encoding.
Figure 24B:
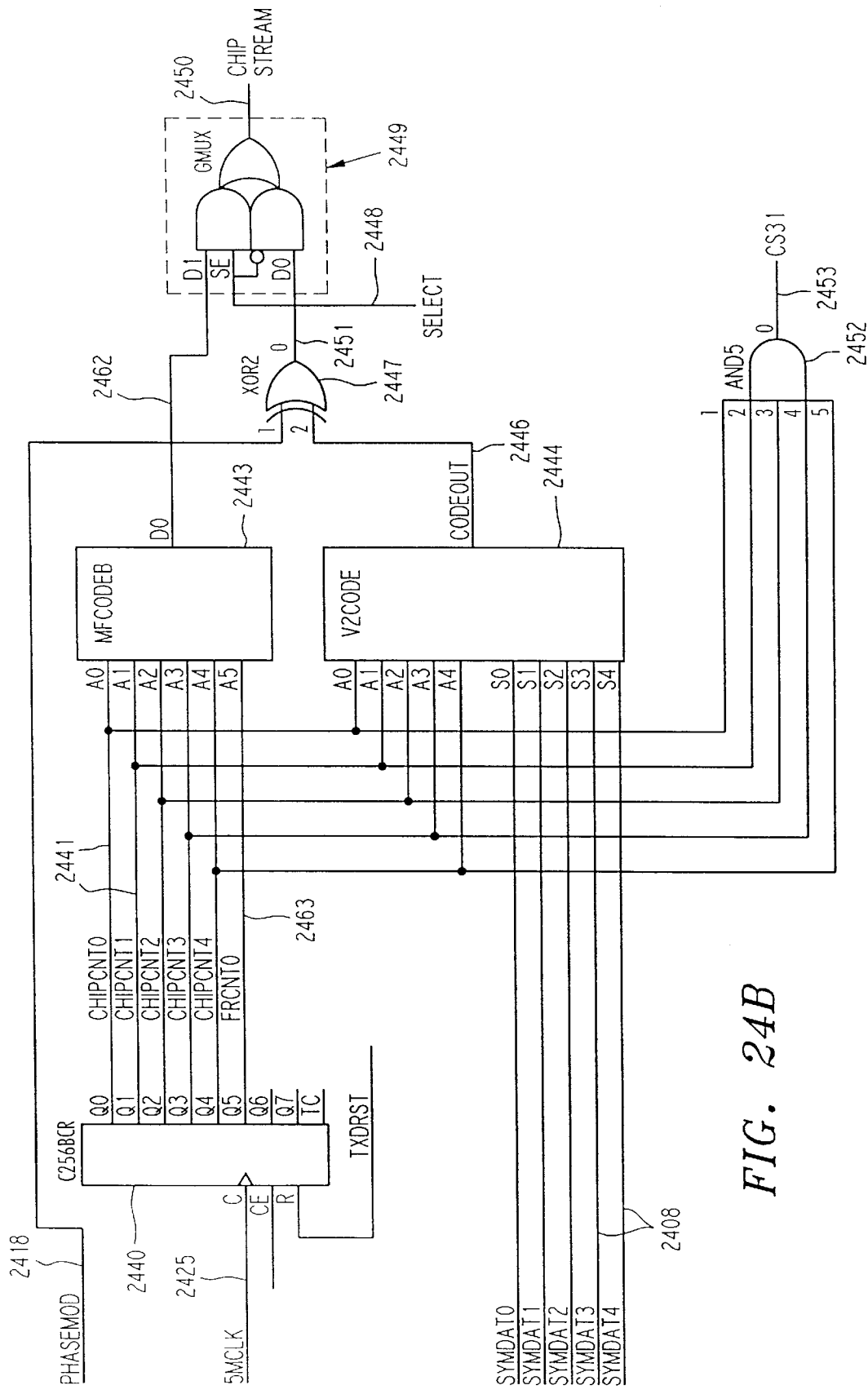
Figure 24C:
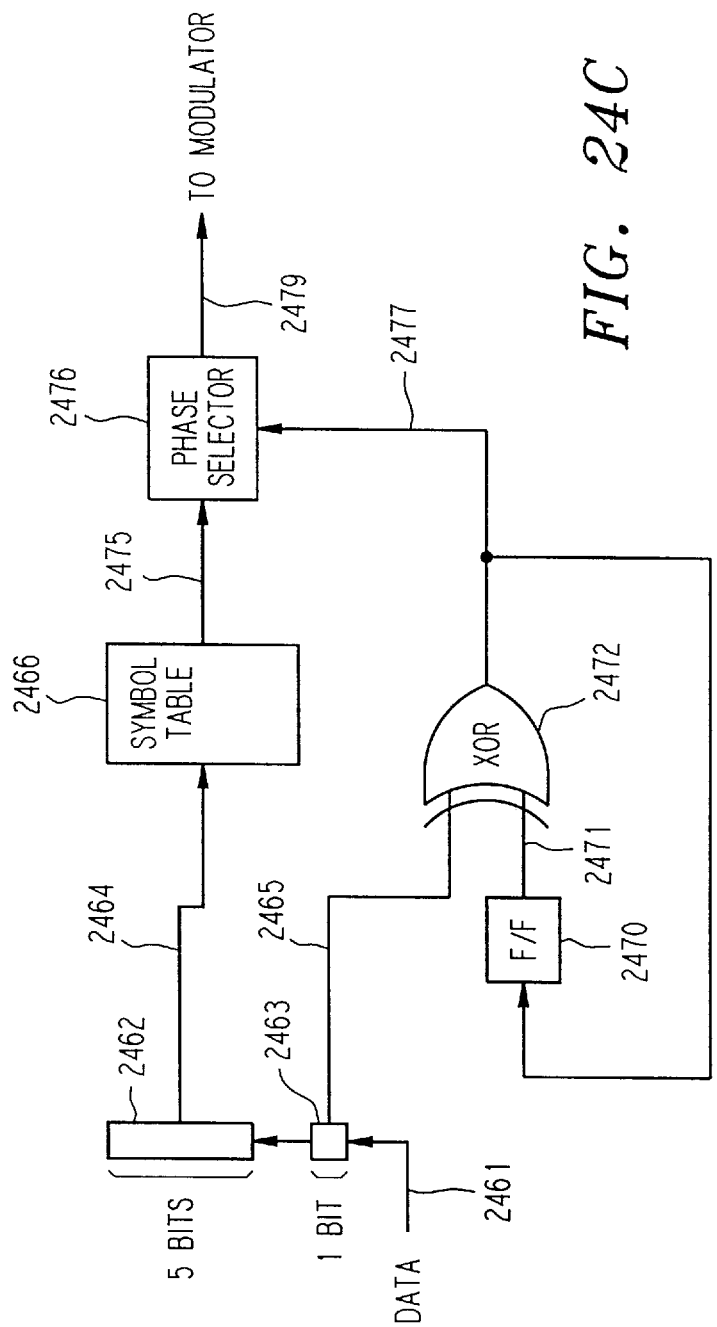
FIG. 24C is a general block diagram thereof.

FIGS. 24A and 24B are digital circuit block diagrams of a spread spectrum transmitter employing differential phase encoding, and FIG. 24C is an abstract block diagram of the transmitter of FIGS. 24A and 24B. In FIG. 24C, a data signal 2461 comprising a plurality of data bits is serially clocked into registers 2462 and 2463. The data bits in register 2462 form a data symbol, such as previously described herein with respect to the transmitter of FIG. 17A, and comprise an address 2464 for accessing a symbol table 2466. Symbol table 2466 comprises a plurality of spread spectrum codes, or symbol codes, such as also previously described herein with respect to the transmitter of FIG. 17A. In response to each data symbol in register 2462, a symbol code from symbol table 2466 is selected and output over line 2475.

The data in register 2463 comprises phase encoding information. In a preferred embodiment, register 2463 comprises a single-bit register or flip-flop, and therefore holds one data bit of information from data signal 2461.

Register 2463 is connected to one input of an XOR gate 2472. A prior phase state register 2470 holds the prior phase state information, $\theta_{j-1}$, and is connected to the other input of XOR gate 2472. In one embodiment, prior phase state register 2470 holds a 0-bit value if the previous phase was 0°, and holds a 1-bit value if the previous phase was 180°. The present phase state $\theta_j$ is selected based on the prior phase state information $\theta_{j-1}$, stored in prior phase state register 2470 and the phase encoding bit stored in register 2463, according to a preferred encoding scheme shown in Table 24-1.

TABLE 24-1

| Previous Code Phase -- $\theta_{j-1}$ | Previous Phase Representation | Encoding Bit | Present Code Phase -- $\theta_j$ |
| --- | --- | --- | --- |
| 0° | 0 | 0 | 0° |
| 0° | 0 | 1 | 180° |
| 180° | 1 | 0 | 180° |
| 180° | 1 | 1 | 0° | where the previous phase representation is stored in register 2470, and the encoding bit is stored in register 2463. The phase of the transmitted signal remains the same if register 2463 contains a 0-bit value, but is inverted (i.e., by taking the complement of each chip in the symbol code) if register 2463 contains a 1-bit value. The XOR gate 2472 thereby selects a present phase state $\theta_j$, and outputs a phase selection signal 2477 according to the logic shown in Table 24-1. After each symbol code period, the present phase state $\theta_j$ from phase selection signal 2477 is stored in the prior phase state register 2470.

The phase selection signal 2477 is coupled to a phase selector 2476. The phase selector 2476 operates on the symbol code selected from symbol table 2466 according to the logic of Table 24-1. Thus, phase selector 2476 inverts the selected symbol code if the output of XOR gate 2472 is a 1, and does not invert the selected symbol code if the output of XOR gate 2472 is a 0. The phase selector 2476 outputs a phase encoded signal 2479. The phase encoded signal 2479 may be sent to a modulator for further processing, such as for dividing into I and Q chip streams, generating I and Q waveforms in response to the I and Q chip streams, and combining and transmitting the I and Q waveforms in a manner similar to that described generally with respect to the transmitter of FIG. 6.

In an exemplary embodiment, the transmitter of FIG. 24C operates in a 32-ary system, wherein each of 32 spread spectrum codes or symbol codes each represent a different data symbol, and each data symbol comprises a unique pattern of 5 data bits. Six bits are sent in each symbol period. Five bits are used to select a symbol code, while the sixth bit is used to differentially encode the symbol code. In this exemplary embodiment, 40 symbols are sent per transmission burst in a time division multiple access communication system such as described previously, each symbol (except the first symbol) conveying six bits of information, including the phase encoded information. Thus, a total of 239 bits of information are transmitted per transmission burst, an almost 20% increase in data throughput over non-phase encoded transmission.

The first symbol code in each transmission burst acts as a phase reference, and therefore conveys no phase encoded information. Thus, in the exemplary embodiment described above, the first symbol code conveys only five bits of information. Subsequent symbol codes are phase encoded and therefor convey six bits of information for each symbol code.

Figure 24D:
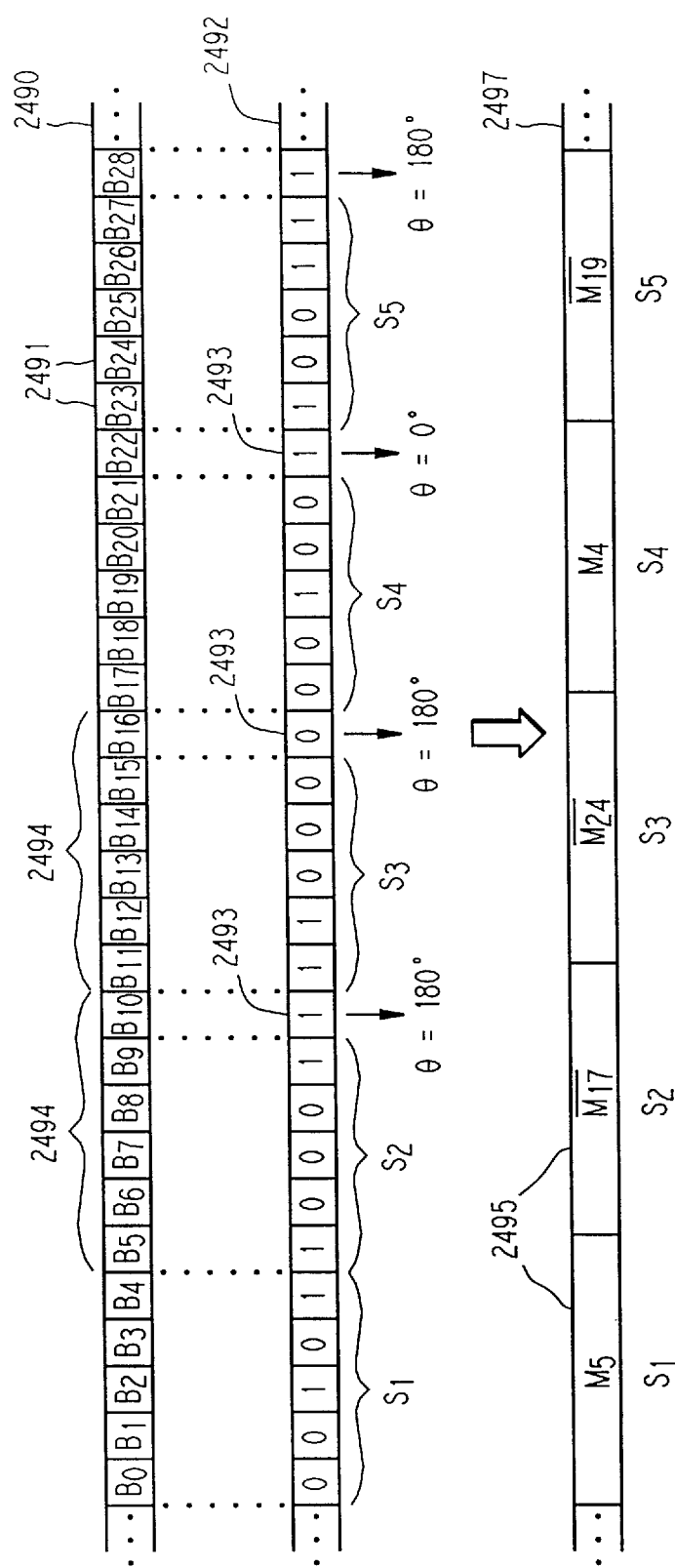
FIG. 24D is a diagram of an exemplary input data sequence and phase encoded symbol code output sequence.

FIG. 24D is a diagram of an exemplary input data sequence and an exemplary symbol code output sequence. In FIG. 24D, a data sequence 2490 comprising data bits 2491 corresponds, for example, to data signal 2461 in FIG. 24C. A specific exemplary data sequence 2492 with actual data values is also shown in FIG. 24D, with relation to data sequence 2490. A first symbol S1 corresponds to the first five bits B0–B4 in the data sequence 2492; a second symbol S2 corresponds to the next five bits B5–B9 in the data sequence 2492; and so on. The phase of the first symbol S1 establishes a reference. The phase reference may be selected as, e.g., 0°. The phase of the second symbol S2 is determined by the sixth bit (i.e., bit B10) after the first symbol S1, according to the logic set out in Table 24-1. Because in the present example bit B10 is a 1-bit, the phase of the second symbol S2 is inverted with respect to first symbol S1—i.e., the phase of the second symbol S2 is 180°.

In a similar manner, for a third symbol S3 corresponding to the next five bits B11–B15 in the data sequence 2492, and its phase is established by the sixth bit B16 following the preceding data symbol S2. Because in the present example bit B16 is a 0-bit, the phase of the third symbol S3 is not inverted with respect to the second symbol S2—i.e., the phase of third symbol is also 180°. The same encoding selection is performed for the subsequent bits in the data sequence 2492, with each five bits of a six-bit sequence 2494 defining a symbol, and the sixth bit 2493 of the six-bit sequence 2494 defining the relative phase of the symbol.

An output signal 2497 in FIG. 24D comprises a sequence of phase-encoded data symbol codes 2495. Thus, for the exemplary data sequence 2492, the output signal 2497 comprises a noninverted fifth symbol code M5, an inverted seventeenth symbol code M17, an inverted twenty-fourth symbol code M24, a non-inverted fourth symbol code M4, and so on.

FIGS. 24A and 24B are more detailed digital circuit block diagrams of a spread spectrum transmitter employing differential phase encoding. In the embodiment shown in FIGS. 24A and 24B, a serial input data stream 2401 is coupled to a CRC (cyclical redundancy check) encoder 2402. The CRC encoder 2402 adds bits to the serial input data stream 2401 which may be used at a receiver for determining if a transmitted signal was sent without errors. The CRC encoder 2402 outputs a serial data signal 2403, which corresponds, e.g., to data signal 2461 in FIG. 24C.

Data signal 2403 is coupled to a serial-to-parallel register 2404, which converts the data signal 2403 into a series of 6-bit sequences. The first five bits of each 6-bit sequence are connected over lines 2405 to a latch 2407. The sixth bit of each 6-bit sequence, referred to herein as the phase selection bit, is coupled over line 2406 to a symbol phase encoder 2413. Output lines 2408 from latch 2407 are used to select one of M symbols stored in a symbol code lookup table 2444 (e.g., a ROM) shown in FIG. 24B. In an exemplary embodiment, the symbol code lookup table 2444 stores the set of thirty-two symbol codes appearing in Table 17-4. Output lines 2408 comprise five bits of an address of the symbol code lookup table 2444. The lookup table address also comprises chip count lines 2441 received from a chip counter 2440.

In operation, data bits in data signal 2403 are clocked into the serial-to-parallel register 2404 under control of a clock signal 2425 (e.g., a 5 MHz clock). The contents of the serial-to-parallel register 2404 are loaded in parallel to latch 2407 once each symbol period. A load latch signal 2409 controls loading of the latch 2407, such that the latch 2407 is loaded when both a transmit enable signal 2460 and an end symbol signal 2453 are active. The transmit enable signal 2460 is activated by a processor or other controller (not shown) when it is desired to transmit data over a communication channel. The end symbol signal 2453 is generated by an AND gate 2452 (shown in FIG. 24B) which receives as inputs the chip count lines 2441 and produces an active output when all of the chip count lines 2441 are in a logical high state—that is, chip counter 2440 has finished counting up to 32.

As noted, the output lines 2408 of the latch 2407 and chip count lines 2441 are used as an address for the symbol code lookup table 2444. Preferably, lines 2408 comprise the most significant bits of the address, and chip count lines 2441 comprise the least significant bits of the address. Each clock period of the clock signal 2415, the clock counter 2440 increments its count, thereby cycling through thirty-two different states reflected in the binary count on chip count lines 2441. In response to the ten address lines (five symbol selection lines 2408 and five chip count lines 2441), the symbol code lookup table 2444 outputs a symbol code signal 2446 comprising a sequence of chips corresponding to the selected symbol code. Each time the clock counter 2440 increments, chip count lines 2441 change accordingly and accesses the next chip of the selected symbol code stored in the symbol code lookup table 2444.

Differential phase encoding of the symbol code signal 2446 is accomplished by performing an exclusive-OR operation with a phase selection signal 2418 output from the phase encoder 2413 and the symbol code signal 2446 using XOR gate 2447 in FIG. 24B. The phase encoder 2413 operates by taking the phase selection bit of each 6-bit sequence from line 2406, as noted above, and comparing it with the previous phase as stored in a previous phase register 2412 (e.g., a flip-flop). In phase encoder 2413, XOR gate 2410 and previous phase register 2412 correspond functionally with XOR gate 2472 and flip-flop 2470 in FIG. 24C, except that the order of XOR gate 2410 and previous phase register 2412 are reversed to preserve synchronous operation. Loading of previous phase register 2412 is controlled by end symbol signal 2453. At the same time latch 2407 is loaded with the new data symbol, previous phase register 2412 is loaded with the new phase. While the symbol code is being transmitted, the next data symbol may be loaded into serial-to-parallel register 2404, and the next phase determined by XOR gate 2410. At the end of the symbol code transmission, the next data symbol and the next phase are loaded into latch 2407 and previous phase register 2412, respectively.

The output of previous phase register 2412 is a phase state signal 2414. Phase state signal 2414 is gated with a phase enable signal 2415. When the phase enable signal 2415 is active, symbol code signal 2446 is differentially phase encoded, and the transmitter thereby sends six bits each symbol period; when the phase enable signal 2415 is inactive, symbol code signal 2446 is not phase encoded, and the transmitter thereby sends only five bits each symbol period.

The output of XOR gate 2447, which outputs a differentially phase encoded symbol code signal 2461 when phase enable signal 2415 is active, is connected to a multiplexer 2449. In response to a select signal 2448, multiplexer 2449 selects as an output either the differentially phase encoded symbol code signal 2461, or a preamble/fill code signal 2462 from a preamble/fill code table 2443. The preamble/fill code table 2443 stores a preamble code comprising, e.g., 48 chips, and a fill code comprising, e.g., 16 chips, for a total of 64 chips. The preamble/fill code table 2443 is addressed by chip count lines 2441 and a sixth line 2463, to allow sixty-four stored chips to be sequentially accessed.

In a preferred embodiment, for a given burst in accordance with the TDMA timing structure shown, e.g., in FIG. 17D, select signal 2448 first selects as an output sixty-four chips comprising a preamble and fill code from preamble/fill code table 2443. After sixty-four chips are output, the select signal 2448 changes state and selects as an output the differentially encoded symbol code signal 2461. In a particular embodiment, the select signal 2448 selects forty symbols to be transmitted from the differentially encoded symbol code signal 2461. Multiplexer 2450 outputs a chip stream signal 2461 to a modulator, wherein the chip stream signal 2461 may be divided into I and Q chip streams for generating and transmitting of a CPM signal as previously described herein.

Figure 25A:
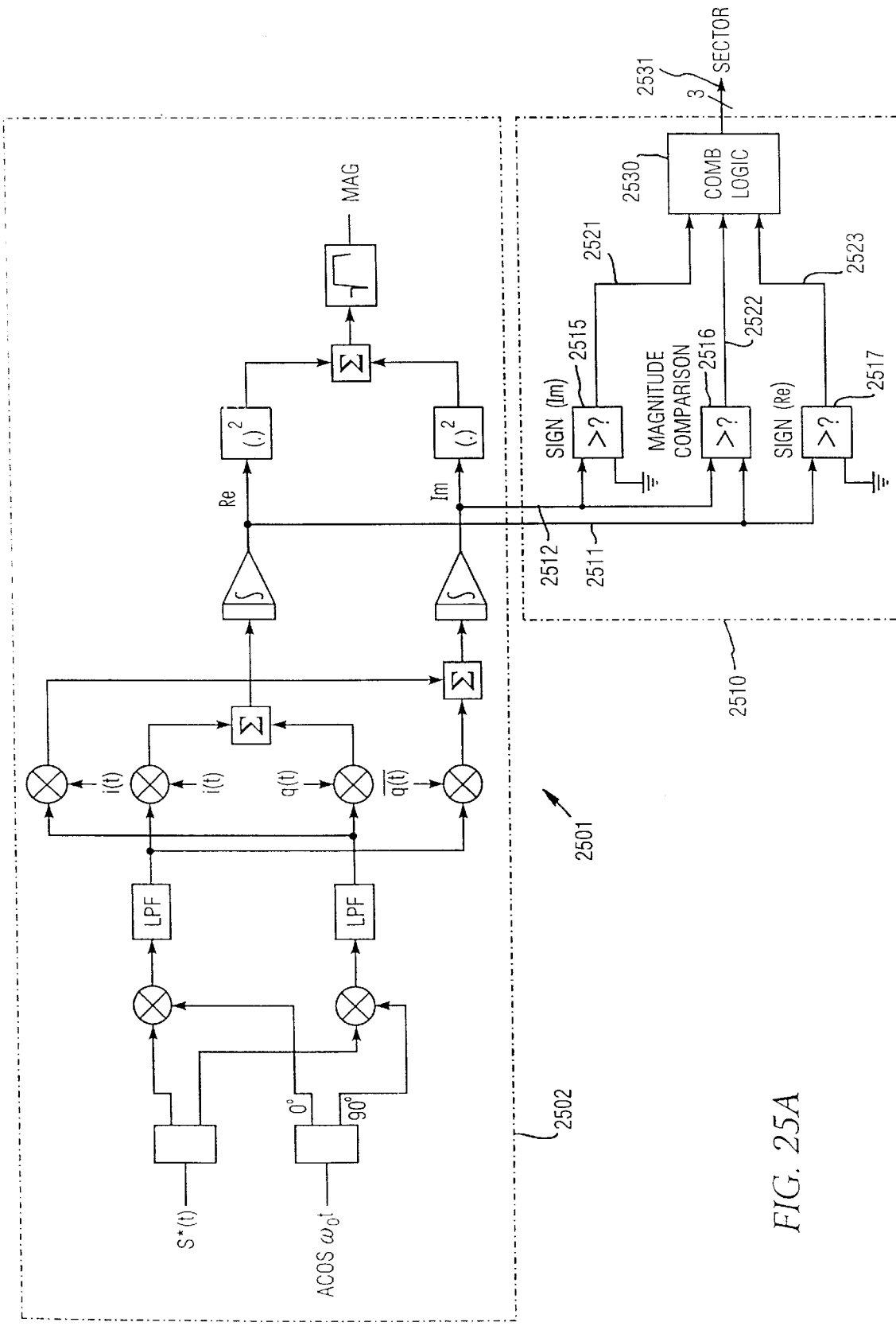
FIGS. 25A and 25B–25C are block diagrams of two different embodiments of a receiver for carrying out phase decoding to obtain extra information from the received signal.
Figure 25B:
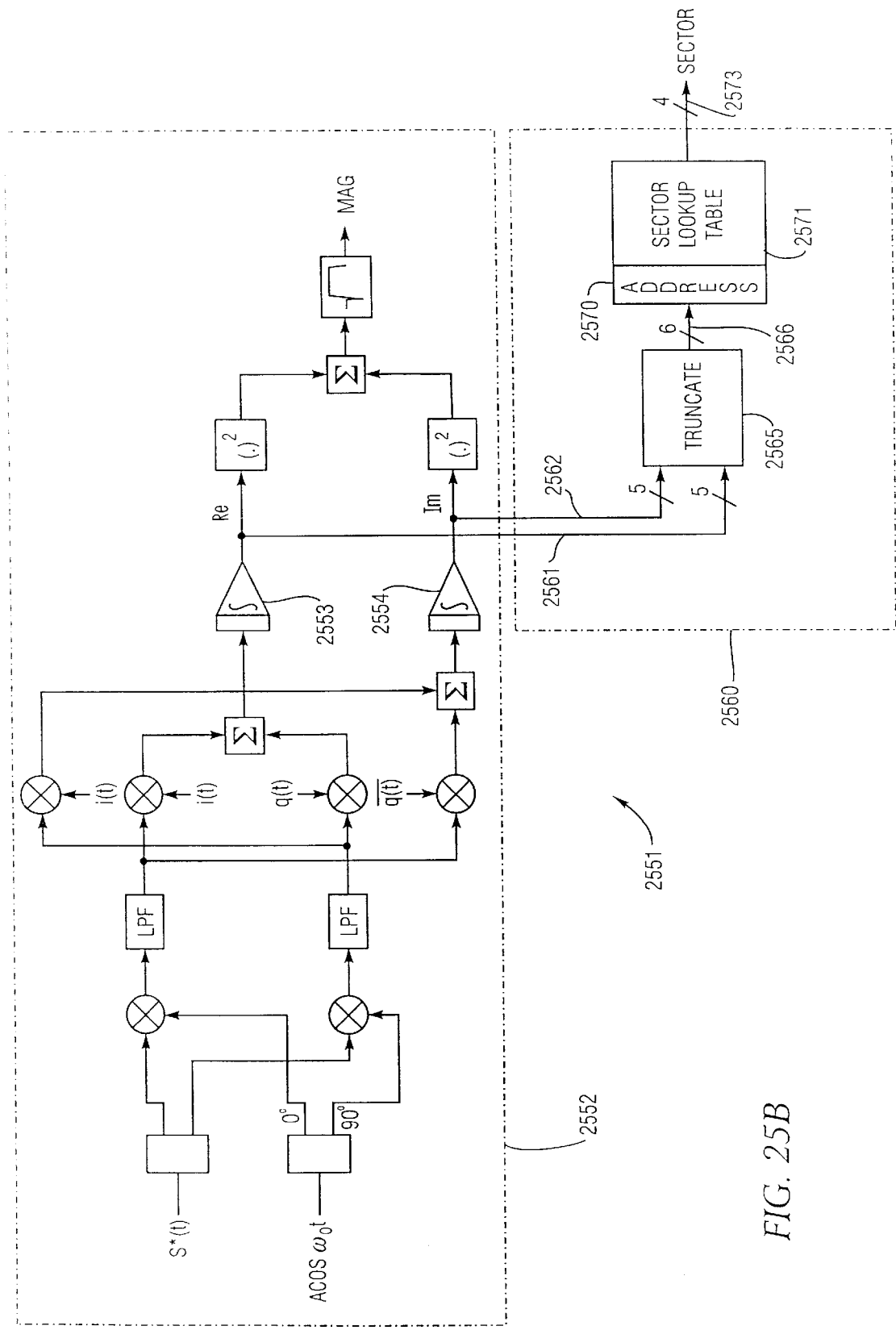
Figure 25C:
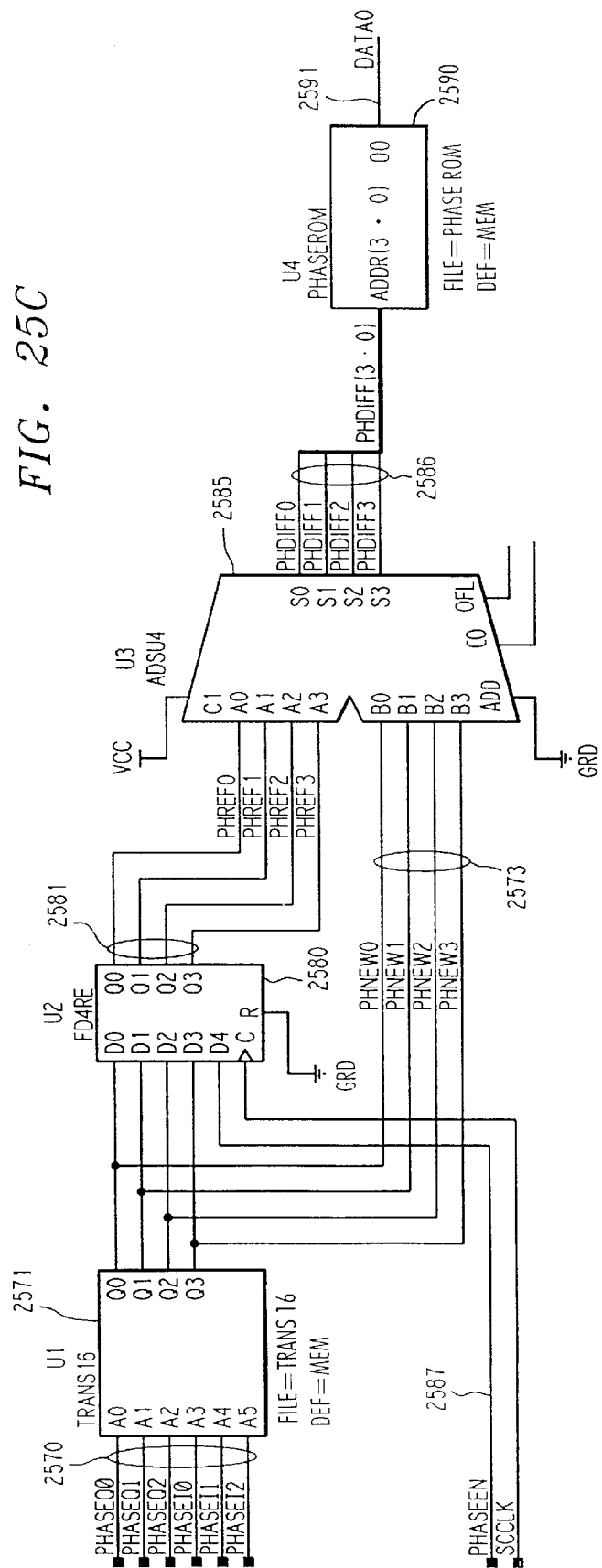

FIGS. 25A and 25B–25C are block diagrams of two different embodiments of a receiver for recognizing phase information in a received differentially phase encoded CPM signal. In FIG. 25A, a receiver 2501 comprises a CPM correlator 2502 which generates a real correlation signal 2511 and an imaginary correlation signal 2512 in response to receiving a phase encoded CPM signal. The CPM correlator 2502 of FIG. 25A may be embodied as any of the CPM correlators of FIGS. 10, 12, 14, 15A, 15B or 15D which generate real and imaginary correlation signals. In the particular embodiment shown FIG. 25A, the correlator of FIG. 15A is used.

Figure 27A:
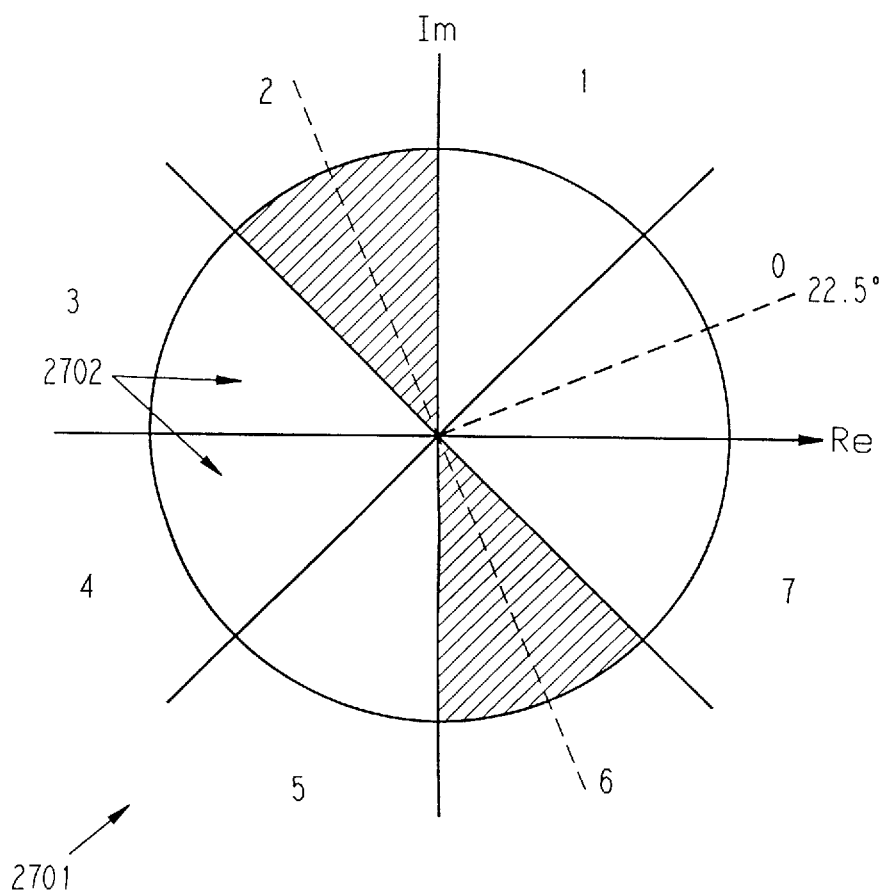
FIGS. 27A and 27B are phase map diagrams for an 8-sector phase map and a 16-sector phase map, respectively.

The real correlation signal 2511 and the imaginary correlation signal 2512 are coupled to a phase discriminator 2510 which, in response thereto, determines the phase angle of the received signal. In a preferred embodiment, the phase discriminator 2510 determines not the precise phase angle of the received signal, but only a sector which the phase angle lies within. Operation of the phase discriminator 2510 may be explained with reference to FIG. 27A. FIG. 27A is a phase angle graph showing a circle 2701 divided into a plurality of sectors 2702. The x-axis of the graph of FIG. 27A corresponds to a real correlation value, while the y-axis of the FIG. 27A graph corresponds to an imaginary correlation value. Assuming a lossless communication channel and a capability of perfect correlation, the real correlation value and imaginary correlation value may be seen as forming coordinates <Re, Im> for each symbol that would lie somewhere on circle 2701. In other words, the total correlation magnitude C for a correlated symbol would always be the same ($Re^2+Im^2=C^2$), but the phase angle would vary along the circle 2701 depending on the relative phase difference in the transmitter and receiver clocks.

Because it may be assumed that the communication channel will be subject to losses and noise interference, and that the correlator hardware has practical limitations, the total correlation magnitude C for a correlated symbol may be other than the total correlation value represented by circle 2701. Thus, the real correlation value and imaginary correlation value coordinates <Re, Im> may generally lie anywhere within or even without the circle 2701.

The phase discriminator 2510 determines the phase of the received CPM signal by determining the sign of the real correlation signal 2511 and the sign of the imaginary correlation signal 2512, and by comparing the relative magnitudes of the real correlation signal 2511 and the imaginary correlation signal 2512. Based on the derived information, the phase discriminator 2510 determines the sector 2702 in which the phase angle lies.

In more detail, the real correlation signal 2511 is compared against zero by comparator 2517, which outputs a real sign signal 2523. The imaginary correlation signal 2512 is compared against zero by comparator 2515, which outputs an imaginary sign signal 2521. The relative magnitudes of the real correlation signal 2511 and the imaginary correlation signal 2512 are compared by a magnitude comparator 2516, which outputs a magnitude comparison signal 2522. The magnitude comparator 2516 and comparators 2515 and 2517 may be either analog or digital, depending upon whether the real correlation signal 2511 and imaginary correlation signal 2512 are analog or digital signals.

The real sign signal 2523, imaginary sign signal 2521, and magnitude comparison signal 2522 are connected to a sector logic block 2530, which outputs a phase sector signal 2531 identifying the sector 2702 of the received phase angle as shown in FIG. 27A. The sectors 2702 in FIG. 27A are arranged as follows. Each sector 2702 covers a 45° region of circle 2701, with each pair of adjacent sectors 2702 defining a quadrant. Thus, sectors 0 and 1 define a first quadrant; sectors 2 and 3 define a second quadrant; sectors 4 and 5 define a third quadrant; and sectors 6 and 7 define a fourth quadrant. The real sign signal 2523 and imaginary sign signal 2521 together determine the quadrant of the phase angle, while the magnitude comparison signal 2522 determines which sector 2702 of the quadrant the phase angle lies in.

Thus, for example, where the sign of the real correlation signal 2511 and the sign of the imaginary correlation signal 2512 are both positive, it may be concluded that the phase angle lies in the quadrant defined by sectors 0 and 1. The magnitude comparison signal 2522 then determines which of sector 0 and 1 the phase angle lies within. If the real correlation signal 2511 (i.e., the first coordinate Re of the <Re, Im> pair) is equal in magnitude to the imaginary correlation signal 2512 (i.e., the second coordinate Im of the <Re, Im> pair), then the phase angle would lie on the 45° border between sectors 0 and 1. If the real correlation signal 2511 is greater in magnitude than the imaginary correlation signal 2512, then the phase angle lies below the 45° border between sectors 0 and 1 and therefore lies in sector 0. Similarly, if the real correlation signal 2511 is smaller in magnitude than the imaginary correlation signal 2512, then the phase angle lies above the 45° border between sectors 0 and 1 and therefore lies in sector 1.

Table 25-1 illustrates the eight possible combinations of real correlation signal sign, imaginary correlation signal sign, and relative magnitude of real and imaginary correlation signals for the sector arrangement of FIG. 27A.

TABLE 25-1

| Real Sign | Imaginary Sign | Larger Magnitude | Sector |
|---|---|---|---|
| − | − | Re | 4 |
| − | − | Im | 5 |
| − | + | Re | 3 |
| − | + | Im | 2 |
| + | − | Re | 7 |
| + | − | Im | 6 |
| + | + | Re | 0 |
| + | + | Im | 1 |

Phase logic block 2530 implements Table 25-1, and, in response to its inputs, outputs a three-bit phase sector signal 2531 identifying the sector in which the phase angle lies.

Once the sector of the phase angle is determined, the phase information of the received signal may be decoded by comparing the current phase sector against the previous phase sector. If the current phase sector differs from the previous phase sector by an amount closer to 0° than 180°, then it may be concluded that there was no phase change in the received signal and, therefore, that the phase information encoded in the received signal is a 0-bit. Conversely, if the current phase sector differs from the previous phase sector by an amount closer to 180° than 0°, then it may be concluded that there was a phase inversion in the received signal and, therefore, that the phase information encoded in the received signal is a 1-bit.

The phase sector comparison may be further explained with reference to FIG. 27A. As an example, assume that the previous phase sector was sector 0. In such a case, if the current phase sector is any of sectors 0, 1 or 7, then it may be concluded that there was no phase change in the received signal and, therefore, that the phase information encoded in the received signal is a 0-bit. If, on the other hand, the current phase sector is any of sectors 3, 4 or 5, then it may be concluded that there was a phase inversion in the received signal and, therefore, that the phase information encoded in the received signal is a 1-bit. If, however, the current phase sector is either sector 2 or 6, it cannot necessarily be concluded with sufficient certainty whether or not a phase inversion occurred in the received signal. The reason for this ambiguity is that the phase angle is approximated each symbol period in terms of a 45° sector, and is not measured to a finer degree. Experiment has shown that if the current phase sector falls in either of the sectors at a 90° orientation with respect to the previous phase sector, then treating the situation as one in which there is no phase inversion is preferred. Thus, in the present example, if the current phase sector is either sector 2 or 6, then the phase change should be treated as 0°, and the phase information considered a 0-bit.

More generally, if the current phase sector is positioned within two sectors 2702 of the previous phase sector, then it may be concluded that no phase change has occurred in the received signal. If, on the other hand, the current phase sector is positioned more than two sectors 2702 away from the previous phase sector, then it may be concluded that a phase inversion has occurred in the received signal.

FIGS. 25B and 25C are block diagrams of an alternative embodiment of a receiver having a phase decoding capability such that phase information in a received differentially phase encoded CPM signal may be recognized. In FIG. 25B, a receiver 2551 comprises a CPM correlator 2552 which generates a real correlation signal 2561 and an imaginary correlation signal 2562 in response to receiving a phase encoded CPM signal. The CPM correlator 2552 of FIG. 25B may be embodied as any of the CPM correlators of FIGS. 10, 12, 14, 15A, 15B or 15D which generate real and imaginary correlation signals. In the particular embodiment shown FIG. 25B, the correlator of FIG. 15A is used.

Figure 27B:
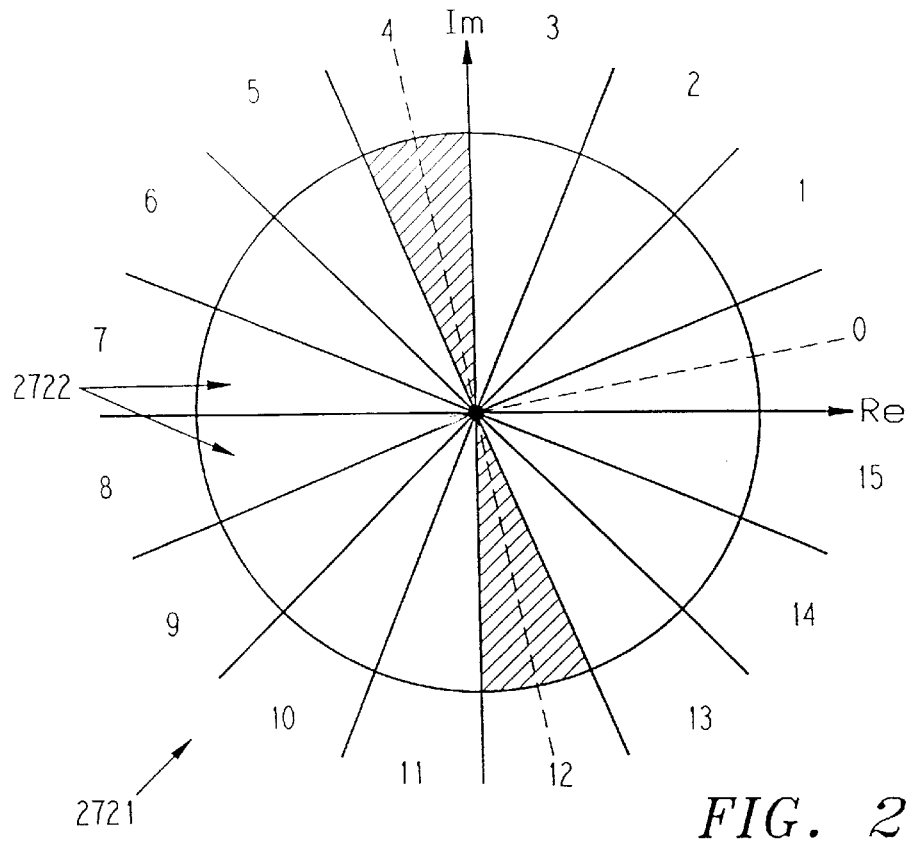

The real correlation signal 2561 and the imaginary correlation signal 2562 are coupled to a phase discriminator 2560 which, in response thereto, determines the phase angle of the received signal. In a preferred embodiment, the phase discriminator 2560 determines not the precise phase angle of the received signal, but only a sector which the phase angle lies within. Operation of the phase discriminator 2560 may be explained with reference to FIG. 27B. FIG. 27B is a phase map showing a circle 2721 divided into a plurality of sectors 2722, similar to FIG. 27A. Phase discriminator 2560 determines which sector 2722 the phase angle of the received signal lies in, and is therefore functionally similar to phase discriminator 2510 of FIG. 25A.

In a preferred embodiment, the real correlation signal 2561 and imaginary correlation signal 2562 are derived using integrators 2553 and 2554, respectively, wherein integrators 2553 and 2554 each comprise a digital counter. Thus, integrators 2553 and 2554 each output a binary count signal representing a correlation value, such as a 5-bit binary signal. Real correlation signal 2561 and imaginary correlation signal 2562 are each connected to a truncate block 2565, which preferably selects a predefined number of the most significant bits of its inputs.

In a particular embodiment, integrators 2553 and 2554 each comprise digital up-counters, and real correlation signal 2561 and imaginary correlation signal 2562 each comprise a first sign bit followed by four magnitude bits. In this embodiment, a correlation value of thirty-one (binary 11111) represents a maximum positive correlation, a correlation value of fifteen (binary 01111) or sixteen (binary 10000) represents a minimal correlation, and a correlation value of zero (binary 00000) represents a maximum negative correlation. In a preferred embodiment, integrators 2553 and 2554 are embodied as six-bit digital counters so as to reach a maximum positive correlation value of thirty-two (binary 100000) instead of thirty-one.

In the FIG. 25B embodiment, truncate block 2565 selects the three most significant bits of the real correlation signal 2561 and the three most significant bits of the imaginary correlation signal 2562. The phase discriminator 2560 uses these truncated correlation values to estimate the phase angle according to the general equation $\phi=\text{Arctan}(\text{Im}/\text{Re})$. Because each truncated correlation value represents a range of correlation values, a median value is chosen for each truncated value for use in the Arctangent calculation. In a preferred embodiment, the median value chosen for each truncated value is selected according to Table 25-2.

TABLE 25-2

| CORRELATION SCORE (SIGN, 2 MSB's) | VALUE USED FOR ARCTAN CALCULATION | RANGE OVER WHICH TRUNCATED SCORE CAN VARY |
|---|---|---|
| 000 | −14 | −12→−15 |
| 001 | −10 | −8→−11 |
| 010 | −6 | −4→−7 |
| 011 | −2 | 0→−3 |
| 100 | 2 | 0→3 |
| 101 | 6 | 4→7 |
| 110 | 10 | 8→11 |
| 111 | 14 | 12→15 |

By using three bits from the real correlation signal 2561 and three bits from the imaginary correlation signal 2562 to estimate the phase angle, the phase angle is thereby quantized into one of sixty-four possible locations in the phase map of FIG. 27B. The different possible phase angles and resulting sector location may be determined according to Table 25-3 below, wherein "Real" represents the truncated real correlation value, "Imag" represents the truncated imaginary correlation value, "Real Vector Value" is the median real correlation value selected based on the truncated real correlation value according to Table 25-2, "Imag Vector Value" is the median imaginary correlation selected based on the truncated imaginary correlation value according to Table 25-2, "Phase" is the phase angle calculated based on an arctangent of the Real Vector Value and the Imag Vector Value, and "Sector" refers to the sector in which the phase angle lies, according to a preferred sector mapping shown in FIG. 27C.

TABLE 25-3

SECTOR MAPPING

| REAL VECTOR VALUE | REAL | IMAG VECTOR VALUE | IMAG | SECTOR | PHASE |
|---|---|---|---|---|---|
| −14 | 000 | −14 | 000 | A | 225 |
| −14 | 000 | −10 | 001 | A | 215 |
| −14 | 000 | −6 | 010 | 9 | 200 |
| −14 | 000 | −2 | 011 | 8 | 188 |
| −14 | 000 | +2 | 100 | 8 | 172 |
| −14 | 000 | +6 | 101 | 7 | 160 |
| −14 | 000 | +10 | 110 | 6 | 145 |
| −14 | 000 | +14 | 111 | 6 | 135 |
| −10 | 001 | −14 | 000 | A | 234 |
| −10 | 001 | −10 | 001 | A | 225 |
| −10 | 001 | −6 | 010 | 9 | 210 |
| −10 | 001 | −2 | 011 | 9 | 191 |
| −10 | 001 | +2 | 100 | 7 | 169 |
| −10 | 001 | +6 | 101 | 7 | 150 |
| −10 | 001 | +10 | 110 | 6 | 135 |
| −10 | 001 | +14 | 111 | 6 | 125 |
| −6 | 010 | −14 | 000 | B | 247 |
| −6 | 010 | −10 | 001 | B | 239 |
| −6 | 010 | −14 | 010 | A | 225 |
| −6 | 010 | −2 | 011 | 9 | 198 |
| −6 | 010 | +2 | 100 | 7 | 162 |
| −6 | 010 | +6 | 101 | 6 | 135 |
| −6 | 010 | +10 | 110 | 5 | 121 |
| −6 | 610 | +14 | 111 | 5 | 113 |
| −2 | 011 | −14 | 000 | C | 262 |
| −2 | 011 | −10 | 001 | C | 259 |
| −2 | 011 | −6 | 010 | B | 251 |
| −2 | 011 | −2 | 011 | A | 225 |
| −2 | 011 | +2 | 100 | 6 | 135 |
| −2 | 011 | +6 | 101 | 5 | 109 |
| −2 | 011 | +10 | 110 | 4 | 101 |
| −2 | 011 | +14 | 111 | 4 | 98 |
| +2 | 100 | −14 | 000 | C | 278 |
| +2 | 100 | −10 | 001 | C | 281 |
| +2 | 100 | −6 | 010 | D | 288 |
| +2 | 100 | −2 | 011 | E | 315 |
| +2 | 100 | +2 | 100 | 2 | 45 |
| +2 | 100 | +6 | 101 | 3 | 72 |
| +2 | 100 | +10 | 110 | 4 | 79 |
| +2 | 100 | +14 | 111 | 4 | 82 |
| +6 | 101 | −14 | 000 | D | 293 |
| +6 | 101 | −10 | 001 | D | 301 |
| +6 | 101 | −6 | 010 | E | 315 |
| +6 | 101 | −2 | 011 | F | 342 |
| +6 | 101 | +2 | 100 | 1 | 18 |
| +6 | 101 | +6 | 101 | 2 | 45 |
| +6 | 101 | +10 | 110 | 3 | 59 |
| +6 | 101 | +14 | 111 | 3 | 67 |
| +10 | 110 | −14 | 000 | E | 305 |
| +10 | 110 | −10 | 001 | E | 315 |
| +10 | 110 | −6 | 010 | F | 329 |
| +10 | 110 | −2 | 011 | F | 349 |
| +10 | 110 | +2 | 100 | 1 | 11 |

TABLE 25-3-continued

SECTOR MAPPING

| REAL VECTOR VALUE | REAL | IMAG VECTOR VALUE | IMAG | SECTOR | PHASE |
|---|---|---|---|---|---|
| +10 | 110 | +6 | 101 | 1 | 31 |
| +10 | 110 | +10 | 110 | 2 | 45 |
| +10 | 110 | +14 | 111 | 2 | 55 |
| +14 | 111 | −14 | 000 | E | 315 |
| +14 | 111 | −10 | 001 | E | 325 |
| +14 | 111 | −6 | 010 | F | 340 |
| +14 | 111 | −2 | 011 | 0 | 352 |
| +14 | 111 | +2 | 100 | 0 | 8 |
| +14 | 111 | +6 | 101 | 1 | 20 |
| +14 | 111 | +10 | 110 | 2 | 35 |
| +14 | 111 | +14 | 111 | 2 | 45 |

Figure 27C:
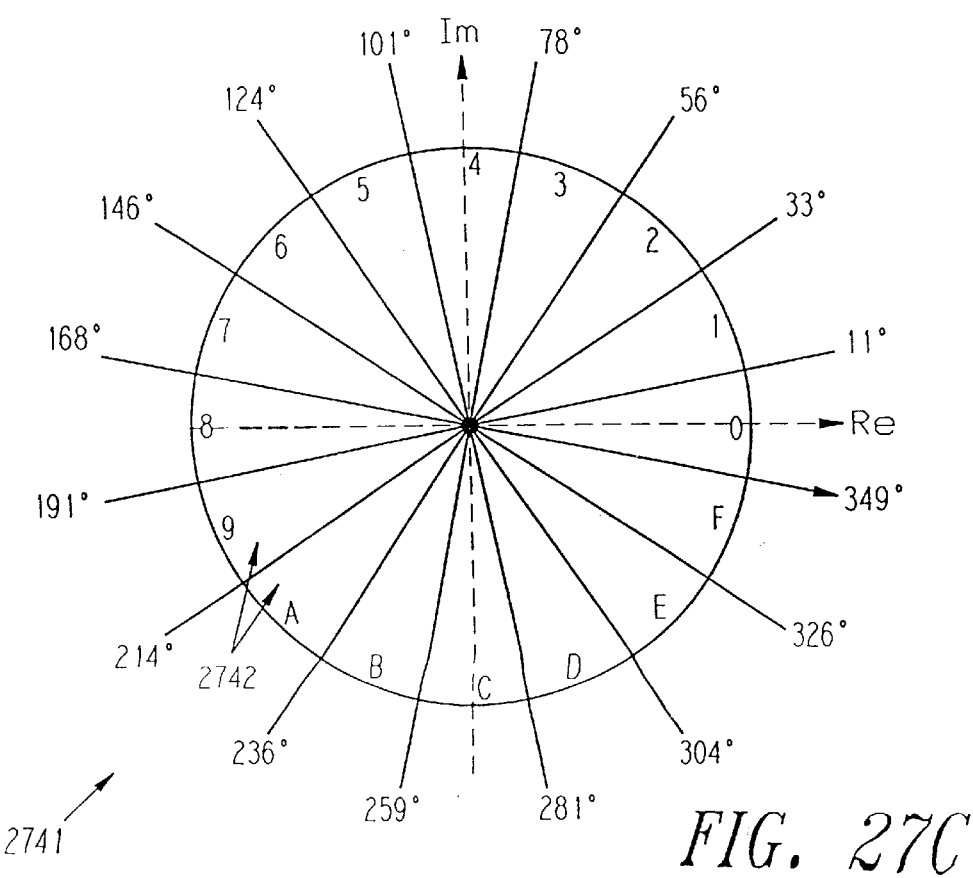
FIG. 27C is a preferred 16-sector phase map diagram having a phase reference offset from zero.

FIG. 27C is a diagram of a preferred sector mapping. FIG. 27C shows a circle 2741 (similar to the circle 2721 of FIG. 27B) comprising a plurality of sectors 2742. Circle 2741 is divided into sectors 2742 denoted sector 0, 1, 2, . . . F, according to the mapping set forth in Table 25-4 below.

TABLE 25-4

SECTOR DEFINITION

| PHASE | SECTOR |
|---|---|
| 349–11 | 0 |
| 11–33 | 1 |
| 33–56 | 2 |
| 56–78 | 3 |
| 78–101 | 4 |
| 101–124 | 5 |
| 124–146 | 6 |
| 146–168 | 7 |
| 168–191 | 8 |
| 191–214 | 9 |
| 214–236 | A |
| 236–259 | B |
| 259–281 | C |
| 281–304 | D |
| 304–326 | E |
| 326–349 | F |

In a preferred embodiment, the sector for the current phase angle is determined by using a six bit signal 2566 comprising the truncated real correlation signal and the truncated imaginary correlation signal as an address 2570 for a sector lookup table 2571. The sector lookup table 2571 may comprise, e.g., a ROM or other non-volatile memory, and outputs a four-bit binary sector signal 2573 indicating which of the sixteen sectors 2742 the phase angle lies in. In a preferred embodiment, the contents of the sector lookup table 2571 are selected according to Table 25-5.

TABLE 25-5

SECTOR ROM CONTENTS

| ADDRESS (hex) (Re, Im) | DATA (hex) (Sector) |
|---|---|
| 00 | A |
| 01 | A |
| 02 | 9 |
| 03 | 8 |
| 04 | 8 |
| 05 | 7 |
| 06 | 6 |

TABLE 25-5-continued

SECTOR ROM CONTENTS

| ADDRESS (hex)<br>(Re, Im) | DATA (hex)<br>(Sector) |
|---|---|
| 07 | 6 |
| 08 | A |
| 09 | A |
| 0A | 9 |
| 0B | 9 |
| 0C | 7 |
| 0D | 7 |
| 0E | 6 |
| 0F | 6 |
| 10 | B |
| 11 | B |
| 12 | A |
| 13 | 9 |
| 14 | 7 |
| 15 | 6 |
| 16 | 5 |
| 17 | 5 |
| 18 | C |
| 19 | C |
| 1A | B |
| 1B | A |
| 1C | 6 |
| 1D | 5 |
| 1E | 4 |
| 1F | 4 |
| 20 | C |
| 21 | C |
| 22 | D |
| 23 | E |
| 24 | 2 |
| 25 | 3 |
| 26 | 4 |
| 27 | 4 |
| 28 | D |
| 29 | D |
| 2A | E |
| 2B | F |
| 2C | 1 |
| 2D | 2 |
| 2E | 3 |
| 2F | 3 |
| 30 | E |
| 31 | E |
| 32 | F |
| 33 | F |
| 34 | 1 |
| 35 | 1 |
| 36 | 2 |
| 37 | 2 |
| 38 | E |
| 39 | E |
| 3A | F |
| 3B | 0 |
| 3C | 0 |
| 3D | 1 |
| 3E | 2 |
| 3F | 2 |

Once the current sector is determined, the phase information from the received signal may be recognized in a manner similar to that described with respect to FIG. 25A. A preferred embodiment of phase decoding circuitry is shown in FIG. 25C. In FIG. 25B, and in more detail in FIG. 25C, are shown address lines 2570 connected to a sector lookup table 2571, which outputs a sector signal 2573. FIG. 25C further shows sector signal 2573 connected to a register 2580, which stores the previous sector value. A previous sector signal 2581 is output from register 2580 and connected to one set of inputs of a subtractor 2585, and sector signal 2573 is connected to another set of inputs of the subtractor 2585. Subtractor 2585 subtracts its inputs and generates a sector difference signal 2586.

The sector difference signal 2586 is used to derive the encoded phase information. If the currenthase sector is positioned within four sectors 2742 of the previous phase sector, then it may be concluded that no phase change has occurred in the received signal and, therefore, that the phase information encoded in the received signal is a 0-bit. If, on the other hand, the current phase sector is positioned more than four sectors 2742 away from the previous phase sector, then it may be concluded that a phase inversion has occurred in the received signal and, therefore, that the phase information encoded in the received signal is a 1-bit. Accordingly, the sector difference signal 2586 is applied as an address to a phase bit lookup table 2590, which outputs a phase bit signal 2591 comprising a 0-bit or a 1-bit depending on the value of the sector difference signal 2586. In a preferred embodiment, the phase bit lookup table 2590 comprises a ROM or other non-volatile memory, the contents of which are in accordance with Table 25-6.

TABLE 25-6

PHASE ROM CONTENTS

| ADDRESS (hex)<br>(Sector Difference) | DATA (hex)<br>(Nth Bit) |
|---|---|
| 0 | 0 |
| 1 | 0 |
| 2 | 0 |
| 3 | 0 |
| 4 | 0 |
| 5 | 1 |
| 6 | 1 |
| 7 | 1 |
| 8 | 1 |
| 9 | 1 |
| A | 1 |
| B | 1 |
| C | 0 |
| D | 0 |
| E | 0 |
| F | 0 |

It may be noted that the 16-sector embodiment of FIG. 27C, like the 8-sector embodiment of FIG. 27A, has two sectors 2742 of ambiguity which are aligned at 90° to the previous phase sector. But because there are more sectors 2742 in the FIG. 27C embodiment than in the FIG. 27A embodiment, and hence a narrower sector size, the regions of ambiguity are reduced in the FIG. 27C embodiment. By increasing the number of sectors (which may be done, e.g., by increasing the number of bits used from the correlation signals 2561 and 2562 to calculate the phase angle), the sector size can be further narrowed, so as to further reduce the total region of ambiguity. As with the FIG. 27A embodiment, a phase difference falling in a region of ambiguity is preferably treated as indicating no phase inversion—i.e., the phase information is treated as a 0-bit.

Figure 26:
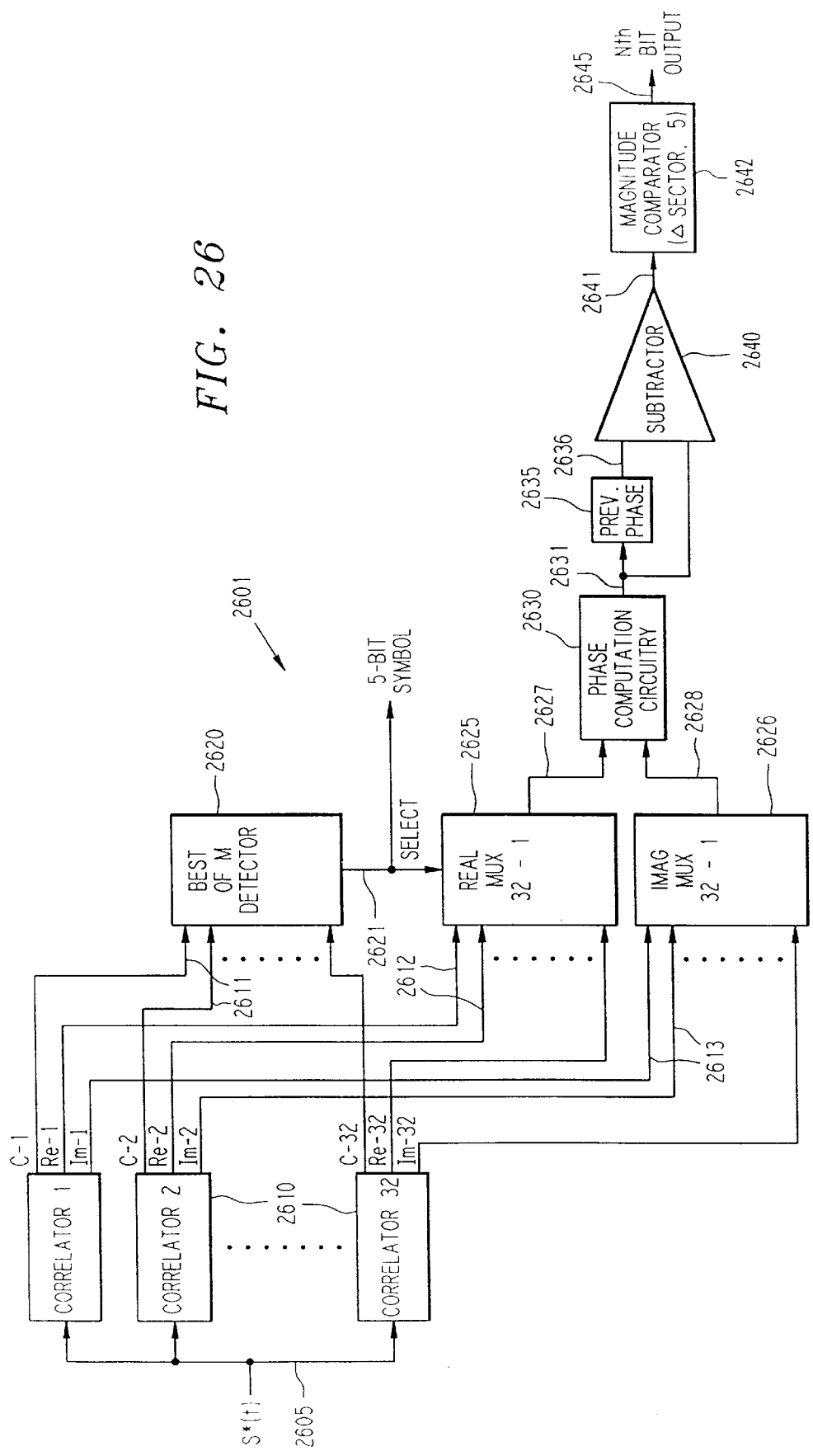
FIG. 26 is a block diagram of a preferred receiver for carrying out phase decoding in a 32 symbol transmission technique in accordance with the embodiment of the receiver shown in FIGS. 25B and 25C.

FIG. 26 is a block diagram of a preferred receiver for carrying out phase decoding in a 32 symbol transmission technique in accordance with the embodiment of the receiver shown in FIGS. 25B and 25C. In FIG. 26, a received signal 2605 is coupled to a plurality of CPM correlators 2610 (e.g., 32 different correlators). Each of the CPM correlators 2610 may be embodied as any of the CPM correlators of FIGS. 10, 12, 14, 15A, 15B or 15D, and each CPM correlator 2610 simultaneously outputs a real correlation signal 2612, an imaginary correlation signal 2613, and a unified correlation signal 2611 in response to receiving the incoming signal 2605. In a preferred embodiment, each of correlators 2610 comprises a correlator such as shown in FIG. 15D.

The correlation signal 2611 from each of the CPM correlators 2610 is coupled to a best-of-M detector 2620, which compares the relative magnitudes of each of the unified correlation signals 2611 and selects the one indicating the highest degree of correlation. The best-of-M detector 2620 outputs a signal 2621 indicating which of the thirty-two symbols has the highest degree of correlation. Signal 2621 is coupled as a select control signal to a real correlation signal multiplexer 2625 and an imaginary correlation signal multiplexer 2626. The real correlation signals 2612 from each of the CPM correlators 2610 are connected as inputs to the real correlation signal multiplexer 2625, and the imaginary correlation signals 2613 from each of the CPM correlators 2610 are connected as inputs to the imaginary correlation signal multiplexer 2626. In response to signal 2621, the real correlation signal 2612 and the imaginary correlation signal 2613 corresponding to the highest correlation symbol are output from the real correlation signal multiplexer 2625 and the imaginary correlation signal multiplexer 2626, respectively, as a selected real correlation signal 2627 and a selected imaginary correlation signal 2628.

The selected real correlation signal 2627 and the selected imaginary correlation signal 2628 are connected to a phase computation block 2630. The phase computation block 2630 outputs a phase estimate signal 2631 which is connected to a previous phase estimate memory 2635 and a subtractor 2640. The subtractor 2640 calculates a difference between the phase estimate signal 2631 and a previous phase estimate signal 2636 stored in the previous phase estimate memory 2635, and derives a phase difference signal 2641 thereby. The phase difference signal 2641 is connected to a magnitude comparator 2642 which determines in response thereto the phase encoded information. The phase computation block 2630, previous phase estimate memory 2635, subtractor 2640, and magnitude comparator 2624 may generally be embodied as sector lookup table 2571, register 2580, subtractor 2585, and phase bit lookup table 2590 appearing in FIG. 25C.

The techniques described above with respect to single bit or biphase encoding may be applied to other levels of encoding, such as, e.g., triphase, quadraphase or octiphase encoding. In quadraphase encoding, for example, two bits of the data signal in the transmitter are used for phase encoding. For each symbol, the phase may be in any one of four relative states, each at 90° with respect to the previous phase state. The phase angle may be determined previously described with respect to FIGS. 25A–25C. Depending upon the relative phase difference as reflected in the current and previous sector values, one of four phase states may be derived, and two bits of phase information data recovered in response to the selected one of four phase states.

Alternative Embodiments

While preferred embodiments are disclosed herein, many variations are possible which remain within the concept and scope of the invention, and these variations would become clear to one of ordinary skill in the art after perusal of the specification, drawings and claims herein.

In one alternative embodiment, the circuitry constituting either FIG. 17, or FIGS. 18, 19, and 21A–B, or all said figures, may be incorporated onto a single integrated chip, along with supporting circuitry as necessary. Also, while information to be transmitted from transmitter to receiver is generally referred to herein as "data", the term "data" may comprise data, error-correcting codes, control information, protocol information, or other signals, and all these are deemed to be within the scope and spirit of the invention.

While the invention as shown in embodiments herein uses certain CPM encoding techniques, those skilled in the art would recognize, after perusal of this application, that a number of encoding methods, such as MSK, GMSK, SQAM, SQORC, and other known spread-spectrum techniques, would be workable and fall within the scope and spirit of the invention. The invention therefore is not to be restricted except within the spirit and scope of the appended claims.

We claim:

1. A method for despreading a continuous phase modulated spread spectrum signal comprising the steps of receiving a spread spectrum signal, wherein said spread spectrum signal is generated by transmitting a signal created by first separating an encoded signal of original data to be transmitted into two portions, an even portion and an odd portion; doubling the chip period for each portion; modulating said even or odd portions so that the even and odd portions are out of phase; combining said even and odd portion into said spread spectrum signal and transmitting said spread spectrum;

dividing said received spread spectrum signal into a first signal and a second signal, said first signal and said second signal being duplicates of one another, demodulating said first signal with a first local reference signal to generate an odd signal which corresponds with said odd portion of said spread spectum signal, demodulating said second signal with a second local reference signal to generate an even signal which corresponds with said even portion of said spread spectrum signal, correlating said odd signal with the odd chips of a chip code to generate an odd correlation signal, said step of correlating said odd signal comprising the steps of clocking said odd signal into a register having a plurality of sequential chip locations, comparing alternating ones of said chip locations with said odd chips to generate a plurality of comparison values, and summing said comparison values, correlating said even signal with the even chips of said chip sequence to generate a even correlation signal, said step of correlating said even signal comprising the steps of clocking said even signal into a register having a plurality of sequential chip locations, comparing alternating ones of said chip locations with said even chips to generate a plurality of comparison values, and summing said comparison values, combining said odd correlation signal and said even correlation signal to form a unified correlation signal and, using said unified correlation signal to recreate said original data.

2. The method of claim 1 wherein said even portion and said odd portion of said spread spectrum signal are generated by dividing said encoded original data into an even chip stream and an odd chip stream, and said step of modulating said even and odd portions so that the even and odd portions are out of phase comprises generating a first sinusoidal waveform from said even chip stream, generating a second sinusoidal waveform from said odd chip stream, modulating said first sinusoidal waveform with a first carrier having a frequency $w_0$, and, modulating said second sinusoidal waveform with a second carrier having a frequency $w_0$, said first carrier and said second carrier offset in phase from one another by 90 degrees.

3. The method of claim 1 wherein said first local reference signal has a frequency and phase substantially the same as a carrier of said spread spectrum signal.

4. The method of claim 1 wherein said second local reference signal has the same frequency as said first local reference signal and a 90-degree phase offset therefrom.

5. An apparatus for despreading a spread spectrum signal comprised of modulated and combined odd and even chips of an original data stream, comprising:

means for receiving a spread spectrum signal, a power divider for splitting said received spectrum signal into a first signal and a second signal, an odd demodulator for demodulating said first signal with a first local reference signal to generate an odd signal comprising odd signal chips corresponding to the odd chips of said original data stream, an even demodulator for demodulating said second signal with a second local reference signal to generate a even signal comprising even signal chips corresponding to the even chips of said original data stream, a chip code comprising even and odd chips, a first parallel correlator for correlating said odd signal with said odd chips of said chip code and for generating an odd correlation signal, said first parallel correlator comprising a first register having a plurality of sequential chip locations for receiving said odd signal chips, a plurality of multipliers for comparing alternating ones of odd signal chips in said first register chip locations with said odd chips and generating a plurality of odd comparison values, and an odd summer for combining said odd comparison values into an odd correlation signal, a second parallel correlator for correlating said even signal with the even chips of said chip code and generating an even correlation signal, said second parallel correlator comprising a second register having a plurality of sequential chip locations for receiving said even signal chips, a plurality of multipliers for comparing alternating ones of said even chips in said second register chip locations with said even chips of said chip code and generating a plurality of even comparison values, and an even summer for combining said even comparison values into an even correlation signal, a summer for combining said odd correlation signal and said even correlation signal, and means for using said odd correlation signal and said even correlation signal to recreate the original data stream.

6. The apparatus of claim 5 further comprising a transmitter for generating and transmitting said continuous phase modulated spread spectrum signal, said transmitter comprising:

an encoder for encoding said original data stream into a chip stream, a switch for dividing said chip stream into an even chip stream and an odd chip stream, an odd waveform generator for generating a second sinusoidal waveform from said odd chip stream, an even waveform generator generating a first sinusoidal waveform from said even chip stream, an odd modulator for modulating said first sinusoidal waveform with a first carrier having a frequency $w_0$, an even modulator for modulating said second sinusoidal waveform with a second carrier having a frequency $w_0$, said first carrier and said second carrier offset in phase from one another by 90 degrees, and a summer for combining said modulated first and second waveforms to form said spread spectrum signal.

7. The apparatus of claim 5 wherein said first local reference signal has a frequency and phase substantially the same as a carrier of said spread spectrum signal.

8. The apparatus of claim 5 wherein said second local reference signal has the same frequency as said first local reference signal and a 90-degree phase offset therefrom.

* * * * *